(12) United States Patent
Lin et al.

(10) Patent No.: US 10,785,759 B2
(45) Date of Patent: Sep. 22, 2020

(54) METHOD AND APPARATUS FOR DETERMINING NUMEROLOGY BANDWIDTH IN A WIRELESS COMMUNICATION SYSTEM

(71) Applicant: ASUSTek Computer Inc., Taipei (TW)

(72) Inventors: Ko-Chiang Lin, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 16 days.

(21) Appl. No.: 15/674,483

(22) Filed: Aug. 10, 2017

(65) Prior Publication Data
US 2018/0049169 A1    Feb. 15, 2018

Related U.S. Application Data

(60) Provisional application No. 62/374,354, filed on Aug. 12, 2016.

(51) Int. Cl.
| | | |
|---|---|---|
| *H04W 72/04* | (2009.01) | |
| *H04L 27/26* | (2006.01) | |
| *H04L 5/00* | (2006.01) | |

(52) U.S. Cl.
CPC ......... *H04W 72/042* (2013.01); *H04L 5/0007* (2013.01); *H04L 5/0051* (2013.01); *H04L 5/0094* (2013.01); *H04L 27/2602* (2013.01); *H04L 5/003* (2013.01)

(58) Field of Classification Search
CPC ............. H04W 72/042; H04L 27/2602; H04L 5/0007; H04L 5/0051; H04L 5/0094; H04L 5/003
See application file for complete search history.

(56) References Cited

U.S. PATENT DOCUMENTS

| | | | | |
|---|---|---|---|---|
| 10,045,345 B2* | 8/2018 | Ma | ........................ | H04L 1/1812 |
| 2011/0032850 A1 | 2/2011 | Cai | | |
| 2011/0081913 A1 | 4/2011 | Lee | | |
| 2011/0103406 A1 | 5/2011 | Cai et al. | | |
| 2013/0083753 A1* | 4/2013 | Lee | ................... | H04W 74/0833 370/329 |
| 2014/0321282 A1* | 10/2014 | Pragada | ................ | H04W 28/10 370/235 |
| 2016/0150532 A1 | 5/2016 | Bhushan et al. | | |

(Continued)

FOREIGN PATENT DOCUMENTS

| | | |
|---|---|---|
| WO | 2010138921 | 12/2010 |
| WO | 2016072766 | 5/2016 |
| WO | 2018030415 | 2/2018 |

OTHER PUBLICATIONS

Office Action from the Korean Intellectual Property Office in the corresponding KR Application No. 10-2017-0102214, dated Aug. 22, 2018.

(Continued)

*Primary Examiner* — Wayne H Cai
(74) *Attorney, Agent, or Firm* — Cooper Legal Group, LLC

(57) ABSTRACT

Methods and apparatuses for determining numerology bandwidth in a wireless communication system are disclosed herein. In one method, a user equipment receives information for a numerology. The information comprises a frequency location and a bandwidth. The UE derives a resource allocation for the numerology based on the frequency location and the bandwidth.

17 Claims, 39 Drawing Sheets

(56) References Cited

U.S. PATENT DOCUMENTS

| | | | |
|---|---|---|---|
| 2016/0359593 A1* | 12/2016 | Dai | H04L 27/0006 |
| 2018/0007673 A1* | 1/2018 | Fwu | H04W 4/70 |
| 2018/0020365 A1* | 1/2018 | Xiong | H04W 74/0833 |
| 2019/0052331 A1* | 2/2019 | Chang | H04B 7/0626 |
| 2019/0229879 A1* | 7/2019 | Yi | H04L 1/0038 |

OTHER PUBLICATIONS

Office Action from Taiwan Intellectual Property Office in the corresponding TW Application No. 106127180, dated May 7, 2018.
Huawei et al: "Initial access in NR", 3GPP Draft; R2-163923 Initial Access in NR, 3rd Generation Partnership Project (3GPP), Mobile Competence Centre ; 650, Route Des Lucioles ; F-06921 Sophia-Antipolis Cedex ; France vol. RAN WG2, no. Nanjing, China; May 23, 2016-May 27, 2016 URL:http://www.3gpp.org/ftp/Meetings/_3GPP_SYNC/RAN2/Docs/.
European search report from corresponding EP Application No. 17185732.9 dated Dec. 22, 2017.
Huawei, HiSilicon, Initial access in NR,3GPP TSG-RAN WG2 #94 R2-163923, Internet <URL:http://www.3gpp.org/ftp/tsg_ra, May 14, 2016, 2.1 Multiple numerologies.
Nokia Networks, Basic system design for UL NB-IoT[online], 3GPP TSG RAN WG1 adhoc_LTE_NB-IoT_1601 R1-160041, Internet <URL:http://www.3gpp.org/ftp/tsg_ran/WG1_RL1/TSGR1_AH/LTE_NB-IoT_1601/Docs/R1-160041.zip>, Jan. 11, 2016, 2.1 Resource scheduling.
Office Action from Japan Patent Office in corresponding JP Application No. 2017-155218, dated Oct. 16, 2018.
"Initial access in NR", Huawei, HiSilicon, 3GPP TSG-RAN WG2 Meeting #94, R2-163923, May 14, 2016.
"Basic system design for UL NB-IoT", 3GPP TSG-RAN WG1 NB-IoT Adhoc, RI-160041, Jan. 11, 2016.
Office Action from SIPO in corresponding CN Application No. 201710682076.0, dated Sep. 3, 2019.

\* cited by examiner

| Configuration | | $N_{sc}^{RB}$ | $N_{symb}^{DL}$ |
|---|---|---|---|
| Normal cyclic prefix | $\Delta f = 15\,kHz$ | 12 | 7 |
| Extended cyclic prefix | $\Delta f = 15\,kHz$ | | 6 |
| | $\Delta f = 7.5\,kHz$ | 24 | 3 |

FIG. 6 (PRIOR ART)

| Configuration | | Cyclic prefix length $N_{CP,l}$ |
|---|---|---|
| Normal cyclic prefix | $\Delta f = 15\,kHz$ | 160 for $l = 0$<br>144 for $l = 1,2,...,6$ |
| Extended cyclic prefix | $\Delta f = 15\,kHz$ | 512 for $l = 0,1,...,5$ |
| | $\Delta f = 7.5\,kHz$ | 1024 for $l = 0,1,2$ |

FIG. 7 (PRIOR ART)

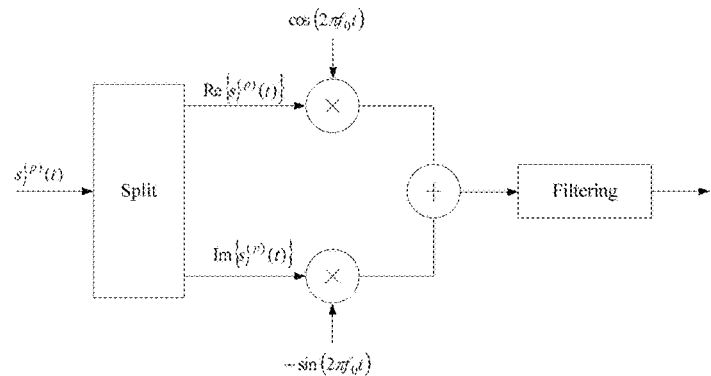
FIG. 8 (PRIOR ART)
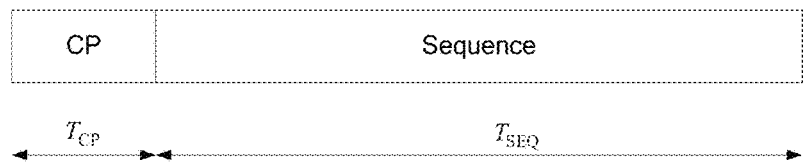
FIG. 9 (PRIOR ART)
| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (see Note) | $448 \cdot T_s$ | $4096 \cdot T_s$ |
| NOTE: Frame structure type 2 and special subframe configurations with UpPTS lengths $4384 \cdot T_s$ and $5120 \cdot T_s$ only. | | |
FIG. 10 (PRIOR ART)

| PRACH Configuration Index | Preamble Format | System frame number | Subframe number | PRACH Configuration Index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| 11 | 0 | Any | 3, 6, 9 | 43 | 2 | Any | 3, 6, 9 |
| 12 | 0 | Any | 0, 2, 4, 6, 8 | 44 | 2 | Any | 0, 2, 4, 6, 8 |
| 13 | 0 | Any | 1, 3, 5, 7, 9 | 45 | 2 | Any | 1, 3, 5, 7, 9 |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

FIG. 11 (PRIOR ART)

| PRACH configuration Index | Preamble Format | Density Per 10 ms $D_{RA}$ | Version $r_{RA}$ | PRACH configuration Index | Preamble Format | Density Per 10 ms $D_{RA}$ | Version $r_{RA}$ |
|---|---|---|---|---|---|---|---|
| 0 | 0 | 0.5 | 0 | 32 | 2 | 0.5 | 2 |
| 1 | 0 | 0.5 | 1 | 33 | 2 | 1 | 0 |
| 2 | 0 | 0.5 | 2 | 34 | 2 | 1 | 1 |
| 3 | 0 | 1 | 0 | 35 | 2 | 2 | 0 |
| 4 | 0 | 1 | 1 | 36 | 2 | 3 | 0 |
| 5 | 0 | 1 | 2 | 37 | 2 | 4 | 0 |
| 6 | 0 | 2 | 0 | 38 | 2 | 5 | 0 |
| 7 | 0 | 2 | 1 | 39 | 2 | 6 | 0 |
| 8 | 0 | 2 | 2 | 40 | 3 | 0.5 | 0 |
| 9 | 0 | 3 | 0 | 41 | 3 | 0.5 | 1 |
| 10 | 0 | 3 | 1 | 42 | 3 | 0.5 | 2 |
| 11 | 0 | 3 | 2 | 43 | 3 | 1 | 0 |
| 12 | 0 | 4 | 0 | 44 | 3 | 1 | 1 |
| 13 | 0 | 4 | 1 | 45 | 3 | 2 | 0 |
| 14 | 0 | 4 | 2 | 46 | 3 | 3 | 0 |
| 15 | 0 | 5 | 0 | 47 | 3 | 4 | 0 |
| 16 | 0 | 5 | 1 | 48 | 4 | 0.5 | 0 |
| 17 | 0 | 5 | 2 | 49 | 4 | 0.5 | 1 |
| 18 | 0 | 6 | 0 | 50 | 4 | 0.5 | 2 |
| 19 | 0 | 6 | 1 | 51 | 4 | 1 | 0 |
| 20 | 1 | 0.5 | 0 | 52 | 4 | 1 | 1 |
| 21 | 1 | 0.5 | 1 | 53 | 4 | 2 | 0 |
| 22 | 1 | 0.5 | 2 | 54 | 4 | 3 | 0 |
| 23 | 1 | 1 | 0 | 55 | 4 | 4 | 0 |
| 24 | 1 | 1 | 1 | 56 | 4 | 5 | 0 |
| 25 | 1 | 2 | 0 | 57 | 4 | 6 | 0 |
| 26 | 1 | 3 | 0 | 58 | N/A | N/A | N/A |
| 27 | 1 | 4 | 0 | 59 | N/A | N/A | N/A |
| 28 | 1 | 5 | 0 | 60 | N/A | N/A | N/A |
| 29 | 1 | 6 | 0 | 61 | N/A | N/A | N/A |
| 30 | 2 | 0.5 | 0 | 62 | N/A | N/A | N/A |
| 31 | 2 | 0.5 | 1 | 63 | N/A | N/A | N/A |

FIG. 12 (PRIOR ART)

| PRACH configuration Index (See Table 5.7.1-3) | UL/DL configuration (See Table 4.2-2) | | | | | | |
|---|---|---|---|---|---|---|---|
| | 0 | 1 | 2 | 3 | 4 | 5 | 6 |
| 0 | (0,1,0,2) | (0,1,0,1) | (0,1,0,0) | (0,1,0,2) | (0,1,0,1) | (0,1,0,0) | (0,1,0,2) |
| 1 | (0,2,0,2) | (0,2,0,1) | (0,2,0,0) | (0,2,0,2) | (0,2,0,1) | (0,2,0,0) | (0,2,0,2) |
| 2 | (0,1,1,2) | (0,1,1,1) | (0,1,1,0) | (0,1,0,1) | (0,1,0,0) | N/A | (0,1,1,1) |
| 3 | (0,0,0,2) | (0,0,0,1) | (0,0,0,0) | (0,0,0,2) | (0,0,0,1) | (0,0,0,0) | (0,0,0,2) |
| 4 | (0,0,1,2) | (0,0,1,1) | (0,0,1,0) | (0,0,0,1) | (0,0,0,0) | N/A | (0,0,1,1) |
| 5 | (0,0,0,1) | (0,0,0,0) | N/A | (0,0,0,0) | N/A | N/A | (0,0,0,1) |
| 6 | (0,0,0,2)<br>(0,0,1,2) | (0,0,0,1)<br>(0,0,1,1) | (0,0,0,0)<br>(0,0,1,0) | (0,0,0,1)<br>(0,0,0,2) | (0,0,0,0)<br>(0,0,0,1) | (0,0,0,0)<br>(1,0,0,0) | (0,0,0,2)<br>(0,0,1,1) |
| 7 | (0,0,0,1)<br>(0,0,1,1) | (0,0,0,0)<br>(0,0,1,0) | N/A | (0,0,0,0)<br>(0,0,0,2) | N/A | N/A | (0,0,0,1)<br>(0,0,1,0) |
| 8 | (0,0,0,0)<br>(0,0,1,0) | N/A | N/A | (0,0,0,0)<br>(0,0,0,1) | N/A | N/A | (0,0,0,0)<br>(0,0,1,1) |
| 9 | (0,0,0,1)<br>(0,0,0,2)<br>(0,0,1,2) | (0,0,0,0)<br>(0,0,0,1)<br>(0,0,1,1) | (0,0,0,0)<br>(0,0,1,0)<br>(1,0,0,0) | (0,0,0,0)<br>(0,0,0,1)<br>(0,0,0,2) | (0,0,0,0)<br>(0,0,0,1)<br>(1,0,0,1) | (0,0,0,0)<br>(1,0,0,0)<br>(2,0,0,0) | (0,0,0,1)<br>(0,0,0,2)<br>(0,0,1,1) |
| 10 | (0,0,0,0)<br>(0,0,1,0)<br>(0,0,1,1) | (0,0,0,1)<br>(0,0,1,0)<br>(0,0,1,1) | (0,0,0,0)<br>(0,0,1,0)<br>(1,0,1,0) | N/A | (0,0,0,0)<br>(0,0,0,1)<br>(1,0,0,0) | N/A | (0,0,0,0)<br>(0,0,0,2)<br>(0,0,1,0) |
| 11 | N/A | (0,0,0,0)<br>(0,0,0,1)<br>(0,0,1,0) | N/A | N/A | N/A | N/A | (0,0,0,1)<br>(0,0,1,0)<br>(0,0,1,1) |
| 12 | (0,0,0,1)<br>(0,0,0,2)<br>(0,0,1,1)<br>(0,0,1,2) | (0,0,0,0)<br>(0,0,0,1)<br>(0,0,1,0)<br>(0,0,1,1) | (0,0,0,0)<br>(0,0,1,0)<br>(1,0,0,0)<br>(1,0,1,0) | (0,0,0,0)<br>(0,0,0,1)<br>(0,0,0,2)<br>(1,0,0,2) | (0,0,0,0)<br>(0,0,0,1)<br>(1,0,0,0)<br>(1,0,0,1) | (0,0,0,0)<br>(1,0,0,0)<br>(2,0,0,0)<br>(3,0,0,0) | (0,0,0,1)<br>(0,0,0,2)<br>(0,0,1,0)<br>(0,0,1,1) |
| 13 | (0,0,0,0)<br>(0,0,0,2)<br>(0,0,1,0)<br>(0,0,1,2) | N/A | N/A | (0,0,0,0)<br>(0,0,0,1)<br>(0,0,0,2)<br>(1,0,0,1) | N/A | N/A | (0,0,0,0)<br>(0,0,0,1)<br>(0,0,0,2)<br>(0,0,1,1) |
| 14 | (0,0,0,0)<br>(0,0,0,1)<br>(0,0,1,0)<br>(0,0,1,1) | N/A | N/A | (0,0,0,0)<br>(0,0,0,1)<br>(0,0,0,2)<br>(1,0,0,0) | N/A | N/A | (0,0,0,0)<br>(0,0,0,2)<br>(0,0,1,0)<br>(0,0,1,1) |
| 15 | (0,0,0,0)<br>(0,0,0,1)<br>(0,0,0,2)<br>(0,0,1,1)<br>(0,0,1,2) | (0,0,0,0)<br>(0,0,0,1)<br>(0,0,1,0)<br>(0,0,1,1)<br>(1,0,0,1) | (0,0,0,0)<br>(0,0,1,0)<br>(1,0,0,0)<br>(1,0,1,0)<br>(2,0,0,0) | (0,0,0,0)<br>(0,0,0,1)<br>(0,0,0,2)<br>(1,0,0,1)<br>(1,0,0,2) | (0,0,0,0)<br>(0,0,0,1)<br>(1,0,0,0)<br>(1,0,0,1)<br>(2,0,0,1) | (0,0,0,0)<br>(1,0,0,0)<br>(2,0,0,0)<br>(3,0,0,0)<br>(4,0,0,0) | (0,0,0,0)<br>(0,0,0,1)<br>(0,0,0,2)<br>(0,0,1,0)<br>(0,0,1,1) |

FIG. 13 (PRIOR ART)

| | | | | | | | |
|---|---|---|---|---|---|---|---|
| 16 | (0,0,0,1)<br>(0,0,0,2)<br>(0,0,1,0)<br>(0,0,1,1)<br>(0,0,1,2) | (0,0,0,0)<br>(0,0,0,1)<br>(0,0,1,0)<br>(0,0,1,1)<br>(1,0,1,1) | (0,0,0,0)<br>(0,0,1,0)<br>(1,0,0,0)<br>(1,0,1,0)<br>(2,0,1,0) | (0,0,0,0)<br>(0,0,0,1)<br>(0,0,0,2)<br>(1,0,0,0)<br>(1,0,0,2) | (0,0,0,0)<br>(0,0,0,1)<br>(1,0,0,0)<br>(1,0,0,1)<br>(2,0,0,0) | N/A | N/A |
| 17 | (0,0,0,0)<br>(0,0,0,1)<br>(0,0,0,2)<br>(0,0,1,0)<br>(0,0,1,2) | (0,0,0,0)<br>(0,0,0,1)<br>(0,0,1,0)<br>(0,0,1,1)<br>(1,0,0,0) | N/A | (0,0,0,0)<br>(0,0,0,1)<br>(0,0,0,2)<br>(1,0,0,0)<br>(1,0,0,1) | N/A | N/A | N/A |
| 18 | (0,0,0,0)<br>(0,0,0,1)<br>(0,0,0,2)<br>(0,0,1,0)<br>(0,0,1,1)<br>(0,0,1,2) | (0,0,0,0)<br>(0,0,0,1)<br>(0,0,1,0)<br>(0,0,1,1)<br>(1,0,0,1)<br>(1,0,1,1) | (0,0,0,0)<br>(0,0,1,0)<br>(1,0,0,0)<br>(1,0,1,0)<br>(2,0,0,0)<br>(2,0,1,0) | (0,0,0,0)<br>(0,0,0,1)<br>(0,0,0,2)<br>(1,0,0,0)<br>(1,0,0,1)<br>(1,0,0,2) | (0,0,0,0)<br>(0,0,0,1)<br>(1,0,0,0)<br>(1,0,0,1)<br>(2,0,0,0)<br>(2,0,0,1) | (0,0,0,0)<br>(1,0,0,0)<br>(2,0,0,0)<br>(3,0,0,0)<br>(4,0,0,0)<br>(5,0,0,0) | (0,0,0,0)<br>(0,0,0,1)<br>(0,0,0,2)<br>(0,0,1,0)<br>(0,0,1,1)<br>(1,0,0,2) |
| 19 | N/A | (0,0,0,0)<br>(0,0,0,1)<br>(0,0,1,0)<br>(0,0,1,1)<br>(1,0,0,0)<br>(1,0,1,0) | N/A | N/A | N/A | N/A | (0,0,0,0)<br>(0,0,0,1)<br>(0,0,0,2)<br>(0,0,1,0)<br>(0,0,1,1)<br>(1,0,1,1) |
| 20 / 30 | (0,1,0,1) | (0,1,0,0) | N/A | (0,1,0,1) | (0,1,0,0) | N/A | (0,1,0,1) |
| 21 / 31 | (0,2,0,1) | (0,2,0,0) | N/A | (0,2,0,1) | (0,2,0,0) | N/A | (0,2,0,1) |
| 22 / 32 | (0,1,1,1) | (0,1,1,0) | N/A | N/A | N/A | N/A | (0,1,1,0) |
| 23 / 33 | (0,0,0,1) | (0,0,0,0) | N/A | (0,0,0,1) | (0,0,0,0) | N/A | (0,0,0,1) |
| 24 / 34 | (0,0,1,1) | (0,0,1,0) | N/A | N/A | N/A | N/A | (0,0,1,0) |
| 25 / 35 | (0,0,0,1)<br>(0,0,1,1) | (0,0,0,0)<br>(0,0,1,0) | N/A | (0,0,0,1)<br>(1,0,0,1) | (0,0,0,0)<br>(1,0,0,0) | N/A | (0,0,0,1)<br>(0,0,1,0) |
| 26 / 36 | (0,0,0,1)<br>(0,0,1,1)<br>(1,0,0,1) | (0,0,0,0)<br>(0,0,1,0)<br>(1,0,0,0) | N/A | (0,0,0,1)<br>(1,0,0,1)<br>(2,0,0,1) | (0,0,0,0)<br>(1,0,0,0)<br>(2,0,0,0) | N/A | (0,0,0,1)<br>(0,0,1,0)<br>(1,0,0,1) |
| 27 / 37 | (0,0,0,1)<br>(0,0,1,1)<br>(1,0,0,1)<br>(1,0,1,1) | (0,0,0,0)<br>(0,0,1,0)<br>(1,0,0,0)<br>(1,0,1,0) | N/A | (0,0,0,1)<br>(1,0,0,1)<br>(2,0,0,1)<br>(3,0,0,1) | (0,0,0,0)<br>(1,0,0,0)<br>(2,0,0,0)<br>(3,0,0,0) | N/A | (0,0,0,1)<br>(0,0,1,0)<br>(1,0,0,1)<br>(1,0,1,0) |
| 28 / 38 | (0,0,0,1)<br>(0,0,1,1)<br>(1,0,0,1)<br>(1,0,1,1)<br>(2,0,0,1) | (0,0,0,0)<br>(0,0,1,0)<br>(1,0,0,0)<br>(1,0,1,0)<br>(2,0,0,0) | N/A | (0,0,0,1)<br>(1,0,0,1)<br>(2,0,0,1)<br>(3,0,0,1)<br>(4,0,0,1) | (0,0,0,0)<br>(1,0,0,0)<br>(2,0,0,0)<br>(3,0,0,0)<br>(4,0,0,0) | N/A | (0,0,0,1)<br>(0,0,1,0)<br>(1,0,0,1)<br>(1,0,1,0)<br>(2,0,0,1) |

FIG. 13 CONT'D. (PRIOR ART)

| | | | | | | | |
|---|---|---|---|---|---|---|---|
| 29/39 | (0,0,0,1)<br>(0,0,1,1)<br>(1,0,0,1)<br>(1,0,1,1)<br>(2,0,0,1)<br>(2,0,1,1) | (0,0,0,0)<br>(0,0,1,0)<br>(1,0,0,0)<br>(1,0,1,0)<br>(2,0,0,0)<br>(2,0,1,0) | N/A | (0,0,0,1)<br>(1,0,0,1)<br>(2,0,0,1)<br>(3,0,0,1)<br>(4,0,0,1)<br>(5,0,0,1) | (0,0,0,0)<br>(1,0,0,0)<br>(2,0,0,0)<br>(3,0,0,0)<br>(4,0,0,0)<br>(5,0,0,0) | N/A | (0,0,0,1)<br>(0,0,1,0)<br>(1,0,0,1)<br>(1,0,1,0)<br>(2,0,0,1)<br>(2,0,1,0) |
| 40 | (0,1,0,0) | N/A | N/A | (0,1,0,0) | N/A | N/A | (0,1,0,0) |
| 41 | (0,2,0,0) | N/A | N/A | (0,2,0,0) | N/A | N/A | (0,2,0,0) |
| 42 | (0,1,1,0) | N/A | N/A | N/A | N/A | N/A | N/A |
| 43 | (0,0,0,0) | N/A | N/A | (0,0,0,0) | N/A | N/A | (0,0,0,0) |
| 44 | (0,0,1,0) | N/A | N/A | N/A | N/A | N/A | N/A |
| 45 | (0,0,0,0)<br>(0,0,1,0) | N/A | N/A | (0,0,0,0)<br>(1,0,0,0) | N/A | N/A | (0,0,0,0)<br>(1,0,0,0) |
| 46 | (0,0,0,0)<br>(0,0,1,0)<br>(1,0,0,0) | N/A | N/A | (0,0,0,0)<br>(1,0,0,0)<br>(2,0,0,0) | N/A | N/A | (0,0,0,0)<br>(1,0,0,0)<br>(2,0,0,0) |
| 47 | (0,0,0,0)<br>(0,0,1,0)<br>(1,0,0,0)<br>(1,0,1,0) | N/A | N/A | (0,0,0,0)<br>(1,0,0,0)<br>(2,0,0,0)<br>(3,0,0,0) | N/A | N/A | (0,0,0,0)<br>(1,0,0,0)<br>(2,0,0,0)<br>(3,0,0,0) |
| 48 | (0,1,0,*) | (0,1,0,*) | (0,1,0,*) | (0,1,0,*) | (0,1,0,*) | (0,1,0,*) | (0,1,0,*) |
| 49 | (0,2,0,*) | (0,2,0,*) | (0,2,0,*) | (0,2,0,*) | (0,2,0,*) | (0,2,0,*) | (0,2,0,*) |
| 50 | (0,1,1,*) | (0,1,1,*) | (0,1,1,*) | N/A | N/A | N/A | (0,1,1,*) |
| 51 | (0,0,0,*) | (0,0,0,*) | (0,0,0,*) | (0,0,0,*) | (0,0,0,*) | (0,0,0,*) | (0,0,0,*) |
| 52 | (0,0,1,*) | (0,0,1,*) | (0,0,1,*) | N/A | N/A | N/A | (0,0,1,*) |
| 53 | (0,0,0,*)<br>(0,0,1,*) | (0,0,0,*)<br>(0,0,1,*) | (0,0,0,*)<br>(0,0,1,*) | (0,0,0,*)<br>(1,0,0,*) | (0,0,0,*)<br>(1,0,0,*) | (0,0,0,*)<br>(1,0,0,*) | (0,0,0,*)<br>(0,0,1,*) |
| 54 | (0,0,0,*)<br>(0,0,1,*)<br>(1,0,0,*) | (0,0,0,*)<br>(0,0,1,*)<br>(1,0,0,*) | (0,0,0,*)<br>(0,0,1,*)<br>(1,0,0,*) | (0,0,0,*)<br>(1,0,0,*)<br>(2,0,0,*) | (0,0,0,*)<br>(1,0,0,*)<br>(2,0,0,*) | (0,0,0,*)<br>(1,0,0,*)<br>(2,0,0,*) | (0,0,0,*)<br>(0,0,1,*)<br>(1,0,0,*) |
| 55 | (0,0,0,*)<br>(0,0,1,*)<br>(1,0,0,*)<br>(1,0,1,*) | (0,0,0,*)<br>(0,0,1,*)<br>(1,0,0,*)<br>(1,0,1,*) | (0,0,0,*)<br>(0,0,1,*)<br>(1,0,0,*)<br>(1,0,1,*) | (0,0,0,*)<br>(1,0,0,*)<br>(2,0,0,*)<br>(3,0,0,*) | (0,0,0,*)<br>(1,0,0,*)<br>(2,0,0,*)<br>(3,0,0,*) | (0,0,0,*)<br>(1,0,0,*)<br>(2,0,0,*)<br>(3,0,0,*) | (0,0,0,*)<br>(0,0,1,*)<br>(1,0,0,*)<br>(1,0,1,*) |
| 56 | (0,0,0,*)<br>(0,0,1,*)<br>(1,0,0,*)<br>(1,0,1,*)<br>(2,0,0,*) | (0,0,0,*)<br>(0,0,1,*)<br>(1,0,0,*)<br>(1,0,1,*)<br>(2,0,0,*) | (0,0,0,*)<br>(0,0,1,*)<br>(1,0,0,*)<br>(1,0,1,*)<br>(2,0,0,*) | (0,0,0,*)<br>(1,0,0,*)<br>(2,0,0,*)<br>(3,0,0,*)<br>(4,0,0,*) | (0,0,0,*)<br>(1,0,0,*)<br>(2,0,0,*)<br>(3,0,0,*)<br>(4,0,0,*) | (0,0,0,*)<br>(1,0,0,*)<br>(2,0,0,*)<br>(3,0,0,*)<br>(4,0,0,*) | (0,0,0,*)<br>(0,0,1,*)<br>(1,0,0,*)<br>(1,0,1,*)<br>(2,0,0,*) |

FIG. 13 CONT'D. (PRIOR ART)

| 57 | (0,0,0,*) (0,0,1,*) (1,0,0,*) (1,0,1,*) (2,0,0,*) (2,0,1,*) | (0,0,0,*) (0,0,1,*) (1,0,0,*) (1,0,1,*) (2,0,0,*) (2,0,1,*) | (0,0,0,*) (0,0,1,*) (1,0,0,*) (1,0,1,*) (2,0,0,*) (2,0,1,*) | (0,0,0,*) (1,0,0,*) (2,0,0,*) (3,0,0,*) (4,0,0,*) (5,0,0,*) | (0,0,0,*) (1,0,0,*) (2,0,0,*) (3,0,0,*) (4,0,0,*) (5,0,0,*) | (0,0,0,*) (1,0,0,*) (2,0,0,*) (3,0,0,*) (4,0,0,*) (5,0,0,*) | (0,0,0,*) (0,0,1,*) (1,0,0,*) (1,0,1,*) (2,0,0,*) (2,0,1,*) |
|---|---|---|---|---|---|---|---|
| 58 | N/A | N/A | N/A | N/A | N/A | N/A | N/A |
| 59 | N/A | N/A | N/A | N/A | N/A | N/A | N/A |
| 60 | N/A | N/A | N/A | N/A | N/A | N/A | N/A |
| 61 | N/A | N/A | N/A | N/A | N/A | N/A | N/A |
| 62 | N/A | N/A | N/A | N/A | N/A | N/A | N/A |
| 63 | N/A | N/A | N/A | N/A | N/A | N/A | N/A |
| NOTE: * UpPTS | | | | | | | |

FIG. 13 CONT'D. (PRIOR ART)

| Preamble format | $N_{ZC}$ |
|---|---|
| 0 – 3 | 839 |
| 4 | 139 |

FIG. 14 (PRIOR ART)

| zeroCorrelationZoneConfig | $N_{CS}$ value | |
| --- | --- | --- |
| | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | – |

FIG. 15 (PRIOR ART)

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

FIG. 16 (PRIOR ART)

| Logical root sequence number | Physical root sequence number $u$ (in increasing order of the corresponding logical sequence number) |
|---|---|
| 0–23 | 129, 710, 140, 699, 120, 719, 210, 629, 168, 671, 84, 755, 105, 734, 93, 746, 70, 769, 60, 779 2, 837, 1, 838 |
| 24–29 | 56, 783, 112, 727, 148, 691 |
| 30–35 | 80, 759, 42, 797, 40, 799 |
| 36–41 | 35, 804, 73, 766, 146, 693 |
| 42–51 | 31, 808, 28, 811, 30, 809, 27, 812, 29, 810 |
| 52–63 | 24, 815, 48, 791, 68, 771, 74, 765, 178, 661, 136, 703 |
| 64–75 | 86, 753, 78, 761, 43, 796, 39, 800, 20, 819, 21, 818 |
| 76–89 | 95, 744, 202, 637, 190, 649, 181, 658, 137, 702, 125, 714, 151, 688 |
| 90–115 | 217, 622, 128, 711, 142, 697, 122, 717, 203, 636, 118, 721, 110, 729, 89, 750, 103, 736, 61, 778, 55, 784, 15, 824, 14, 825 |
| 116–135 | 12, 827, 23, 816, 34, 805, 37, 802, 46, 793, 207, 632, 179, 660, 145, 694, 130, 709, 223, 616 |
| 136–167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168–203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204–263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264–327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328–383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384–455 | 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456–513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514–561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |

FIG. 17 (PRIOR ART)

| | |
|---|---|
| 562–629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630–659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660–707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708–729 | 346, 493, 339, 500, 351, 488, 306, 533, 289, 550, 400, 439, 378, 461, 374, 465, 415, 424, 270, 569, 241, 598 |
| 730–751 | 231, 608, 260, 579, 268, 571, 276, 563, 409, 430, 398, 441, 290, 549, 304, 535, 308, 531, 358, 481, 316, 523 |
| 752–765 | 293, 546, 288, 551, 284, 555, 368, 471, 253, 586, 256, 583, 263, 576 |
| 766–777 | 242, 597, 274, 565, 402, 437, 383, 456, 357, 482, 329, 510 |
| 778–789 | 317, 522, 307, 532, 286, 553, 287, 552, 266, 573, 261, 578 |
| 790–795 | 236, 603, 303, 536, 356, 483 |
| 796–803 | 355, 484, 405, 434, 404, 435, 406, 433 |
| 804–809 | 235, 604, 267, 572, 302, 537 |
| 810–815 | 309, 530, 265, 574, 233, 606 |
| 816–819 | 367, 472, 296, 543 |
| 820–837 | 336, 503, 305, 534, 373, 466, 280, 559, 279, 560, 419, 420, 240, 599, 258, 581, 229, 610 |

FIG. 17 CONT'D. (PRIOR ART)

| Logical root sequence number | Physical root sequence number $u$ (in increasing order of the corresponding logical sequence number) | | | | | | | | | | | | | | | | | | | |
|---|---|---|---|---|---|---|---|---|---|---|---|---|---|---|---|---|---|---|---|---|
| 0 – 19 | 1 | 138 | 2 | 137 | 3 | 136 | 4 | 135 | 5 | 134 | 6 | 133 | 7 | 132 | 8 | 131 | 9 | 130 | 10 | 129 |
| 20 – 39 | 11 | 128 | 12 | 127 | 13 | 126 | 14 | 125 | 15 | 124 | 16 | 123 | 17 | 122 | 18 | 121 | 19 | 120 | 20 | 119 |
| 40 – 59 | 21 | 118 | 22 | 117 | 23 | 116 | 24 | 115 | 25 | 114 | 26 | 113 | 27 | 112 | 28 | 111 | 29 | 110 | 30 | 109 |
| 60 – 79 | 31 | 108 | 32 | 107 | 33 | 106 | 34 | 105 | 35 | 104 | 36 | 103 | 37 | 102 | 38 | 101 | 39 | 100 | 40 | 99 |
| 80 – 99 | 41 | 98 | 42 | 97 | 43 | 96 | 44 | 95 | 45 | 94 | 46 | 93 | 47 | 92 | 48 | 91 | 49 | 90 | 50 | 89 |
| 100 – 119 | 51 | 88 | 52 | 87 | 53 | 86 | 54 | 85 | 55 | 84 | 56 | 83 | 57 | 82 | 58 | 81 | 59 | 80 | 60 | 79 |
| 120 – 137 | 61 | 78 | 62 | 77 | 63 | 76 | 64 | 75 | 65 | 74 | 66 | 73 | 67 | 72 | 68 | 71 | 69 | 70 | - | - |
| 138 – 837 | N/A | | | | | | | | | | | | | | | | | | | |

FIG. 18 (PRIOR ART)

| Preamble format | $\Delta f_{RA}$ | $\varphi$ |
|---|---|---|
| 0 – 3 | 1250 Hz | 7 |
| 4 | 7500 Hz | 2 |

FIG. 19 (PRIOR ART)

| Physical channel | Modulation schemes |
|---|---|
| PBCH | QPSK |

FIG. 20 (PRIOR ART)

| $l$ | Frame offset, slot and symbol number triplets $(i, n'_s, l)$ | |
|---|---|---|
| | Normal cyclic prefix | Extended cyclic prefix |
| 0 | (1,18,3), (1,19,0), (1,19,4), (0,0,4) | (1,18,3), (1,19,0), (1,19,5) |
| 1 | (1,18,4), (1,19,1), (1,19,5), (0,1,4) | (1,18,4), (1,19,1), (0,0,3) |
| 2 | (1,18,5), (1,19,2), (1,19,6), (0,1,5) | (1,18,5), (1,19,2), (0,1,4) |
| 3 | (1,18,6), (1,19,3), (0,0,3), (0,1,6) | (1,19,3), (1,19,4), (0,1,5) |

FIG. 21 (PRIOR ART)

| $l$ | Slot and symbol number pairs $(n'_s, l)$ | |
|---|---|---|
| | Normal cyclic prefix | Extended cyclic prefix |
| 0 | (0,3), (1,4), (10,3), (11,0), (11,4) | (0,3), (10,3), (11,0) |
| 1 | (0,4), (1,5), (10,4), (11,1), (11,5) | (0,4), (10,4), (11,1) |
| 2 | (0,5), (10,5), (11,2) | (0,5), (10,5), (11,2) |
| 3 | (0,6), (10,6), (11,3) | (1,4), (11,3), (11,4) |

| Number of bits | |
|---|---|
| 4 | For UEs configured by higher layers with *codebooksizeDetermination-r13* = 0, the 4-bit DAI further consists of a 2-bit counter DAI and a 2-bit total DAI.<br><br>- Counter DAI – 2 bits as defined in section 7.3 of [3]<br><br>- Total DAI – 2 bits as defined in section 7.3 of [3] |
| 2 | For UEs configured with no more than five DL cells, or for UEs configured by higher layers with *codebooksizeDetermination-r13* = 1, this field is present for FDD or TDD operation, for cases with TDD primary cell.<br><br>If the UL/DL configuration of all TDD serving cells is same and the UE is not configured to decode PDCCH with CRC scrambled by *eimta-RNTI*, then this field only applies to serving cell with UL/DL configuration 1-6<br><br>If at least two TDD serving cells have different UL/DL configurations or the UE is configured to decode PDCCH with CRC scrambled by *eimta-RNTI*, then this field applies to a serving cell with DL-reference UL/DL configuration 1-6 as defined in section 10.2 of [3] |
| 0 | For UEs configured with no more than five DL cells, or for UEs configured by higher layers with *codebooksizeDetermination-r13* = 1, this field is not present for FDD or TDD operation, for cases with FDD primary cell. |

FIG. 25 (PRIOR ART)

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

FIG. 26 (PRIOR ART)

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2). |
| DCI format 1A | Common | If the number of PBCH antenna ports is one, Single-antenna port, port 0 is used (see subclause 7.1.1), otherwise Transmit diversity (see subclause 7.1.2). |

FIG. 27 (PRIOR ART)

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2) |
| DCI format 1A | Common | If the number of PBCH antenna ports is one, Single-antenna port, port 0 is used (see subclause 7.1.1), otherwise Transmit diversity (see subclause 7.1.2) |

FIG. 28 (PRIOR ART)

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2) |
| DCI format 1A | Common | If the number of PBCH antenna ports is one, Single-antenna port, port 0 is used (see subclause 7.1.1), otherwise Transmit diversity (see subclause 7.1.2) |

FIG. 29 (PRIOR ART)

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2). |
| DCI format 1A | Common | If the number of PBCH antenna ports is one, Single-antenna port, port 0 is used (see subclause 7.1.1), otherwise Transmit diversity (see subclause 7.1.2). |

FIG. 30 (PRIOR ART)

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |

FIG. 31 (PRIOR ART)

| Mode 6 | DCI format 1A | Common and UE specific by C-RNTI | Transmit diversity (see subclause 7.1.2) |
|---|---|---|---|
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission, port 7 and 8 (see subclause 7.1.5A) or single-antenna port, port 7 or 8 (see subclause 7.1.1) |

FIG. 31 CONT'D. (PRIOR ART)

| | | | |
|---|---|---|---|
| Mode 9 | DCI format 1A | Common and UE specific by C-RNTI | • Non-MBSFN subframe: If the number of PBCH antenna ports is one, Single-antenna port, port 0 is used (see subclause 7.1.1), otherwise Transmit diversity (see subclause 7.1.2)<br>• MBSFN subframe: Single-antenna port, port 7 (see subclause 7.1.1) |
| | DCI format 2C | UE specific by C-RNTI | Up to 8 layer transmission, ports 7-14 (see subclause 7.1.5B) or single-antenna port, port 7, 8, 11, or 13 (see subclause 7.1.1) if UE is configured with higher layer parameter *dmrs-tableAlt*, single-antenna port, port 7 or 8 (see subclause 7.1.1) otherwise |
| Mode 10 | DCI format 1A | Common and UE specific by C-RNTI | • Non-MBSFN subframe: If the number of PBCH antenna ports is one, Single-antenna port, port 0 is used (see subclause 7.1.1), otherwise Transmit diversity (see subclause 7.1.2)<br>• MBSFN subframe: Single-antenna port, port 7 (see subclause 7.1.1) |
| | DCI format 2D | UE specific by C-RNTI | Up to 8 layer transmission, ports 7-14 (see subclause 7.1.5B) or single-antenna port, port 7, 8, 11, or 13 (see subclause 7.1.1) if UE is configured with higher layer parameter *dmrs-tableAlt*, single-antenna port, port 7 or 8 (see subclause 7.1.1) otherwise |

FIG. 31 CONT'D. (PRIOR ART)

| DCI format | Search Space | Transmission scheme of PDSCH corresponding to PDCCH |
|---|---|---|
| DCI format 1A | Common and UE specific by Temporary C-RNTI | If the number of PBCH antenna port is one, Single-antenna port, port 0 is used (see subclause 7.1.1), otherwise Transmit diversity (see subclause 7.1.2) |
| DCI format 1 | UE specific by Temporary C-RNTI | If the number of PBCH antenna port is one, Single-antenna port, port 0 is used (see subclause 7.1.1), otherwise Transmit diversity (see subclause 7.1.2) |

FIG. 32 (PRIOR ART)

| Value of schedulingInfoSIB1-BR-r13 | Number of PDSCH repetitions |
|---|---|
| 0 | N/A |
| 1 | 4 |
| 2 | 8 |
| 3 | 16 |
| 4 | 4 |
| 5 | 8 |
| 6 | 16 |
| 7 | 4 |
| 8 | 8 |
| 9 | 16 |
| 10 | 4 |
| 11 | 8 |
| 12 | 16 |
| 13 | 4 |
| 14 | 8 |
| 15 | 16 |
| 16 | 4 |
| 17 | 8 |
| 18 | 16 |
| 19-31 | Reserved |

FIG. 33 (PRIOR ART)

| System Bandwidth $N_{RB}^{DL}$ | RBG Size ($P$) |
|---|---|
| ≤10 | 1 |
| 11 – 26 | 2 |
| 27 – 63 | 3 |
| 64 – 110 | 4 |

FIG. 34 (PRIOR ART)

| System BW ($N_{RB}^{DL}$) | $N_{RB}^{step}$ DCI format 1C |
|---|---|
| 6-49 | 2 |
| 50-110 | 4 |

FIG. 35 (PRIOR ART)

| TDD UL/DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

FIG. 36 (PRIOR ART)

| Transmission mode | DCI format | Search Space | Transmission scheme of PUSCH corresponding to PDCCH |
|---|---|---|---|
| Mode 1 | DCI format 0 | Common and UE specific by C-RNTI | Single-antenna port, port 10 (see subclause 8.0.1) |
| Mode 2 | DCI format 0 | Common and UE specific by C-RNTI | Single-antenna port, port 10 (see subclause 8.0.1) |
| | DCI format 4 | UE specific by C-RNTI | Closed-loop spatial multiplexing (see subclause 8.0.2) |

FIG. 37 (PRIOR ART)

| DCI format | Search Space |
|---|---|
| DCI format 1A | Common and UE specific by C-RNTI |

FIG. 38 (PRIOR ART)

| DCI format | Search Space |
|---|---|
| DCI format 0 | Common |

FIG. 39 (PRIOR ART)

| DCI format | Search Space |
|---|---|
| DCI format 3/3A | Common |

FIG. 40 (PRIOR ART)

| DCI format | Search Space |
|---|---|
| DCI format 3/3A | Common |

FIG. 41 (PRIOR ART)

| Value of resource allocation field | Allocated resource blocks |
|---|---|
| '000' | 0 |
| '001' | 1 |
| '010' | 2 |
| '011' | 3 |
| '100' | 4 |
| '101' | 5 |
| '110' | 0 and 1 |
| '111' | 2 and 3 |

FIG. 42 (PRIOR ART)

| Search space $S_k^{(L)}$ | | | Number of PDCCH candidates $M^{(L)}$ |
|---|---|---|---|
| Type | Aggregation level $L$ | Size [in CCEs] | |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

FIG. 43 (PRIOR ART)

| Search space $S_k^{(L)}$ | | | Number of PDCCH candidates $M^{(L)}$ in first slot | Number of PDCCH candidates $M^{(L)}$ in second slot |
|---|---|---|---|---|
| Type | Aggregation level $L$ | Size [in CCEs] | | |
| UE-specific | 1 | 6 | 6 | 6 |
|  | 2 | 12 | 6 | 6 |
|  | 4 | 8 | 2 | 2 |
|  | 8 | 16 | 2 | 2 |

FIG. 44 (PRIOR ART)

| pdcch-candidateReductions | Value of $a$ |
|---|---|
| 0 | 0 |
| 1 | 0.33 |
| 2 | 0.66 |
| 3 | 1 |

FIG. 45 (PRIOR ART)

METHOD AND APPARATUS FOR DETERMINING NUMEROLOGY BANDWIDTH IN A WIRELESS COMMUNICATION SYSTEM

CROSS-REFERENCE TO RELATED APPLICATIONS

The present Application claims the benefit of U.S. Provisional Patent Application Ser. No. 62/374,354 filed on Aug. 12, 2016, the entire disclosure of which is incorporated herein in its entirety by reference.

FIELD

This disclosure generally relates to wireless communication networks, and more particularly, to a method and apparatus for determining numerology bandwidth in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for determining numerology bandwidth in a wireless communication system are disclosed herein. In one method, a user equipment receives information for a numerology. The information comprises a frequency location and a bandwidth. The UE derives a resource allocation for the numerology based on the frequency location and the bandwidth.

BRIEF DESCRIPTION OF THE DRAWINGS

FIG. 6 is a reproduction of Table 6.2.3-1 from 3GPP TR 36.211 V13.1.0 providing physical resource block parameters.

FIG. 7 is a reproduction of Table 6.12-1 from 3GPP TR 36.211 V13.1.0 providing Orthogonal Frequency Division Multiplexing (OFDM) parameters.

FIG. 8 is a reproduction of FIG. 6.13-1 from 3GPP TR 36.211 V13.1.0 illustrating downlink modulation.

FIG. 9 is a reproduction of FIG. 5.7.1-1 from 3GPP TR 36.211 V13.1.0 illustrating a random access preamble format.

FIG. 10 is a reproduction of Table 5.7.1-1 from 3GPP TR 36.211 V13.1.0 providing random access preamble parameters.

FIG. 11 is a reproduction of Table 5.7.1-2 from 3 GPP TR 36.211 V13.1.0 providing random access configurations for preamble formats 0-3.

FIG. 12 is a reproduction of Table 5.7.1-3 from 3GPP TR 36.211 V13.1.0 providing frame structure type 2 random access configurations for preamble formats 0-4.

FIG. 13 is a reproduction of Table 5.7.1-4 from 3GPP TR 36.211 V13.1.0 providing frame structure type 2 random access configurations for preamble formats 0-4.

FIG. 14 is a reproduction of Table 5.7.2-1 from 3GPP TR 36.211 V13.1.0 providing a random access sequence length.

FIG. 15 is a reproduction of Table 5.7.2-2 from 3GPP TR 36.211 V13.1.0 providing $N_{CS}$ for preamble generation (preamble formats 0-3).

FIG. 16 is a reproduction of Table 5.7.2-3 from 3GPP TR 36.211 V13.1.0 providing $N_{CS}$ for preamble generation (preamble format 4).

FIG. 17 is a reproduction of Table 5.7.2-4 from 3GPP TR 36.211 V13.1.0 providing Root Zadoff-Chu sequence order for preamble formats 0-3.

FIG. 18 is a reproduction of Table 5.7.2-5 from 3GPP TR 36.211 V13.1.0 providing Root Zadoff-Chu sequence order for preamble format 4.

FIG. 19 is a reproduction of Table 5.7.3-1 from 3GPP TR 36.211 V13.1.0 providing random access baseband parameters.

FIG. 20 is a reproduction of Table 6.6.2-1 from 3GPP TR 36.211 V13.1.0 providing PBCH modulation schemes.

FIG. 21 is a reproduction of Table 6.6.4-1 from 3GPP TR 36.211 V13.1.0 providing frame offset, slot and symbol number triplets for repetition of PBCH for frame structure type 1.

FIG. 22 is a reproduction of Table 6.6.4-2 from 3GPP TR 36.211 V13.1.0 providing slot and symbol number pairs for repetition of PBCH for frame structure type 2.

FIG. 25 is a reproduction of Table 5.3.3.1.2-2 from 3GPP TS 36.212 V13.1.0 providing a number of bits for downlink assignment index.

FIG. 26 is a reproduction of Table 7-1 from 3GPP TS 36.213 V13.1.1 providing a maximum number of DL HARQ processes for TDD.

FIG. 27 is a reproduction of Table 7.1-1 from 3GPP TS 36.213 V13.1.1 providing PDCCH and PDSCH configured by SI-RNTI.

FIG. 28 is a reproduction of Table 7.1-2 from 3GPP TS 36.213 V13.1.1 providing PDCCH and PDSCH configured by P-RNTI.

FIG. 29 is a reproduction of Table 7.1-3 from 3GPP TS 36.213 V13.1.1 providing PDCCH and PDSCH configured by RA-RNTI.

FIG. 30 is a reproduction of Table 7.1-4 from 3GPP TS 36.213 V13.1.1 providing PDCCH and PDSCH configured by G-RNTI or SC-RNTI.

FIG. 31 is a reproduction of Table 7.1-5 from 3GPP TS 36.213 V13.1.1 providing PDCCH and PDSCH configured by C-RNTI.

FIG. 32 is a reproduction of Table 7.1-7 from 3GPP TS 36.213 V13.1.1 providing PDCCH and PDSCH configured by Temporary C-RNTI.

FIG. 33 is a reproduction of Table 7.1.6-1 from 3GPP TS 36.213 V13.1.1 providing number repetitions for PDSCH carrying SystemInformationBlockType1-BR for BL/CE UE.

FIG. 34 is a reproduction of Table 7.1.6.1-1 from 3GPP TS 36.213 V13.1.1 providing Type 0 resource allocation RBG size vs. Downlink System Bandwidth.

FIG. 35 is a reproduction of Table 7.1.6.3-1 from 3GPP TS 36.213 V13.1.1 providing $N_{RB}^{step}$ values vs. Downlink System Bandwidth.

FIG. 36 is a reproduction of Table 8-1 from 3GPP TS 36.213 V13.1.1 providing a number of synchronous UL HARQ processes for TDD.

FIG. 37 is a reproduction of Table 8-3 from 3GPP TS 36.213 V13.1.1 providing PDCCH and PUSCH configured by Temporary C-RNTI.

FIG. 38 is a reproduction of Table 8-4 from 3GPP TS 36.213 V13.1.1 providing PDCCH configured as a "PDCCH order" to initiate random access procedure.

FIG. 39 is a reproduction of Table 8-6 from 3GPP TS 36.213 V13.1.1 providing PDCCH configured by Temporary C-RNTI.

FIG. 40 is a reproduction of Table 8-7 from 3GPP TS 36.213 V13.1.1 providing PDCCH configured by TPC-PUCCH-RNTI.

FIG. 41 is a reproduction of Table 8-8 from 3GPP TS 36.213 V13.1.1 providing PDCCH configured by TPC-PUSCH-RNTI.

FIG. 42 is a reproduction of Table 8.1.3-1 from 3GPP TS 36.213 V13.1.1 providing resource block(s) allocation for BL/CE UE configured with CEModeB.

FIG. 43 is a reproduction of Table 9.1.1-1 from 3GPP TS 36.213 V13.1.1 providing PDCCH candidates monitored by a UE.

FIG. 44 is a reproduction of Table 9.1.1-1A from 3GPP TS 36.213 V13.1.1 providing PDCCH UE-specific search space candidates monitored by a UE on LAA Scell.

FIG. 45 is a reproduction of Table 9.1.1-2 from 3GPP TS 36.213 V13.1.1 providing scaling factor for PDCCH candidates reduction.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: RP-150465, "New SI proposal: Study on Latency reduction techniques for LTE"; TR 36.211 V13.1.0, "E-UTRA Study on latency reduction techniques for LTE (Release 13)"; TS 36.331, V13.2.0, "Evolved Universal Terrestrial Radio Access (E-UTRA); Radio Resource Control (RRC); Protocol specification (Release 13)"; TS 36.212 v13.1.0, "Evolved Universal Terrestrial Radio Access (E-UTRA); Multiplexing and channel coding (Release 13)"; and TS 36.213 v13.1.1, "E-UTRA Physical layer procedures (Release 13)". The standards and documents listed above are hereby expressly incorporated by reference in their entirety.

Figure 1:
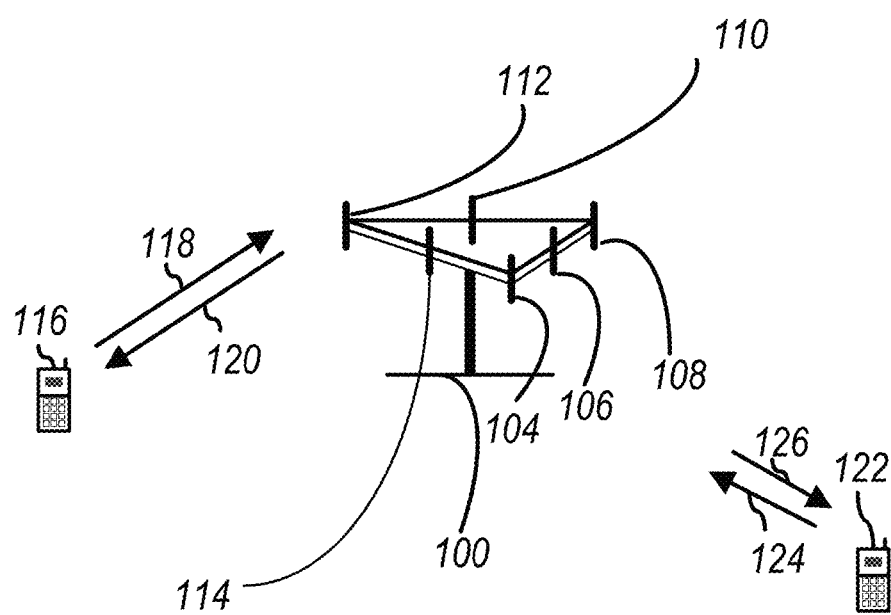
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
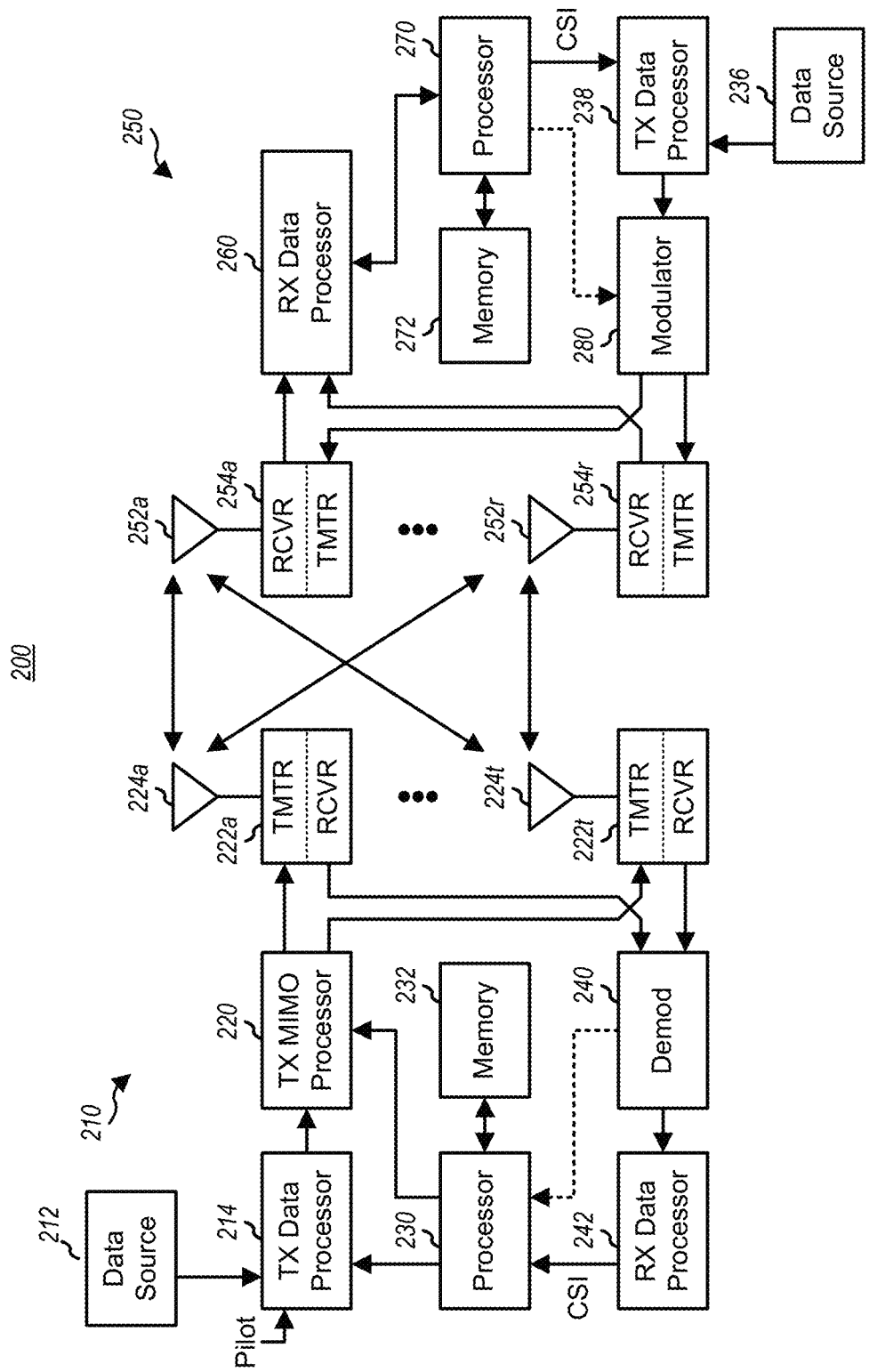
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
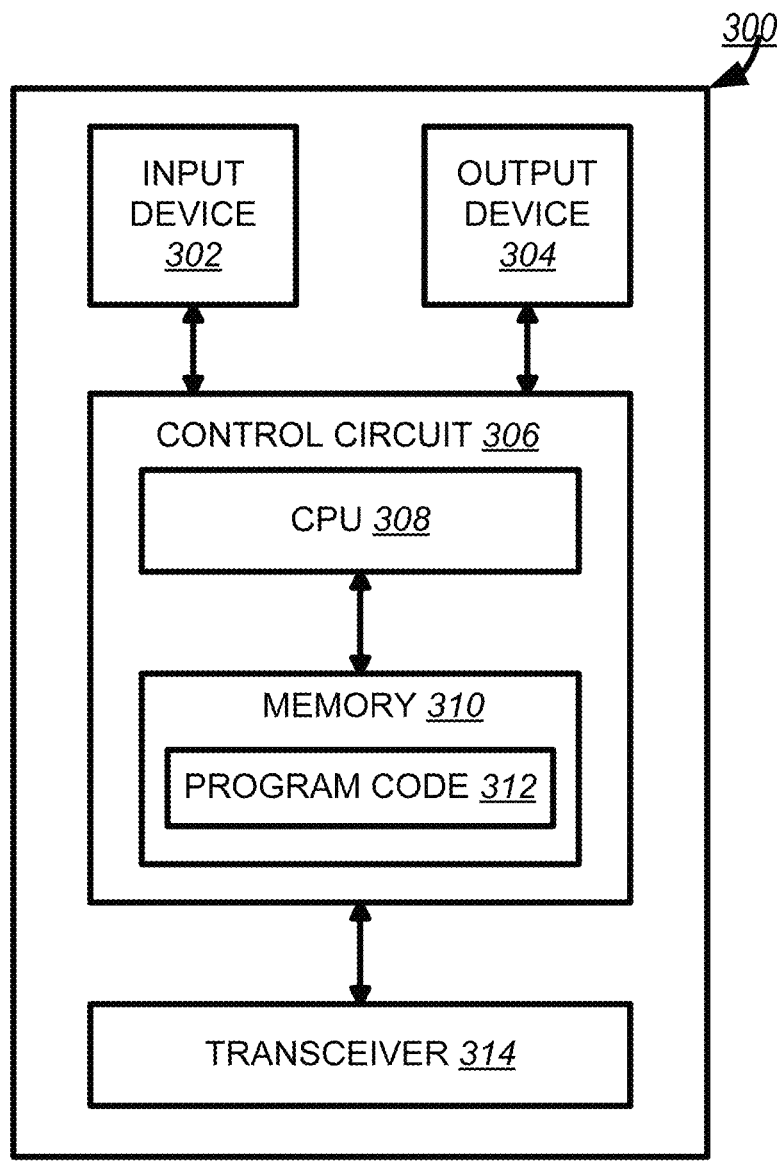
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
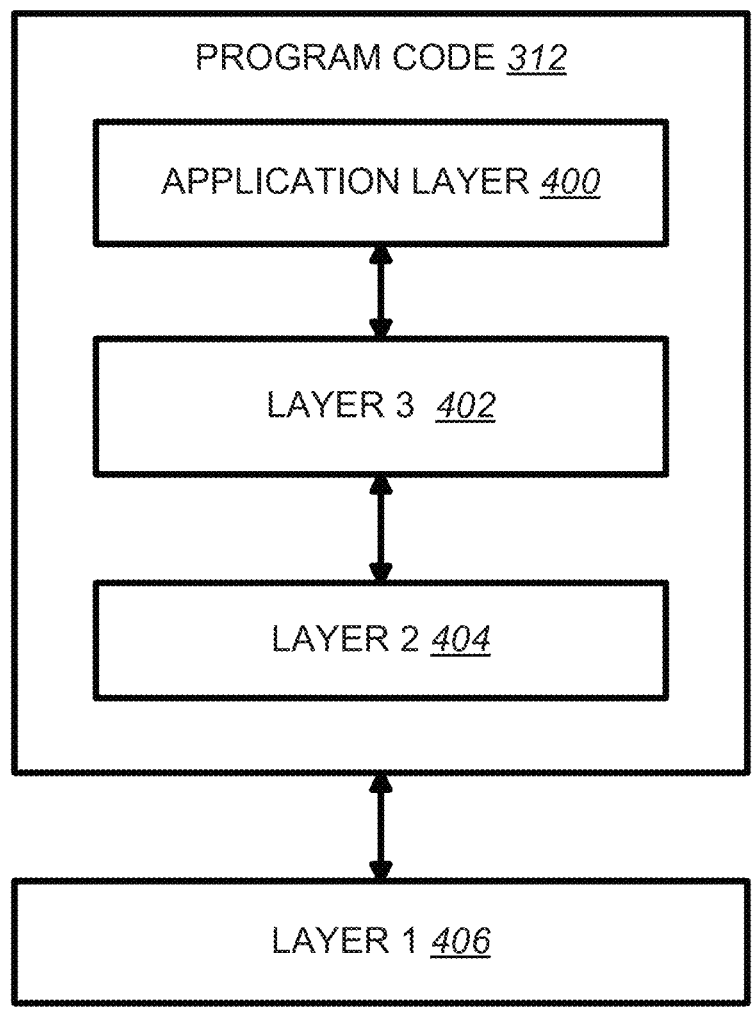
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Packet data latency is one of the important metrics for performance evaluation. Reducing packet data latency improves the system performance. In 3GPP RP-150465, the study item aims to investigate and standardize some techniques of latency reduction.

According to 3GPP RP-150465, the objective is to study enhancements to the E-UTRAN radio system in order to significantly reduce the packet data latency over the LTE Uu air interface for an active UE and significantly reduce the packet data transport round trip latency for UEs that have been inactive for a longer period (in connected state). The study area includes resource efficiency, including air interface capacity, battery lifetime, control channel resources, specification impact and technical feasibility. Both Frequency Division Duplex (FDD) and Time Division Duplex (TDD) modes are considered.

According to 3GPP RP-150465, the two areas studied and documented are as follows:

Fast uplink access solutions

For active UEs and UEs that have been inactive a long time, but are kept in Radio Resource Control (RRC) Connected, the focus should be on reducing user plane latency for the scheduled Uplink (UL) transmission and getting a more resource efficient solution with protocol and signaling enhancements, compared to the pre-scheduling solutions allowed by the standard today, both with and without preserving the current Transmission Time Interval (TTI) length and processing times TTI shortening and reduced processing times Assess specification impact and study feasibility and performance of TTI lengths between 0.5 ms and one Orthogonal Frequency Division Multiplexing (OFDM) symbol, taking into account impact on reference signals and physical layer control signaling TTI shortening and processing time reduction can be considered as an effective solution for reducing latency as the time unit for transmission can be reduced, for example, from 1 ms (14 OFDM) symbol to 1-7 OFDM symbols and the delay caused by decoding can be reduced as well. Another benefit of shortening TTI length is to support a finer granularity of transport block (TB) size so that unnecessary padding can be reduced. On the other hand, reducing the length of TTI may also have significant impact to current system design as the physical channels are developed based on a 1 ms structure. A shortened TTI is also called an sTTI.

3GPP RP-150465 discloses a frame structure used in New RAT (NR) for 5G that accommodates various types of requirements for time and frequency resource such as, for example, ultra-low latency (~0.5 ms) to delay-tolerant traffic for machine-type communication (MTC), high peak rate for enhanced mobile broadband (eMBB) to very low data rate for MTC. An important focus of this study is low latency aspect, e.g. short TTI, while another aspect of mixing/adapting different TTIs is also considered in the study. In addition to diverse services and requirements, forward compatibility is an important consideration in initial NR frame structure design as not all features of NR would be included in the beginning phase/release.

Reducing latency of a protocol is an important improvement between the different generations/releases. This can improve efficiency and meet new application requirements such as real-time service. One method adopted to reduce latency is to reduce the length of TTIs, from 10 ms in 3G to 1 ms in LTE. In the context of LTE-A Pro in REl-14, SI/WI was proposed to reduce the TTI to sub-ms level (e.g., 0.1-0.5 ms) by reducing the number of OFDM symbols within a TTI without changing any existing LTE numerology (i.e., there is only one numerology in LTE). This improvement can be used to solve the TCP slow start issue, extremely low but frequent traffic, or to meet foreseen ultra-low latency in NR to some extent. Processing time reduction is another consideration to reduce the latency. The study has not yet concluded that whether short TTI and short processing time always come together. The study suffers from some limitation, as the method adopted should preserve backward compatibility, e.g. the existence of legacy control region. As disclosed in 3GPP TR 36.211 V13.1.0, a brief description of LTE numerology is quoted as follows:

6 Downlink 6.1 Overview

The smallest time-frequency unit for downlink transmission is denoted a resource element and is defined in clause 6.2.2.

A subset of the downlink subframes in a radio frame on a carrier supporting PDSCH transmission can be configured as MBSFN subframes by higher layers. Each MBSFN subframe is divided into a non-MBSFN region and an MBSFN region.

The non-MBSFN region spans the first one or two OFDM symbols in an MBSFN subframe where the length of the non-MBSFN region is given according to Subclause 6.7.

The MBSFN region in an MBSFN subframe is defined as the OFDM symbols not used for the non-MBSFN region.

For frame structure type 3, MBSFN configuration shall not be applied to downlink subframes in which at least one OFDM symbol is not occupied or discovery signal is transmitted.

Unless otherwise specified, transmission in each downlink subframe shall use the same cyclic prefix length as used for downlink subframe #0.

6.1.1 Physical Channels

A downlink physical channel corresponds to a set of resource elements carrying information originating from higher layers and is the interface defined between 3GPP TS 36.212 and the present document 3GPP TS 36.211.

The following downlink physical channels are defined:
Physical Downlink Shared Channel, PDSCH
Physical Broadcast Channel, PBCH
Physical Multicast Channel, PMCH
Physical Control Format Indicator Channel, PCFICH
Physical Downlink Control Channel, PDCCH
Physical Hybrid ARQ Indicator Channel, PHICH
Enhanced Physical Downlink Control Channel, EPDCCH
MTC Physical Downlink Control Channel, MPDCCH 6.1.2 Physical Signals A downlink physical signal corresponds to a set of resource elements used by the physical layer but does not carry information originating from higher layers. The following downlink physical signals are defined:
Reference signal
Synchronization signal
Discovery signal 6.2 Slot Structure and Physical Resource Elements 6.2.1 Resource Grid The transmitted signal in each slot is described by one or several resource grids of $N_{RB}^{DL} N_{sc}^{RB}$ subcarriers and $N_{symb}^{DL}$ OFDM symbols. The resource grid structure is illustrated in FIG. 6.2.2-1. The quantity $N_{RB}^{DL}$ depends on the downlink transmission bandwidth configured in the cell and shall fulfil $$N_{RB}^{min,DL} \leq N_{RB}^{DL} \leq N_{RB}^{max,DL}$$

where $N_{RB}^{DL}=6$ and $N_{RB}^{max,DL}=110$ are the smallest and largest downlink bandwidths, respectively, supported by the current version of this specification.

The set of allowed values for $N_{RB}^{DL}$ is given by 3GPP TS 36.104. The number of OFDM symbols in a slot depends on the cyclic prefix length and subcarrier spacing configured and is given in FIG. 6 (a reproduction of Table 6.2.3-1 from 3GPP TR 36.211 V13.1.0).

An antenna port is defined such that the channel over which a symbol on the antenna port is conveyed can be inferred from the channel over which another symbol on the same antenna port is conveyed. For MBSFN reference signals, positioning reference signals, UE-specific reference signals associated with PDSCH and demodulation reference signals associated with EPDCCH, there are limits given below within which the channel can be inferred from one symbol to another symbol on the same antenna port. There is one resource grid per antenna port. The set of antenna ports supported depends on the reference signal configuration in the cell:

Cell-specific reference signals support a configuration of one, two, or four antenna ports and are transmitted on antenna ports p=0, p∈{0, 1}, and p∈{0, 1, 2, 3}, respectively.

MBSFN reference signals are transmitted on antenna port p=4. The channel over which a symbol on antenna port p=4 is conveyed can be inferred from the channel over which another symbol on the same antenna port is conveyed only if the two symbols correspond to subframes of the same MBSFN area.

UE-specific reference signals associated with PDSCH are transmitted on antenna port(s) p=5, p=7, p=8, or one or several of p∈{7, 8, 9, 10, 11, 12, 13, 14}. The channel over which a symbol on one of these antenna ports is conveyed can be inferred from the channel over which another symbol on the same antenna port is conveyed only if the two symbols are within the same subframe and in the same PRG when PRB bundling is used or in the same PRB pair when PRB bundling is not used.

Demodulation reference signals associated with EPDCCH are transmitted on one or several of p∈{107, 108, 109, 110}. The channel over which a symbol on one of these antenna ports is conveyed can be inferred from the channel over which another symbol on the same antenna port is conveyed only if the two symbols are in the same PRB pair.

Positioning reference signals are transmitted on antenna port p=6. The channel over which a symbol on antenna port p=6 is conveyed can be inferred from the channel over which another symbol on the same antenna port is conveyed only within one positioning reference signal occasion consisting of $N_{PRS}$ consecutive downlink subframes, where $N_{PRS}$ is configured by higher layers.

CSI reference signals support a configuration of one, two, four, eight, twelve, or sixteen antenna ports and are transmitted on antenna ports p=15, p=15, 16, p=15, . . ., 18, p=15, . . . , 22, p=15, . . . , 26 and p=15, . . . , 30, respectively.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay.

6.2.2 Resource Elements

Each element in the resource grid for antenna port p is called a resource element and is uniquely identified by the index pair (k,l) in a slot where k=0, . . . , $N_{RB}^{DL}N_{sc}^{RB}-1$ and l=0, . . . , $N_{symb}^{DL}-1$ are the indices in the frequency and time domains, respectively. Resource element (k,l) on antenna port p corresponds to the complex value $\alpha_{k,l}^{(p)}$.

When there is no risk for confusion, or no particular antenna port is specified, the index p may be dropped.

6.2.3 Resource Blocks

Resource blocks are used to describe the mapping of certain physical channels to resource elements. Physical and virtual resource blocks are defined.

A physical resource block is defined as $N_{symb}^{DL}$ consecutive OFDM symbols in the time domain and $N_{sc}^{RB}$ consecutive subcarriers in the frequency domain, where $N_{symb}^{DL}$ and $N_{sc}^{RB}$ are given by FIG. 6 (a reproduction of Table 6.2.3-1 from 3GPP TR 36.211 V13.1.0). A physical resource block thus consists of $N_{symb}^{DL} \times N_{sc}^{RB}$ resource elements, corresponding to one slot in the time domain and 180 kHz in the frequency domain.

Physical resource blocks are numbered from 0 to $N_{RB}^{DL}-1$ in the frequency domain. The relation between the physical resource block number $n_{PRB}$ in the frequency domain and resource elements (k,l) in a slot is given by $$n_{PRB} = \left\lfloor \frac{k}{N_{sc}^{RB}} \right\rfloor$$

A physical resource-block pair is defined as the two physical resource blocks in one subframe having the same physical resource-block number $n_{PRB}$.

A virtual resource block is of the same size as a physical resource block. Two types of virtual resource blocks are defined:

Virtual resource blocks of localized type

Virtual resource blocks of distributed type

For each type of virtual resource blocks, a pair of virtual resource blocks over two slots in a subframe is assigned together by a single virtual resource block number, $n_{VRB}$.

< . . . >

6.12 OFDM Baseband Signal Generation

The time-continuous signal $s_l^{(p)}(t)$ on antenna port p in OFDM symbol l in a downlink slot is defined by $$s_l^{(p)}(t) = \sum_{k=-\lfloor N_{RB}^{DL}N_{sc}^{RB}/2 \rfloor}^{-1} a_{k^{(-)},l}^{(p)} \cdot e^{j2\pi k \cdot \Delta f(t-N_{CP,l}T_s)} + \sum_{k=1}^{\lceil N_{RB}^{DL}N_{sc}^{RB}/2 \rceil} a_{k^{(+)},l}^{(p)} \cdot e^{j2\pi k \cdot \Delta f(t-N_{CP,l}T_s)}$$

for $0 \le t < (N_{CP,l}+N) \times T_s$ where $k^{(-)}=k+\lfloor N_{RB}^{DL}N_{sc}^{RB}/2 \rfloor$ and $k^{(+)}=k+\lfloor N_{RB}^{DL}N_{sc}^{RB}/2 \rfloor-1$. The variable N equals 2048 for $\Delta f=15$ kHz subcarrier spacing and 4096 for $\Delta f=7.5$ kHz subcarrier spacing. The OFDM symbols in a slot shall be transmitted in increasing order of l, starting with l=0, where OFDM symbol l>0 starts at time $\sum_{l'=0}^{l-1}(N_{CP,l'}+N)T_s$ within the slot. In case the first OFDM symbol(s) in a slot use normal cyclic prefix and the remaining OFDM symbols use extended cyclic prefix, the starting position the OFDM symbols with extended cyclic prefix shall be identical to those in a slot where all OFDM symbols use extended cyclic prefix. Thus there will be a part of the time slot between the two cyclic prefix regions where the transmitted signal is not specified.

FIG. 7 (a reproduction of Table 6.12-1 from 3GPP TR 36.211 V13.1.0) lists the value of $N_{CP,l}$ that shall be used. Note that different OFDM symbols within a slot in some cases have different cyclic prefix lengths.

6.13 Modulation and Upconversion

Modulation and upconversion to the carrier frequency of the complex-valued OFDM baseband signal for each antenna port is shown in FIG. 6.13-1. The filtering required prior to transmission is defined by the requirements in 3GPP TS 36.104.

In LTE, there is only one downlink (DL) numerology defined for initial access, which is 15 KHz subcarrier spacing and the signal and channel to be acquired during initial access is based on 15 KHz numerology. To access a cell, the UE may need to acquire some fundamental information. For example, the UE first acquires time/frequency synchronization of cell, which is done during cell search or cell selection/reselection. The time/frequency synchronization can be obtained by receiving a synchronization signal, such as a primary synchronization signal (PSS) or a secondary synchronization signal (SSS). During synchronization, the center frequency of a cell is known, and the subframe/frame boundary is obtained. When PSS or SSS are acquired, the Cyclic prefix (CP) of the cell (e.g., normal CP or extended CP) and the duplex mode of the cell (e.g. FDD or TDD) can be obtained. When the master information block (MIB) carried on physical broadcast channel (PBCH) is received, some fundamental system information such as the system frame number (SFN), system bandwidth, physical control channel related information can be obtained. UE would receive the DL control channel (e.g. PDCCH) on proper resource elements and with proper payload size according to the system bandwidth and can acquire some more system information required to access the cell in system information block (SIB), such as whether the cell can be access, UL bandwidth and frequency, random access parameter, and so on. UE then can perform random access and request the connection to the cell. After the connection set up is complete, UE would enter connected mode and be able to perform data transmission to the cell or perform data reception from the cell. The resource allocation for data reception and transmission is done according to system bandwidth (e.g. $N_{RB}^{DL}$ or $N_{RB}^{UL}$ in the following quotation) signaled in MIB or SIB. The following are quotations from 3GPP TR 36.211 V13.1.0, 3GPP TS 36.331, V13.2.0, 3GPP TS 36.212 v13.1.0, and 3GPP TS 36.213 v13.1.1 as follows:

Physical Random Access Channel 5.7.1 Time and Frequency Structure

Figure 5:
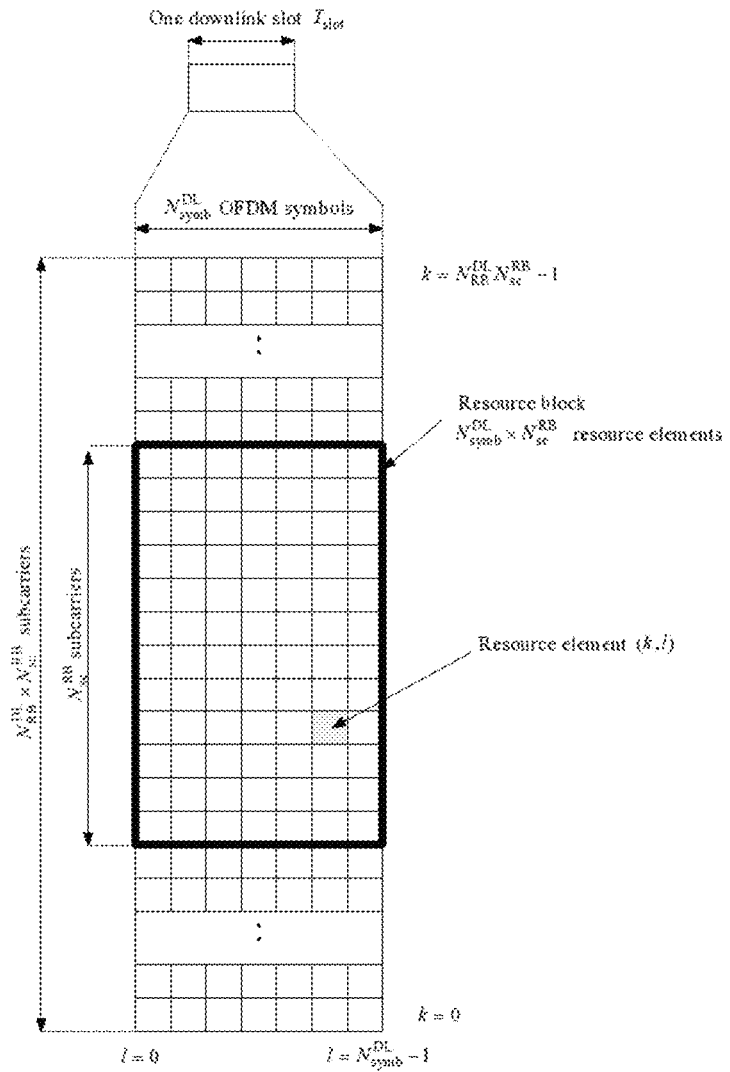
FIG. 5 is a reproduction of FIG. 6.2.2-1 from 3GPP TR 36.211 V13.1.0 illustrating a downlink resource grid.

The physical layer random access preamble, illustrated in FIG. 5.7.1-1, consists of a cyclic prefix of length $T_{CP}$ and a sequence part of length $T_{SEQ}$. The parameter values are listed in FIG. 10 (a reproduction of Table 5.7.1-1 from 3GPP TR 36.211 V13.1.0) and depend on the frame structure and the random access configuration. Higher layers control the preamble format.

The transmission of a random access preamble, if triggered by the MAC layer, is restricted to certain time and frequency resources. These resources are enumerated in increasing order of the subframe number within the radio frame and the physical resource blocks in the frequency domain such that index 0 correspond to the lowest numbered physical resource block and subframe within the radio frame. PRACH resources within the radio frame are indicated by a PRACH configuration index, where the indexing is in the order of appearance in FIG. 11 (a reproduction of Table 5.7.1-2 from 3GPP TR 36.211 V13.1.0) and FIG. 13 (a reproduction of Table 5.7.1-4 from 3GPP TR 36.211 V13.1.0).

For non-BL/CE UEs there is a single PRACH configuration with $n_{PRB\ offset}^{RA}$ given by the higher-layer parameter prach-FrequencyOffset.

For BL/CE UEs, for each PRACH coverage enhancement level, there is a PRACH configuration configured by higher layers with a PRACH configuration index (prach-ConfigurationIndex), a PRACH frequency offset $\bar{n}_{PRBoffset}^{RA}$ (prach-FrequencyOffset), a number of PRACH repetitions per attempt $N_{rep}^{PRACH}$ (numRepetitionPerPreambleAttempt) and optionally a PRACH starting subframe periodicity $N_{start}^{PRACH}$ (prach-StartingSubframe). PRACH of preamble format 0-3 is transmitted $N_{rep}^{PRACH} \geq 1$ times, whereas PRACH of preamble format 4 is transmitted one time only.

For BL/CE UEs and for each PRACH coverage enhancement level, if frequency hopping is enabled for a PRACH configuration by the higher-layer parameter prach-Hopping-Config, the value of the parameter $n_{PRB\ offset}^{RA}$ depends on the SFN and the PRACH configuration index and is given by In case the PRACH configuration index is such that a PRACH resource occurs in every radio frame when calculated as below from FIG. 11 (a reproduction of Table 5.7.1-2 from 3GPP TR 36.211 V13.1.0) or FIG. 13 (a reproduction of Table 5.7.1-4 from 3GPP TR 36.211 V13.1.0), $$n_{PRB\ offset}^{RA} = \begin{cases} \bar{n}_{PRB\ offset}^{RA} & \text{if } n_f \bmod 2 = 0 \\ (\bar{n}_{PRB\ offset}^{RA} + f_{PRB,hop}^{PRACH}) \bmod N_{RB}^{UL} & \text{if } n_f \bmod 2 = 1 \end{cases}$$

otherwise $$n_{PRB\ offset}^{RA} = \begin{cases} \bar{n}_{PRB\ offset}^{RA} & \text{if } \left\lfloor \frac{n_f \bmod 4}{2} \right\rfloor = 0 \\ (\bar{n}_{PRB\ offset}^{RA} + f_{PRB,hop}^{PRACH}) \bmod N_{RB}^{UL} & \text{if } \left\lfloor \frac{n_f \bmod 4}{2} \right\rfloor = 1 \end{cases}$$

where $n_f$ is the system frame number, $f_{PRB,hop}^{PRACH}$ corresponds to a cell-specific higher-layer parameter prach-HoppingOffset. If frequency hopping is not enabled for the PRACH configuration then $n_{PRB\ offset}^{RA} = \bar{n}_{PRB\ offset}^{RA}$.

For frame structure type 1 with preamble format 0-3, for each of the PRACH configurations there is at most one random access resource per subframe.

FIG. 11 (a reproduction of Table 5.7.1-2 from 3GPP TR 36.211 V13.1.0) lists the preamble formats according to FIG. 10 (a reproduction of Table 5.7.1-1 from 3GPP TR 36.211 V13.1.0) and the subframes in which random access preamble transmission is allowed for a given configuration in frame structure type 1. The start of the random access preamble shall be aligned with the start of the corresponding uplink subframe at the UE assuming $N_{TA}=0$, where $N_{TA}$ is defined in clause 8.1. For PRACH configurations 0, 1, 2, 15, 16, 17, 18, 31, 32, 33, 34, 47, 48, 49, 50 and 63 the UE may for handover purposes assume an absolute value of the relative time difference between radio frame i in the current cell and the target cell of less than $153600 \cdot T_s$. The first physical resource block $n_{PRB}^{RA}$ allocated to the PRACH opportunity considered for preamble formats 0, 1, 2 and 3 is defined as $n_{PRB}^{RA} = n_{PRB\ offset}^{RA}$.

For frame structure type 2 with preamble formats 0-4, for each of the PRACH configurations there might be multiple random access resources in an UL subframe (or UpPTS for preamble format 4) depending on the UL/DL configuration [see table 4.2-2]. FIG. 12 (a reproduction of Table 5.7.1-3 from 3GPP TR 36.211 V13.1.0) lists PRACH configurations allowed for frame structure type 2 where the configuration index corresponds to a certain combination of preamble format, PRACH density value, $D_{RA}$ and version index, $r_{RA}$.

For frame structure type 2 with PRACH configuration indices 0, 1, 2, 20, 21, 22, 30, 31, 32, 40, 41, 42, 48, 49, 50, or with PRACH configuration indices 51, 53, 54, 55, 56, 57 in UL/DL configuration 3, 4, 5, the UE may for handover purposes assume an absolute value of the relative time difference between radio frame i in the current cell and the target cell is less than $153600 \cdot T_s$. FIG. 13 (a reproduction of Table 5.7.1-4 from 3GPP TR 36.211 V13.1.0) lists the mapping to physical resources for the different random access opportunities needed for a certain PRACH density value, $D_{RA}$. Each quadruple of the format ($f_{RA}$, $t_{RA}^{(0)}$, $t_{RA}^{(1)}$, $t_{RA}^{(2)}$ indicates the location of a specific random access resource, where $f_{RA}$ is a frequency resource index within the considered time instance, $t_{RA}^{(0)}=0, 1, 2$ indicates whether the resource is reoccurring in all radio frames, in even radio frames, or in odd radio frames, respectively, $t_{RA}^{(1)}=0, 1$ indicates whether the random access resource is located in first half frame or in second half frame, respectively, and where $t_{RA}^{(2)}$ is the uplink subframe number where the preamble starts, counting from 0 at the first uplink subframe between 2 consecutive downlink-to-uplink switch points, with the exception of preamble format 4 where $t_{RA}^{(2)}$ is denoted as (*). The start of the random access preamble formats 0-3 shall be aligned with the start of the corresponding uplink subframe at the UE assuming $N_{TA}=0$ and the random access preamble format 4 shall start $4832 \cdot T_s$ before the end of the UpPTS at the UE, where the UpPTS is referenced to the UE's uplink frame timing assuming $N_{TA}=0$.

The random access opportunities for each PRACH configuration shall be allocated in time first and then in frequency if and only if time multiplexing is not sufficient to hold all opportunities of a PRACH configuration needed for a certain density value $D_{RA}$ without overlap in time. For preamble format 0-3, the frequency multiplexing shall be done according to $$n_{PRB}^{RA} = \begin{cases} n_{PRB\,offset}^{RA} + 6\left\lfloor \frac{f_{RA}}{2} \right\rfloor, & \text{if } f_{RA} \bmod 2 = 0 \\ N_{PRB}^{UL} - 6 - n_{PRB\,offset}^{RA} - 6\left\lfloor \frac{f_{RA}}{2} \right\rfloor, & \text{otherwise} \end{cases}$$

where $N_{RB}^{UL}$ is the number of uplink resource blocks, $n_{PRB}^{RA}$ is the first physical resource block allocated to the PRACH opportunity considered and where $n_{PRB\,offset}^{RA}$ is the first physical resource block available for PRACH.

For preamble format 4, the frequency multiplexing shall be done according to $$n_{PRB}^{RA} = \begin{cases} 6f_{RA}, & \text{if } ((n_f \bmod 2) \times (2-N_{SP}) + t_{RA}^{(1)}) \bmod 2 = 0 \\ N_{RB}^{UL} - 6(f_{RA}+1), & \text{otherwise} \end{cases}$$

where $n_f$ is the system frame number and where $N_{SP}$ is the number of DL to UL switch points within the radio frame.

For BL/CE UEs, only a subset of the subframes allowed for preamble transmission are allowed as starting subframes for the $N_{rep}^{PRACH}$ repetitions. The allowed starting subframes for a PRACH configuration are determined as follows:

Enumerate the subframes that are allowed for preamble transmission for the PRACH configuration as $n_{sf}^{RA}=0$, ... $N_{sf}^{RA}-1$ where $n_{sf}^{RA}=0$ and $n_{sf}^{RA}=N_{sf}^{RA}-1$ correspond to the two subframes allowed for preamble transmission with the smallest and the largest absolute subframe number $n_{sf}^{abs}$, respectively.

If a PRACH starting subframe periodicity $N_{start}^{PRACH}$ is not provided by higher layers, the periodicity of the allowed starting subframes in terms of subframes allowed for preamble transmission is $N_{rep}^{PRACH}$. The allowed starting subframes defined over $n_{sf}^{RA}=0$, ... $N_{sf}^{RA}-1$ are given by $jN_{rep}^{PRACH}$ where $j=0, 1, 2, \ldots$.

If a PRACH starting subframe periodicity $N_{start}^{PRACH}$ is provided by higher layers, it indicates the periodicity of the allowed starting subframes in terms of subframes allowed for preamble transmission. The allowed starting subframes defined over $jN_{start}^{PRACH}+N_{rep}^{PRACH}$ where $j=0, 1, 2, \ldots$.

No starting subframe with absolute subframe number $n_{sf}^{abs}>10240-N_{rep}^{PRACH}$ is allowed.

Each random access preamble occupies a bandwidth corresponding to 6 consecutive resource blocks for both frame structures.

5.7.2 Preamble Sequence Generation

The random access preambles are generated from Zadoff-Chu sequences with zero correlation zone, generated from one or several root Zadoff-Chu sequences. The network configures the set of preamble sequences the UE is allowed to use.

There are 64 preambles available in each cell. The set of 64 preamble sequences in a cell is found by including first, in the order of increasing cyclic shift, all the available cyclic shifts of a root Zadoff-Chu sequence with the logical index RACH_ROOT_SEQUENCE, where RACH_ROOT_SEQUENCE is broadcasted as part of the System Information. Additional preamble sequences, in case 64 preambles cannot be generated from a single root Zadoff-Chu sequence, are obtained from the root sequences with the consecutive logical indexes until all the 64 sequences are found.

The logical root sequence order is cyclic: the logical index 0 is consecutive to 837. The relation between a logical root sequence index and physical root sequence index u is given by Tables 5.7.2-4 and 5.7.2-5 for preamble formats 0-3 and 4, respectively.

The $u^{th}$ root Zadoff-Chu sequence is defined by $$x_u(n) = e^{-j\frac{\pi u n(n+1)}{N_{ZC}}}, \quad 0 \le n \le N_{ZC}-1$$

where the length $N_{ZC}$ of the Zadoff-Chu sequence is given by Table 5.7.2-1. From the $u^{th}$ root Zadoff-Chu sequence, random access preambles with zero correlation zones of length $N_{CS}-1$ are defined by cyclic shifts according to $$x_{u,v}(n) = x_u((n+C_v) \bmod N_{ZC})$$

where the cyclic shift is given by $$C_v = \begin{cases} vN_{CS} & v = 0, 1, \ldots, \lfloor N_{ZC}/N_{CS} \rfloor - 1, \\ & N_{CS} \ne 0 \quad \text{for unrestriced sets} \\ 0 & N_{CS} = 0 \quad \text{for unrestriced sets} \\ d_{start}\lfloor v/n_{shift}^{RA} \rfloor + & v = 0, 1, \ldots, \\ (v \bmod n_{shift}^{RA})N_{CS} & n_{shift}^{RA}n_{group}^{RA} + \bar{n}_{shift}^{RA} - 1 \quad \text{for restriced sets} \end{cases}$$

and $N_{CS}$ is given by Tables 5.7.2-2 and 5.7.2-3 for preamble formats 0-3 and 4, respectively, where the parameter zero-CorrelationZoneConfig is provided by higher layers. The parameter High-speed-flag provided by higher layers determines if unrestricted set or restricted set shall be used.

The variable $d_u$ is the cyclic shift corresponding to a Doppler shift of magnitude $1/T_{SEQ}$ and is given by $$d_u = \begin{cases} p & 0 \le p < N_{ZC}/2 \\ N_{ZC}-p & \text{otherwise} \end{cases}$$

where p is the smallest non-negative integer that fulfils $(pu) \bmod N_{ZC}=1$. The parameters for restricted sets of cyclic shifts depend on $d_u$. For $N_{CS} \le d_u < N_{ZC}/3$, the parameters are given by $$n_{shift}^{RA} = \lfloor d_u/N_{CS} \rfloor$$

$$d_{start} = 2d_u + n_{shift}^{RA}N_{CS}$$

$$n_{group}^{RA} = \lfloor N_{ZC}/d_{start} \rfloor$$

$$\bar{n}_{shift}^{RA} = \max(\lfloor (N_{ZC}-2d_u-n_{group}^{RA}d_{start})/N_{CS} \rfloor, 0)$$

For $N_{ZC}/3 \le d_u \le (N_{ZC}-N_{CS})/2$ the parameters are given by $$n_{shift}^{RA} = \lfloor (N_{ZC}-2d_u)/N_{CS} \rfloor$$

$$d_{start} = N_{ZC}-2d_u+n_{shift}^{RA}N_{CS}$$

$$n_{group}^{RA} = \lfloor d_u/d_{start} \rfloor$$

$$\bar{n}_{shift}^{RA} = \min(\max(\lfloor (d_u - n_{group}^{RA}d_{start})/N_{CS} \rfloor, 0), n_{shift}^{RA})$$

For all other values of $d_u$, there are no cyclic shifts in the restricted set.

5.7.3 Baseband Signal Generation

The time-continuous random access signal s(t) is defined by $$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})}$$

where $0 \le t < T_{SEQ}+T_{CP}$, $\beta_{PRACH}$ is an amplitude scaling factor in order to conform to the transmit power $P_{PRACH}$ specified in clause 6.1 in 3GPP TS 36.213 [4], and $k_0 = n_{PRB}^{RA}N_{sc}^{RB} - N_{RB}^{UL}N_{sc}^{RB}/2$. The location in the frequency domain is controlled by the parameter $n_{PRB}$ is derived from clause 5.7.1. The factor $K=\Delta f/\Delta f_{RA}$ accounts for the difference in subcarrier spacing between the random access preamble and uplink data transmission. The variable $\Delta f_{RA}$, the subcarrier spacing for the random access preamble, and the variable $\varphi$, a fixed offset determining the frequency-domain location of the random access preamble within the physical resource blocks, are both given by FIG. 19 (a reproduction of Table 5.7.3-1 from 3GPP TR 36.211 V13.1.0).

< . . . >

Physical Broadcast Channel

The PBCH is not transmitted for frame structure type 3.

6.6.1 Scrambling

The block of bits $b(0), \ldots, b(M_{bit}-1)$, where $M_{bit}$, the number of bits transmitted on the physical broadcast channel, equals 1920 for normal cyclic prefix and 1728 for extended cyclic prefix, shall be scrambled with a cell-specific sequence prior to modulation, resulting in a block of scrambled bits $\tilde{b}(0), \ldots, \tilde{b}(M_{bit}-1)$ according to $$\tilde{b}(i) = (b(i)+c(i)) \mod 2$$

where the scrambling sequence c(i) is given by clause 7.2. The scrambling sequence shall be initialised with $c_{init} = N_{ID}^{cell}$ in each radio frame fulfilling $n_f \mod 4 = 0$.

6.6.2 Modulation

The block of scrambled bits $\tilde{b}(0), \ldots, \tilde{b}(M_{bit}-1)$ shall be modulated as described in clause 7.1, resulting in a block of complex-valued modulation symbols $d(0), \ldots, d(M_{symb}-1)$. FIG. 20 (a reproduction of Table 6.6.2-1 from 3GPP TR 36.211 V13.1.0) specifies the modulation mappings applicable for the physical broadcast channel.

6.6.3 Layer Mapping and Precoding

The block of modulation symbols $d(0), \ldots, d(M_{symb}-1)$ shall be mapped to layers according to one of clauses 6.3.3.1 or 6.3.3.3 with $M_{symb}^{(0)} = M_{symb}$ and precoded according to one of clauses 6.3.4.1 or 6.3.4.3, resulting in a block of vectors $y(i) = [y^{(0)}(i) \ldots y^{(P-1)}(i)]^T$, $i=0, \ldots, M_{symb}-1$, where $y^{(p)}(i)$ represents the signal for antenna port p and where $p=0, \ldots, P-1$ and the number of antenna ports for cell-specific reference signals $P \in \{1, 2, 4\}$.

6.6.4 Mapping to Resource Elements

The block of complex-valued symbols $y^{(P)}(0), \ldots, y^{(P)}(M_{symb}-1)$ for each antenna port is transmitted during 4 consecutive radio frames starting in each radio frame fulfilling $o_f \mod 4 = 0$ and shall be mapped in sequence starting with y(0) to resource elements (k,l) constituting the core set of PBCH resource elements. The mapping to resource elements (k,l) not reserved for transmission of reference signals shall be in increasing order of first the index k, then the index l in slot 1 in subframe 0 and finally the radio frame number. The resource-element indices are given by $$k = \frac{N_{RB}^{DL}N_{sc}^{RB}}{2} - 36 + k', k' = 0, 1, \ldots, 71$$

$$l = 0, 1, \ldots, 3$$

where resource elements reserved for reference signals shall be excluded. The mapping operation shall assume cell-specific reference signals for antenna ports 0-3 being present irrespective of the actual configuration. The UE shall assume that the resource elements assumed to be reserved for reference signals in the mapping operation above but not used for transmission of reference signal are not available for PDSCH transmission. The UE shall not make any other assumptions about these resource elements.

If a cell is configured with repetition of the physical broadcast channel symbols mapped to core resource element (k,l) in slot 1 in subframe 0 within a radio frame $n_f$ according to the mapping operation above, and cell-specific reference signals in OFDM symbols l in slot 1 in subframe 0 within a radio frame $n_f$ with l according to the mapping operation above shall additionally be mapped to resource elements (k,l') in slot number $n'_s$ within radio frame $n_f$-i unless resource element (k,l') is used by CSI reference signals.

For frame structure type 1, l', $n'_s$, and i are given by FIG. 21 (a reproduction of Table 6.6.4-1 from 3GPP TR 36.211 V13.1.0).

For frame structure type 2, if $N_{RB}^{DL} > 15$, l' and $n'_s$ are given by FIG. 22 (a reproduction of Table 6.6.4-2 from 3GPP TR 36.211 V13.1.0) and i=0;

if $7 \le N_{RB}^{DL} 15$, l' and $n'_s$ are given by FIG. 22 (a reproduction of Table 6.6.4-2 from 3GPP TR 36.211 V13.1.0) and i=0, except that repetitions with $n'_s=10$ and $n'_s=11$ are not applied.

For both frame structure type 1 and frame structure type 2, repetition of the physical broadcast channel is not applicable if $N_{RB}^{DL}=6$.

Resource elements already used for transmission of cell-specific reference signals in absence of repetition shall not be used for additional mapping of cell-specific reference signals.

< . . . >

MasterInformationBlock

The MasterInformationBlock includes the system information transmitted on BCH.

Signalling radio bearer: N/A

RLC-SAP: TM

Logical channel: BCCH

Direction: E-UTRAN to UE

| MasterInformationBlock |
| --- |
| -- ASN1START<br>MasterInformationBlock ::=    SEQUENCE {<br>   dl-Bandwidth              ENUMERATED {<br>                                        n6, n15, n25, n50, n75, n100},<br>   phich-Config              PHICH-Config,<br>   systemFrameNumber         BIT STRING (SIZE (8)),<br>   schedulingInfoSIB1-BR-r13 INTEGER (0..31),<br>   spare                     BIT STRING (SIZE (5))<br>}<br>-- ASN1STOP |

| MasterInformationBlock field descriptions |
| --- |
| dl-Bandwidth |
| Parameter: transmission bandwidth configuration, $N_{RB}$ in downlink, see TS 36.101 [42, table 5.6-1]. n6 corresponds to 6 resource blocks, n15 to 15 resource blocks and so on. |
| phich-Config |
| Specifies the PHICH configuration. If the UE is a BL UE or UE in CE, it shall ignore this field. |
| schedulingInfoSIB1-BR |
| This field contains an index to a table that defines SystemInformationBlockType1-BR scheduling information. The table is specified in TS 36.213 [23, FIG. 33 (a reproduction of Table 7.1.6-1 from 3GPP TS 36.213 V13.1.1) and Table 7.1.7.2.7-1]. Value 0 means that SystemInformationBlockType1-BR is not scheduled. |
| systemFrameNumber |
| Defines the 8 most significant bits of the SFN. As indicated in TS 36.211 [21, 6.6.1], the 2 least significant bits of the SFN are acquired implicitly in the P-BCH decoding, i.e. timing of 40 ms P-BCH TTI indicates 2 least significant bits (within 40 ms P-BCH TTI, the first radio frame: 00, the second radio frame: 01, the third radio frame: 10, the last radio frame: 11). One value applies for all serving cells of a Cell Group (i.e. MCG or SCG). The associated functionality is common (i.e. not performed independently for each cell). |

The following is quoted from 3GPP TS 36.212 V13.1.0:

5.3.3 Downlink Control Information

A DCI transports downlink, uplink or sidelink scheduling information, requests for aperiodic CQI reports, LAA common information, notifications of MCCH change [6] or uplink power control commands for one cell and one RNTI. The RNTI is implicitly encoded in the CRC.

Figures 23, 24:
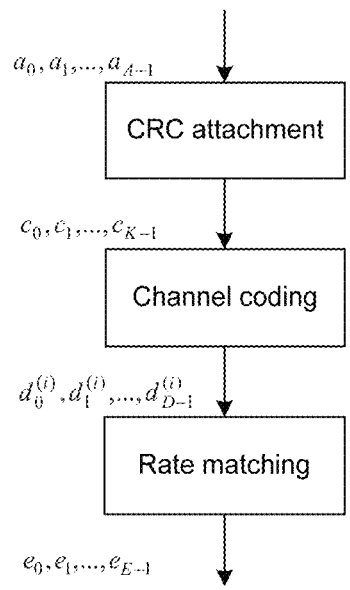
FIG. 23 is a reproduction of FIG. 5.3.3-1 from 3GPP TS 36.212 V13.1.0 illustrating the processing structure for one DCI.
FIG. 24 is a reproduction of Table 5.3.3.1.2-1 from 3GPP TS 36.212 V13.1.0 providing ambiguous sizes of information bits.

FIG. 23 (a reproduction of FIG. 5.3.3-1 from 3GPP TS 36.212 V13.1.0) shows the processing structure for one DCI. The following coding steps can be identified:

Information element multiplexing
CRC attachment
Channel coding
Rate matching

The coding steps for DCI are shown in [FIG. 23].

5.3.3.1 DCI Formats

The fields defined in the DCI formats below are mapped to the information bits $\alpha_0$ to $\alpha_{A-1}$ as follows.

Each field is mapped in the order in which it appears in the description, including the zero-padding bit(s), if any, with the first field mapped to the lowest order information bit $\alpha_0$ and each successive field mapped to higher order information bits. The most significant bit of each field is mapped to the lowest order information bit for that field, e.g. the most significant bit of the first field is mapped to $\alpha_0$.

5.3.3.1.1 Format 0

DCI format 0 is used for the scheduling of PUSCH in one UL cell.

The following information is transmitted by means of the DCI format 0:

Carrier indicator—0 or 3 bits. This field is present according to the definitions in 3GPP TS 36.331, V13.2.0.

Flag for format0/format1A differentiation—1 bit, where value 0 indicates format 0 and value 1 indicates format 1A Frequency hopping flag—1 bit as defined in section 8.4 of 3GPP TS 36.331, V13.2.0. This field is used as the MSB of the corresponding resource allocation field for resource allocation type 1.

Resource block assignment and hopping resource allocation—$\lceil \log_2(N_{RB}^{DL}(N_{RB}^{DL}+1)/2) \rceil$ bits For PUSCH hopping (resource allocation type 0 only):
$N_{UL\_hop}$ MSB bits are used to obtain the value of $\tilde{n}_{PRB}(i)$ as indicated in section 8.4 of 3GPP TS 36.331, V13.2.0

($\lceil \log_2(N_{RB}^{UL}+1)/2) \rceil$-$N_{UL\_hop}$) bits provide the resource allocation of the first slot in the UL subframe For non-hopping PUSCH with resource allocation type 0:
($\lceil \log_2(N_{RB}^{UL}(N_{RB}^{UL}+1)/2) \rceil$) bits provide the resource allocation in the UL subframe as defined in section 8.1.1 of 3GPP TS 36.331, V13.2.0

For non-hopping PUSCH with resource allocation type 1:
The concatenation of the frequency hopping flag field and the resource block assignment and hopping resource allocation field provides the resource allocation field in the UL subframe as defined in section 8.1.2 of 3GPP TS 36.331, V13.2.0

Modulation and coding scheme and redundancy version—5 bits as defined in section 8.6 of 3GPP TS 36.331, V13.2.0

New data indicator—1 bit

TPC command for scheduled PUSCH—2 bits as defined in section 5.1.1.1 of 3GPP TS 36.331, V13.2.0

Cyclic shift for DM RS and OCC index—3 bits as defined in section 5.5.2.1.1 of 3GPP TR 36.211 V13.1.0

UL index—2 bits as defined in sections 5.1.1.1, 7.2.1, 8 and 8.4 of 3GPP TS 36.331, V13.2.0 (this field is present only for TDD operation with uplink-downlink configuration 0)

Downlink Assignment Index (DAI)—2 bits as defined in section 7.3 of 3GPP TS 36.331, V13.2.0 (this field is present only for cases with TDD primary cell and either TDD operation with uplink-downlink configurations 1-6 or FDD operation)

CSI request 1, 2 or 3 bits as defined in section 7.2.1 of 3GPP TS 36.331, V13.2.0. The 2-bit field applies to UEs configured with no more than five DL cells and to UEs that are configured with more than one DL cell and when the corresponding DCI format is mapped onto the UE specific search space given by the C-RNTI as defined in 3GPP TS 36.331, V13.2.0;

UEs that are configured by higher layers with more than one CSI process and when the corresponding DCI format is mapped onto the UE specific search space given by the C-RNTI as defined in 3GPP TS 36.331, V13.2.0;

UEs that are configured with two CSI measurement sets by higher layers with the parameter csi-MeasSubframeSet, and when the corresponding DCI format is mapped onto the UE specific search space given by the C-RNTI as defined in 3GPP TS 36.331, V13.2.0;

the 3-bit field applies to UEs that are configured with more than five DL cells and when the corresponding DCI format is mapped onto the UE specific search space given by the C-RNTI as defined in 3GPP TS 36.331, V13.2.0;

otherwise the 1-bit field applies

SRS request 0 or 1 bit. This field can only be present in DCI formats scheduling PUSCH which are mapped onto the UE specific search space given by the C-RNTI as defined in [3]. The interpretation of this field is provided in section 8.2 of 3GPP TS 36.331, V13.2.0

Resource allocation type 1 bit. This field is only present if $N_{RB}^{UL} \leq N_{RB}^{DL}$. The interpretation of this field is provided in section 8.1 of 3GPP TS 36.331, V13.2.0

If the number of information bits in format 0 mapped onto a given search space is less than the payload size of format 1A for scheduling the same serving cell and mapped onto the same search space (including any padding bits appended to format 1A), zeros shall be appended to format 0 until the payload size equals that of format 1A.

5.3.3.1.2 Format 1

DCI format 1 is used for the scheduling of one PDSCH codeword in one cell.

The following information is transmitted by means of the DCI format 1:

Carrier indicator 0 or 3 bits. This field is present according to the definitions in 3GPP TS 36.331, V13.2.0.

Resource allocation header (resource allocation type 0/type 1) 1 bit as defined in section 7.1.6 of 3GPP TS 36.331, V13.2.0

If downlink bandwidth is less than or equal to 10 PRBs, there is no resource allocation header and resource allocation type 0 is assumed.

Resource block assignment:

For resource allocation type 0 as defined in section 7.1.6.1 of 3GPP TS 36.331, V13.2.0:

$\lceil N_{RB}^{DL}/P \rceil$ bits provide the resource allocation

For resource allocation type 1 as defined in section 7.1.6.2 of 3GPP TS 36.331, V13.2.0:

$\lceil \log_2(P) \rceil$ bits of this field are used as a header specific to this resource allocation type to indicate the selected resource blocks subset 1 bit indicates a shift of the resource allocation span ($\lceil N_{RB}^{DL}/P \rceil - \lceil \log_2(P) \rceil - 1$) bits provide the resource allocation where the value of P depends on the number of DL resource blocks as indicated in section 7.1.6.1 of 3GPP TS 36.331, V13.2.0

Modulation and coding scheme 5 bits as defined in section 7.1.7 of 3GPP TS 36.331, V13.2.0

HARQ process number—3 bits (for cases with FDD primary cell), 4 bits (for cases with TDD primary cell)

New data indicator—1 bit

Redundancy version—2 bits

TPC command for PUCCH—2 bits as defined in section 5.1.2.1 of 3GPP TS 36.331, V13.2.0

Downlink Assignment Index—number of bits as specified in FIG. 25 (a reproduction of Table 5.3.3.1.2-2 from 3GPP TS 36.212 V13.1.0).

HARQ-ACK resource offset (this field is present when this format is carried by EPDCCH. This field is not present when this format is carried by PDCCH)—2 bits as defined in section 10.1 of 3GPP TS 36.331, V13.2.0. The 2 bits are set to 0 when this format is carried by EPDCCH on a secondary cell, or when this format is carried by EPDCCH on the primary cell scheduling PDSCH on a secondary cell and the UE is configured with PUCCH format 3 for HARQ-ACK feedback.

If the UE is not configured to decode PDCCH or EPDCCH with CRC scrambled by the C-RNTI and the number of information bits in format 1 is equal to that for format 0/1A, one bit of value zero shall be appended to format 1.

If the UE is configured to decode PDCCH or EPDCCH with CRC scrambled by the C-RNTI and the number of information bits in format 1 is equal to that for format 0/1A for scheduling the same serving cell and mapped onto the UE specific search space given by the C-RNTI as defined in 3GPP TS 36.331, V13.2.0, one bit of value zero shall be appended to format 1.

If the number of information bits in format 1 carried by PDCCH belongs to one of the sizes in FIG. 24 (a reproduction of Table 5.3.3.1.2-1 from 3GPP TS 36.212 V13.1.0), one or more zero bit(s) shall be appended to format 1 until the payload size of format 1 does not belong to one of the sizes in FIG. 24 (a reproduction of Table 5.3.3.1.2-1 from 3GPP TS 36.212 V13.1.0) and is not equal to that of format 0/1A mapped onto the same search space.

5.3.3.1.3 Format 1A

DCI format 1A is used for the compact scheduling of one PDSCH codeword in one cell and random access procedure initiated by a PDCCH order. The DCI corresponding to a PDCCH order can be carried by PDCCH or EPDCCH.

The following information is transmitted by means of the DCI format 1A:

Carrier indicator 0 or 3 bits. This field is present according to the definitions in [3].

Flag for format0/format1A differentiation 1 bit, where value 0 indicates format 0 and value 1 indicates format 1A Format 1A is used for random access procedure initiated by a PDCCH order only if format 1A CRC is scrambled with C-RNTI and all the remaining fields are set as follows:

Localized/Distributed VRB assignment flag—1 bit is set to '0'

Resource block assignment—$\lceil \log_2(N_{RB}^{DL}(N_{RB}^{DL}+1)/2) \rceil$ bits, where all bits shall be set to 1

Preamble Index—6 bits

PRACH Mask Index—4 bits, [5]

All the remaining bits in format 1A for compact scheduling assignment of one PDSCH codeword are set to zero Otherwise, Localized/Distributed VRB assignment flag—1 bit as defined in 7.1.6.3 of [3]

Resource block assignment—$\lceil \log_2(N_{RB}^{DL}(N_{RB}^{DL}+1)/2) \rceil$ bits as defined in section 7.1.6.3 of [3]:

For localized VRB:

$\lceil \log_2(N_{RB}^{DL}(N_{RB}^{DL}+1)/2) \rceil$ bits provide the resource allocation For distributed VRB:

If $N_{RB}^{DL}<50$ or if the format 1A CRC is scrambled by RA-RNTI, P-RNTI, SI-RNTI, SC-RNTI or G-RNTI:

$\lceil \log_2(N_{RB}^{DL}(N_{RB}^{DL}+1)/2) \rceil$ bits provide the resource allocation Else 1 bit, the MSB indicates the gap value, where value 0 indicates $N_{gap}=N_{gap,1}$ and value 1 indicates $N_{gap}=N_{gap,2}$ $(\lceil \log_2(N_{RB}^{DL}(N_{RB}^{DL}+1)/2) \rceil$ bits provide the resource allocation, where $N_{gap}$ is defined in [2].

Modulation and coding scheme—5 bits as defined in section 7.1.7 of [3]

HARQ process number—3 bits (for cases with FDD primary cell), 4 bits (for cases with TDD primary cell)

New data indicator—1 bit

If the format 1A CRC is scrambled by RA-RNTI, P-RNTI, SI-RNTI, SC-RNTI or G-RNTI:

If $N_{RB}^{DL} \geq 50$ and Localized/Distributed VRB assignment flag is set to 1 the new data indicator bit indicates the gap value, where value 0 indicates $N_{gap}=N_{gap,1}$ and value 1 indicates $N_{gap}=N_{gap,2}$.

Else the new data indicator bit is reserved.

Else

The new data indicator bit as defined in [5]

Redundancy version—2 bits

TPC command for PUCCH 2 bits as defined in section 5.1.2.1 of [3]

If the format 1A CRC is scrambled by RA-RNTI, P-RNTI, or SI-RNTI:

The most significant bit of the TPC command is reserved.

The least significant bit of the TPC command indicates column $N_{PRB}^{1A}$ of the TBS table defined of [3].

If least significant bit is 0 then $N_{PRB}^{1A}=2$ else $N_{PRB}^{1A}=3$.

Else

The two bits including the most significant bit indicates the TPC command

Downlink Assignment Index number of bits as specified in FIG. 25 (a reproduction of Table 5.3.3.1.2-2 from 3GPP TS 36.212 V13.1.0).

SRS request—0 or 1 bit. This field can only be present in DCI formats scheduling PDSCH which are mapped onto the UE specific search space given by the C-RNTI as defined in [3]. The interpretation of this field is provided in section 8.2 of [3]

HARQ-ACK resource offset (this field is present when this format is carried by EPDCCH. This field is not present when this format is carried by PDCCH) 2 bits as defined in section 10.1 of [3]. The 2 bits are set to 0 when this format is carried by EPDCCH on a secondary cell, or when this format is carried by EPDCCH on the primary cell scheduling PDSCH on a secondary cell and the UE is configured with PUCCH format 3 for HARQ-ACK feedback.

If the UE is not configured to decode PDCCH or EPDCCH with CRC scrambled by the C-RNTI, and the number of information bits in format 1A is less than that of format 0, zeros shall be appended to format 1A until the payload size equals that of format 0.

If the UE is configured to decode PDCCH or EPDCCH with CRC scrambled by the C-RNTI and the number of information bits in format 1A mapped onto a given search space is less than that of format 0 for scheduling the same serving cell and mapped onto the same search space, zeros shall be appended to format 1A until the payload size equals that of format 0, except when format 1A assigns downlink resource on a secondary cell without an uplink configuration associated with the secondary cell.

If the number of information bits in format 1A carried by PDCCH belongs to one of the sizes in FIG. 24 (a reproduction of Table 5.3.3.1.2-1 from 3GPP TS 36.212 V13.1.0), one zero bit shall be appended to format 1A.

When the format 1A CRC is scrambled with a RA-RNTI, P-RNTI, SI-RNTI, SC-RNTI or G-RNTI then the following fields among the fields above are reserved:

HARQ process number

Downlink Assignment Index (used for cases with TDD primary cell and either FDD operation or TDD operation, and is not present for cases with FDD primary cell and either FDD operation or TDD operation)

The following is quoted from 3GPP TS 36.213 V13.1.1:

7 Physical Downlink Shared Channel Related Procedures

If the UE is configured with a SCG, the UE shall apply the procedures described in this clause for both MCG and SCG unless stated otherwise When the procedures are applied for MCG, the terms 'secondary cell', 'secondary cells', 'serving cell', and 'serving cells' in this clause refer to secondary cell, secondary cells, serving cell or serving cells belonging to the MCG respectively unless stated otherwise. The terms 'subframe' and 'subframes' refer to subframe or subframes belonging to MCG.

When the procedures are applied for SCG, the terms 'secondary cell', 'secondary cells', 'serving cell' and 'serving cells' in this clause refer to secondary cell, secondary cells (not including the PSCell), serving cell, serving cells belonging to the SCG respectively unless stated otherwise. The term 'primary cell' in this clause refers to the PSCell of the SCG. The terms 'subframe' and 'subframes' refer to subframe or subframes belonging to SCG If a UE is configured with a LAA Scell, the UE shall apply the procedures described in this clause assuming frame structure type 1 for the LAA Scell unless stated otherwise.

For FDD, there shall be a maximum of 8 downlink HARQ processes per serving cell.

< . . . >

The dedicated broadcast HARQ process defined in [8] is not counted as part of the maximum number of HARQ processes for FDD, TDD and FDD-TDD.

7.1 UE Procedure for Receiving the Physical Downlink Shared Channel

Except the subframes indicated by the higher layer parameter mbsfn-SubframeConfigList or by mbsfn-SubframeConfigList-v12x0 or by laa-SCellSubframeConfig of serving cell c, a UE shall
- upon detection of a PDCCH of the serving cell with DCI format 1, 1A, 1B, 1C, 1D, 2, 2A, 2B, 2C, or 2D intended for the UE in a subframe, or
- upon detection of an EPDCCH of the serving cell with DCI format 1, 1A, 1B, 1D, 2, 2A, 2B, 2C, or 2D intended for the UE in a subframe decode the corresponding PDSCH in the same subframe with the restriction of the number of transport blocks defined in the higher layers.

For BL/CE UEs configured with higher layer parameter fddDownlinkOrTddSubframeBitmapLC, the higher layer parameter indicates the set of BL/CE DL subframes.

For BL/CE UEs not configured with higher layer parameter fddDownlinkOrTddSubframeBitmapLC, subframes other than those indicated by the higher layer parameter mbsfn-SubframeConfigList are considered as BL/CE DL subframes.

A BL/CE UE shall upon detection of a MPDCCH with DCI format 6-1A, 6-1B, 6-2 intended for the UE, decode the corresponding PDSCH in one more BL/CE DL subframes as described in subclause 7.1.11, with the restriction of the number of transport blocks defined in the higher layers If a UE is configured with more than one serving cell and if the frame structure type of any two configured serving cells is different, then the UE is considered to be configured for FDD-TDD carrier aggregation.

Except for MBMS reception, the UE is not required to monitor PDCCH with CRC scrambled by the SI-RNTI on the PSCell.

A UE may assume that positioning reference signals are not present in resource blocks in which it shall decode PDSCH according to a detected PDCCH with CRC scrambled by the SI-RNTI or P-RNTI with DCI format 1A or 1C intended for the UE.

A UE configured with the carrier indicator field for a given serving cell shall assume that the carrier indicator field is not present in any PDCCH of the serving cell in the common search space that is described in subclause 9.1. Otherwise, the configured UE shall assume that for the given serving cell the carrier indicator field is present in PDCCH/EPDCCH located in the UE specific search space described in subclause 9.1 when the PDCCH/EPDCCH CRC is scrambled by C-RNTI or SPS C-RNTI.

If a UE is configured by higher layers to decode PDCCH with CRC scrambled by the SI-RNTI, the UE shall decode the PDCCH and the corresponding PDSCH according to any of the combinations defined in FIG. 27 (a reproduction of Table 7.1-1 from 3GPP TS 36.213 V13.1.1). The scrambling initialization of PDSCH corresponding to these PDCCHs is by SI-RNTI.

If a UE is configured by higher layers to decode PDCCH with CRC scrambled by the P-RNTI, the UE shall decode the PDCCH and the corresponding PDSCH according to any of the combinations defined in FIG. 28 (a reproduction of Table 7.1-2 from 3GPP TS 36.213 V13.1.1). The scrambling initialization of PDSCH corresponding to these PDCCHs is by P-RNTI.

If a UE is configured by higher layers to decode MPDCCH with CRC scrambled by the P-RNTI, the UE shall decode the MPDCCH and any corresponding PDSCH according to any of the combinations defined in Table 7.1-2A.

The scrambling initialization of PDSCH corresponding to these MPDCCHs is by P-RNTI.

The UE is not required to monitor PDCCH with CRC scrambled by the P-RNTI on the PSCell.

< . . . >

If a UE is configured by higher layers to decode PDCCH with CRC scrambled by the RA-RNTI, the UE shall decode the PDCCH and the corresponding PDSCH according to any of the combinations defined in FIG. 29 (a reproduction of Table 7.1-3 from 3GPP TS 36.213 V13.1.1). The scrambling initialization of PDSCH corresponding to these PDCCHs is by RA-RNTI.

If a UE is configured by higher layers to decode MPDCCH with CRC scrambled by the RA-RNTI, the UE shall decode the MPDCCH and the corresponding PDSCH according to any of the combinations defined in Table 7.1-3A. The scrambling initialization of PDSCH corresponding to these MPDCCHs is by RA-RNTI.

When RA-RNTI and either C-RNTI or SPS C-RNTI are assigned in the same subframe, the UE is not required to decode a PDSCH on the primary cell indicated by a PDCCH/EPDCCH with a CRC scrambled by C-RNTI or SPS C-RNTI.

If a UE is configured by higher layers to decode PDCCH with CRC scrambled by the G-RNTI or SC-RNTI, the UE shall decode the PDCCH and the corresponding PDSCH according to any of the combinations defined in FIG. 30 (a reproduction of Table 7.1-4 from 3GPP TS 36.213 V13.1.1). The scrambling initialization of PDSCH corresponding to these PDCCHs is by G-RNTI or SC-RNTI.

The UE is semi-statically configured via higher layer signalling to receive PDSCH data transmissions signalled via PDCCH/EPDCCH according to one of the transmission modes, denoted mode 1 to mode 10.

For a BL/CE UE, the UE is semi-statically configured via higher layer signalling to receive PDSCH data transmissions signalled via MPDCCH according to one of the transmission modes: mode 1, mode 2, mode 6, and mode 9.

For LAA Scells, the UE is not expected to receive PDSCH data transmissions signalled via PDCCH/EPDCCH according to transmission modes 5, 6, 7.

For frame structure type 1,
- the UE is not expected to receive PDSCH resource blocks transmitted on antenna port 5 in any subframe in which the number of OFDM symbols for PDCCH with normal CP is equal to four;
- the UE is not expected to receive PDSCH resource blocks transmitted on antenna port 5, 7, 8, 9, 10, 11, 12, 13 or 14 in the two PRBs to which a pair of VRBs is mapped if either one of the two PRBs overlaps in frequency with a transmission of either PBCH or primary or secondary synchronization signals in the same subframe;
- the UE is not expected to receive PDSCH resource blocks transmitted on antenna port 7 for which distributed VRB resource allocation is assigned.
- The UE may skip decoding the transport block(s) if it does not receive all assigned PDSCH resource blocks except if it is capable of receiving the non-colliding PDSCH resource blocks in an assignment which partly collides in frequency with a transmission of PBCH or primary synchronization signal or secondary synchronization signal in the same subframes and that capability is indicated by pdsch-CollisionHandling [12]. If the UE skips decoding, the physical layer indicates to higher layer that the transport block(s) are not successfully decoded.

For frame structure type 2, the UE is not expected to receive PDSCH resource blocks transmitted on antenna port 5 in any subframe in which the number of OFDM symbols for PDCCH with normal CP is equal to four;

the UE is not expected to receive PDSCH resource blocks transmitted on antenna port 5 in the two PRBs to which a pair of VRBs is mapped if either one of the two PRBs overlaps in frequency with a transmission of PBCH in the same subframe;

the UE is not expected to receive PDSCH resource blocks transmitted on antenna port 7, 8, 9, 10, 11, 12, 13 or 14 in the two PRBs to which a pair of VRBs is mapped if either one of the two PRBs overlaps in frequency with a transmission of primary or secondary synchronization signals in the same subframe;

with normal CP configuration, the UE is not expected to receive PDSCH on antenna port 5 for which distributed VRB resource allocation is assigned in the special subframe with configuration #1 or #6;

the UE is not expected to receive PDSCH on antenna port 7 for which distributed VRB resource allocation is assigned;

with normal cyclic prefix, the UE is not expected to receive PDSCH resource blocks transmitted on antenna port 5 in DwPTS when the UE is configured with special subframe configuration 9.

The UE may skip decoding the transport block(s) if it does not receive all assigned PDSCH resource blocks except if it is capable of receiving the non-colliding PDSCH resource blocks in an assignment which partly collides in frequency with a transmission of PBCH or primary synchronization signal or secondary synchronization signal in the same subframe and that capability is indicated by pdsch-CollisionHandling [12]. If the UE skips decoding, the physical layer indicates to higher layer that the transport block(s) are not successfully decoded.

If a UE is configured by higher layers to decode PDCCH with CRC scrambled by the C-RNTI, the UE shall decode the PDCCH and any corresponding PDSCH according to the respective combinations defined in FIG. 31 (a reproduction of Table 7.1-5 from 3GPP TS 36.213 V13.1.1). The scrambling initialization of PDSCH corresponding to these PDCCHs is by C-RNTI.

If a UE is configured by higher layers to decode EPDCCH with CRC scrambled by the C-RNTI, the UE shall decode the EPDCCH and any corresponding PDSCH according to the respective combinations defined in Table 7.1-5A. The scrambling initialization of PDSCH corresponding to these EPDCCHs is by C-RNTI.

If a BL/CE UE is configured by higher layers to decode MPDCCH with CRC scrambled by the C-RNTI, the UE shall decode the MPDCCH and any corresponding PDSCH according to the respective combinations defined in Table 7.1-5B. The scrambling initialization of PDSCH corresponding to these MPDCCHs is by C-RNTI.

If a UE is configured with CEModeA, the UE shall decode MPDCCH DCI Format 6-1A. If the UE is configured with CEModeB, the UE shall decode MPDCCH DCI Format 6-1B.

If the UE is configured with the carrier indicator field for a given serving cell and, if the UE is configured by higher layers to decode PDCCH/EPDCCH with CRC scrambled by the C-RNTI, then the UE shall decode PDSCH of the serving cell indicated by the carrier indicator field value in the decoded PDCCH/EPDCCH.

When a UE configured in transmission mode 3, 4, 8, 9 or 10 receives a DCI Format 1A assignment, it shall assume that the PDSCH transmission is associated with transport block 1 and that transport block 2 is disabled.

When a UE is configured in transmission mode 7, scrambling initialization of UE-specific reference signals corresponding to these PDCCHs/EPDCCHs is by C-RNTI.

The UE does not support transmission mode 8 if extended cyclic prefix is used in the downlink.

When a UE is configured in transmission mode 9 or 10, in the downlink subframes indicated by the higher layer parameter mbsfn-SubframeConfigList or by mbsfn-SubframeConfigList-v12x0 or by laa-SCellSubframeConfig of serving cell c except in subframes for the serving cell indicated by higher layers to decode PMCH or, configured by higher layers to be part of a positioning reference signal occasion and the positioning reference signal occasion is only configured within MBSFN subframes and the cyclic prefix length used in subframe #0 is normal cyclic prefix, the UE shall upon detection of a PDCCH with CRC scrambled by the C-RNTI with DCI format 1A/2C/2D intended for the UE or, upon detection of an EPDCCH with CRC scrambled by the C-RNTI with DCI format 1A/2C/2D intended for the UE, decode the corresponding PDSCH in the same subframe.

A UE configured in transmission mode 10 can be configured with scrambling identities, $n_{ID}^{DMRS,i}$, i=0.1 by higher layers for UE-specific reference signal generation as defined in subclause 6.10.3.1 of [3] to decode PDSCH according to a detected PDCCH/EPDCCH with CRC scrambled by the C-RNTI with DCI format 2D intended for the UE.

< . . . >

If a UE is configured by higher layers to decode PDCCH with CRC scrambled by the SPS C-RNTI, the UE shall decode the PDCCH on the primary cell and any corresponding PDSCH on the primary cell according to the respective combinations defined in Table 7.1-6. The same PDSCH related configuration applies in the case that a PDSCH is transmitted without a corresponding PDCCH. The scrambling initialization of PDSCH corresponding to these PDCCHs and PDSCH without a corresponding PDCCH is by SPS C-RNTI.

If a UE is configured by higher layers to decode EPDCCH with CRC scrambled by the SPS C-RNTI, the UE shall decode the EPDCCH on the primary cell and any corresponding PDSCH on the primary cell according to the respective combinations defined in Table 7.1-6A. The same PDSCH related configuration applies in the case that a PDSCH is transmitted without a corresponding EPDCCH. The scrambling initialization of PDSCH corresponding to these EPDCCHs and PDSCH without a corresponding EPDCCH is by SPS C-RNTI.

If a UE configured with CEModeA is configured by higher layers to decode MPDCCH with CRC scrambled by the SPS C-RNTI, the UE shall decode the MPDCCH on the primary cell and any corresponding PDSCH on the primary cell according to the respective combinations defined in Table 7.1-6B. The same PDSCH related configuration applies in the case that a PDSCH is transmitted without a corresponding MPDCCH. The scrambling initialization of PDSCH corresponding to these MPDCCHs and PDSCH without a corresponding MPDCCH is by SPS C-RNTI.

When a UE is configured in transmission mode 7, scrambling initialization of UE-specific reference signals for PDSCH corresponding to these PDCCHs/EPDCCHs and for PDSCH without a corresponding PDCCH/EPDCCH is by SPS C-RNTI.

When a UE is configured in transmission mode 9 or 10, in the downlink subframes indicated by the higher layer parameter mbsfn-SubframeConfigList or by mbsfn-SubframeConfigList-v12x0 of serving cell c except in subframes for the serving cell
- indicated by higher layers to decode PMCH or,
- configured by higher layers to be part of a positioning reference signal occasion and the positioning reference signal occasion is only configured within MBSFN subframes and the cyclic prefix length used in subframe #0 is normal cyclic prefix, the UE shall upon detection of a PDCCH with CRC scrambled by the SPS C-RNTI with DCI format 1A/2C/2D, or upon detection of a EPDCCH with CRC scrambled by the SPS C-RNTI with DCI format 1A/2C/2D, or for a configured PDSCH without PDCCH intended for the UE, decode the corresponding PDSCH in the same subframe.

A UE configured in transmission mode 10 can be configured with scrambling identities, $n_{ID}^{DMRS,i}$, i=0.1 by higher layers for UE-specific reference signal generation as defined in subclause 6.10.3.1 of [3] to decode PDSCH according to a detected PDCCH/EPDCCH with CRC scrambled by the SPS C-RNTI with DCI format 2D intended for the UE.

For PDSCH without a corresponding PDCCH/EPDCCH, the UE shall use the value of $n_{scip}$ and the scrambling identity of $n_{ID}^{(nSCID)}$ (as defined in subclause 6.10.3.1 of [3]) derived from the DCI format 2D corresponding to the associated SPS activation for UE-specific reference signal generation.

< . . . >

If a UE is configured by higher layers to decode PDCCH with CRC scrambled by the Temporary C-RNTI and is not configured to decode PDCCH with CRC scrambled by the C-RNTI, the UE shall decode the PDCCH and the corresponding PDSCH according to the combination defined in Table 7.1-7. The scrambling initialization of PDSCH corresponding to these PDCCHs is by Temporary C-RNTI.

< . . . >

7.1.6 Resource Allocation

The UE shall interpret the resource allocation field depending on the PDCCH/EPDCCH DCI format detected. A resource allocation field in each PDCCH/EPDCCH includes two parts, a resource allocation header field and information consisting of the actual resource block assignment.

PDCCH DCI formats 1, 2, 2A, 2B, 2C and 2D with type 0 and PDCCH DCI formats 1, 2, 2A, 2B, 2C and 2D with type 1 resource allocation have the same format and are distinguished from each other via the single bit resource allocation header field which exists depending on the downlink system bandwidth (subclause 5.3.3.1 of [4]), where type 0 is indicated by 0 value and type 1 is indicated otherwise. PDCCH with DCI format 1A, 1B, 1C and 1D have a type 2 resource allocation while PDCCH with DCI format 1, 2, 2A, 2B, 2C and 2D have type 0 or type 1 resource allocation. PDCCH DCI formats with a type 2 resource allocation do not have a resource allocation header field.

EPDCCH DCI formats 1, 2, 2A, 2B, 2C and 2D with type 0 and EPDCCH DCI formats 1, 2, 2A, 2B, 2C and 2D with type 1 resource allocation have the same format and are distinguished from each other via the single bit resource allocation header field which exists depending on the downlink system bandwidth (subclause 5.3.3.1 of [4]), where type 0 is indicated by 0 value and type 1 is indicated otherwise. EPDCCH with DCI format 1A, 1B, and 1D have a type 2 resource allocation while EPDCCH with DCI format 1, 2, 2A, 2B, 2C and 2D have type 0 or type 1 resource allocation. EPDCCH DCI formats with a type 2 resource allocation do not have a resource allocation header field.

MPDCCH with DCI format 6-1A a type 2 resource allocation. Resource allocation for PDCCH with DCI format 6-1B is given by the Resource block assignment field as described in [4]. MPDCCH with DCI format 6-2 assigns a set of six contiguously allocated localized virtual resource blocks within a narrowband. Localized virtual resource blocks are always used in case of MPDCCH with DCI format 6-1A, 6-1B, or 6-2.

A UE may assume, for any PDSCH transmission scheduled by a cell with physical cell identity given in NAICS-AssistanceInfo-r12 and the PDSCH transmission mode belonging to transmissionModeList-r12 associated with the cell except spatial multiplexing using up to 8 transmission layers in transmission mode 10, that the resource allocation granularity and precoding granularity in terms of PRB pairs in the frequency domain are both given by N, where N is given by the higher layer parameter resAllocGranularity-r12 associated with the cell. The first set of N consecutive PRB pairs of the resource allocation starts from the lowest frequency of the system bandwidth and the UE may assume the same precoding applies to all PRB pairs within a set.

For a BL/CE UE, the resource allocation for PDSCH carrying SystemInformationBlockType1-BR and SI messages is a set of six contiguously allocated localized virtual resource blocks within a narrowband. The number of repetitions for the PDSCH carrying SystemInformationBlockType1-BR is determined based on the parameter schedulingInfoSIB1-BR-r13 configured by higher-layers and according to FIG. 33 (a reproduction of Table 7.1.6-1 from 3GPP TS 36.213 V13.1.1). If the value of the parameter schedulingInfoSIB1-BR-r13 configured by higher-layers is set to 0, UE assumes that SystemInformationBlockType1-BR is not transmitted.

7.1.6.1 Resource Allocation Type 0

In resource allocations of type 0, resource block assignment information includes a bitmap indicating the Resource Block Groups (RBGs) that are allocated to the scheduled UE where a RBG is a set of consecutive virtual resource blocks (VRBs) of localized type as defined in subclause 6.2.3.1 of [3]. Resource block group size (P) is a function of the system bandwidth as shown in FIG. 34 (a reproduction of Table 7.1.6.1-1 from 3GPP TS 36.213 V13.1.1). The total number of RBGs ($N_{RBG}$) for downlink system bandwidth of $N_{RB}^{DL}$ is given by $N_{RBG} = \lceil N_{RB}^{DL}/P \rceil$ where $\lfloor N_{RR}^{DL}/P \rfloor$ of the RBGs are of size P and if $N_{RB}^{DL}$ mod P>0 then one of the RBGs is of size $N_{RB}^{DL} - P \cdot \lfloor N_{RB}^{DL}/P \rfloor$. The bitmap is of size $N_{RBG}$ bits with one bitmap bit per RBG such that each RBG is addressable. The RBGs shall be indexed in the order of increasing frequency and non-increasing RBG sizes starting at the lowest frequency. The order of RBG to bitmap bit mapping is in such way that RBG 0 to RBG $N_{RBG}-1$ are mapped to MSB to LSB of the bitmap. The RBG is allocated to the UE if the corresponding bit value in the bitmap is 1, the RBG is not allocated to the UE otherwise.

7.1.6.2 Resource Allocation Type 1

In resource allocations of type 1, a resource block assignment information of size $N_{RBG}$ indicates to a scheduled UE the VRBs from the set of VRBs from one of P RBG subsets. The virtual resource blocks used are of localized type as defined in subclause 6.2.3.1 of [3]. Also P is the RBG size associated with the system bandwidth as shown in FIG. 34

(a reproduction of Table 7.1.6.1-1 from 3GPP TS 36.213 V13.1.1). A RBG subset p, where 0≤p<P, consists of every Pth RBG starting from RBG p. The resource block assignment information consists of three fields [4].

The first field with $\lceil \log_2(P) \rceil$ bits is used to indicate the selected RBG subset among P RBG subsets.

The second field with one bit is used to indicate a shift of the resource allocation span within a subset. A bit value of 1 indicates shift is triggered. Shift is not triggered otherwise.

The third field includes a bitmap, where each bit of the bitmap addresses a single VRB in the selected RBG subset in such a way that MSB to LSB of the bitmap are mapped to the VRBs in the increasing frequency order. The VRB is allocated to the UE if the corresponding bit value in the bit field is 1, the VRB is not allocated to the UE otherwise. The portion of the bitmap used to address VRBs in a selected RBG subset has size $N_{RB}^{TYPE1}$ and is defined as $$N_{RB}^{TYPE1} = \lceil N_{RB}^{DL}/P \rceil - \lceil \log_2(P) \rceil - 1$$

The addressable VRB numbers of a selected RBG subset start from an offset, $\Delta_{shift}(p)$ to the smallest VRB number within the selected RBG subset, which is mapped to the MSB of the bitmap. The offset is in terms of the number of VRBs and is done within the selected RBG subset. If the value of the bit in the second field for shift of the resource allocation span is set to 0, the offset for RBG subset p is given by $\Delta_{shift}(p)=0$. Otherwise, the offset for RBG subset p is given by $\Delta_{shift}(p)=N_{RB}^{RBG\ set}(p)-N_{RB}^{TYPE1}$, where the LSB of the bitmap is justified with the highest VRB number within the selected RBG subset. $N_{RB}^{RBG\ subset}(p)$ is the number of VRBs in RBG subset p and can be calculated by the following equation.

$$N_{RB}^{RBG\ subset}(p) = \begin{cases} \left\lfloor \dfrac{N_{RB}^{DL}-1}{P^2} \right\rfloor \cdot P + P, & p < \left\lfloor \dfrac{N_{RB}^{DL}-1}{P} \right\rfloor \bmod P \\ \left\lfloor \dfrac{N_{RB}^{DL}-1}{P} \right\rfloor \cdot P + (N_{RB}^{DL}-1) \bmod P + 1, & p = \left\lfloor \dfrac{N_{RB}^{DL}-1}{P} \right\rfloor \bmod P \\ \left\lfloor \dfrac{N_{RB}^{DL}-1}{P} \right\rfloor \cdot P, & p > \left\lfloor \dfrac{N_{RB}^{DL}-1}{P} \right\rfloor \bmod P \end{cases}$$

Consequently, when RBG subset p is indicated, bit i for i=0, 1, ..., $N_{RB}^{TYPE1}-1$ in the bitmap field indicates VRB number, $$n_{VRB}^{RBG\ subset}(p) = \left\lfloor \dfrac{i+\Delta_{shift}(p)}{P} \right\rfloor P^2 + p \cdot P + (+\Delta_{shift}(p)) \bmod P.$$

7.1.6.3 Resource Allocation Type 2

For BL/CE UEs with resource allocation type 2 resource assignment, $N_{RB}^{DL}=6$ and $N_{VRB}^{DL}=6$ is used in the rest of this subclause.

In resource allocations of type 2, the resource block assignment information indicates to a scheduled UE a set of contiguously allocated localized virtual resource blocks or distributed virtual resource blocks. In case of resource allocation signalled with PDCCH DCI format 1A, 1B or 1D, or for resource allocation signalled with EPDCCH DCI format 1A, 1B, or 1D, one bit flag indicates whether localized virtual resource blocks or distributed virtual resource blocks are assigned (value 0 indicates Localized and value 1 indicates Distributed VRB assignment) while distributed virtual resource blocks are always assigned in case of resource allocation signalled with PDCCH DCI format 1C. Localized VRB allocations for a UE vary from a single VRB up to a maximum number of VRBs spanning the system bandwidth. For DCI format 1A the distributed VRB allocations for a UE vary from a single VRB up to $N_{VRB}^{DL}$ VRBs, where $N_{VRB}^{DL}$ is defined in [3], if the DCI CRC is scrambled by P-RNTI, RA-RNTI, or SI-RNTI. With PDCCH DCI format 1B, 1D with a CRC scrambled by C-RNTI, or with DCI format 1A with a CRC scrambled with C-RNTI, SPS C-RNTI or Temporary C-RNTI distributed VRB allocations for a UE vary from a single VRB up to $N_{VRB}^{DL}$ VRBs if $N_{RB}^{DL}$ is 6-49 and vary from a single VRB up to 16 if $N_{RB}^{DL}$ is 50-110. With EPDCCH DCI format 1B, 1D with a CRC scrambled by C-RNTI, or with DCI format 1A with a CRC scrambled with C-RNTI, SPS C-RNTI distributed VRB allocations for a UE vary from a single VRB up to $N_{VRB}^{DL}$, VRBs if $N_{RB}^{DL}$ is 6-49 and vary from a single VRB up to 16 if $N_{RB}^{DL}$ is 50-110. With PDCCH DCI format 1C, distributed VRB allocations for a UE vary from $N_{RB}^{step}$ VRB(s) up to $\lfloor N_{VRB}^{DL}/N_{RB}^{step} \rfloor \cdot N_{RB}^{step}$ VRBs with an increment step of $N_{RB}^{step}$, where $N_{RB}^{step}$ value is determined depending on the downlink system bandwidth as shown in FIG. 35 (a reproduction of Table 7.1.6.3-1 from 3GPP TS 36.213 V13.1.1).

For PDCCH DCI format 1A, 1B or 1D, or for EPDCCH DCI format 1A, 1B, or 1D, or for MPDCCH DCI format 6-1A, a type 2 resource allocation field consists of a resource indication value (RIV) corresponding to a starting resource block ($RB_{start}$) and a length in terms of virtually contiguously allocated resource blocks $L_{CRBs}$. The resource indication value is defined by if $(L_{CRBs}-1) \leq \lfloor N_{RB}^{DL}/2 \rfloor$ then $$RIV = N_{RB}^{DL}(L_{CRBs}-1) + RB_{start}$$

else $$RIV = N_{RB}^{DL}(N_{RB}^{DL}-L_{CRBs}+1) + (N_{RB}^{DL}-1-RB_{start})$$

where $L_{CRBs} \geq 1$ and shall not exceed $N_{RB}^{DL}-RB_{start}$.

For PDCCH DCI format 1C, a type 2 resource block assignment field consists of a resource indication value (RIV) corresponding to a starting resource block ($RB_{start}=0$, $N_{RB}^{step}$, $2N_{RB}^{step}$, ..., $(\lfloor N_{VRB}^{DL}/N_{RB}^{step} \rfloor -1)N_{RB}^{step}$) and a length in terms of virtually contiguously allocated resource blocks ($L_{CRBs}=N_{RB}^{step}, 2N_{RB}^{step}, \ldots, \lfloor N_{VRB}^{DL}/N_{RB}^{step} \rfloor \cdot N_{RB}^{step}$).

The resource indication value is defined by:

if $(L'_{CRBs}-1) \leq \lfloor N'_{VRB}^{DL}/2 \rfloor$ then $$RIV = N'_{VRB}^{DL}(L'_{CRBs}-1) + RB'_{start}$$

else $$RIV = N'_{VRB}^{DL}(N'_{VRB}^{DL}-L'_{CRBs}+1) + (N'_{VRB}^{DL}-1-RB'_{start})$$

where $L'_{CRBs} = L_{CRBs}/N_{RB}^{step}$, $RB'_{start} = RB_{start}/N_{RB}^{step}$ and $N'_{VRB}^{DL} = \lfloor N_{VRB}^{DL}/M_{RB}^{step} \rfloor$. Here, $L'_{CRBs} \geq 1$ and shall not exceed $N'_{VRB}^{DL} - RB'_{start}$.

7.1.6.4 PDSCH Starting Position

This subclause describes PDSCH starting position for UEs that are not BL/CE UEs.

PDSCH starting position for BL/CE UEs is described in subclause 7.1.6.4A.

The starting OFDM symbol for the PDSCH of each activated serving cell is given by index $l_{DataStart}$.

For a UE configured in transmission mode 1-9, for a given activated serving cell
  if the PDSCH is assigned by EPDCCH received in the same serving cell, or if the UE is configured to monitor EPDCCH in the subframe and the PDSCH is not assigned by a PDCCH/EPDCCH, and if the UE is configured with the higher layer parameter epdcch-StartSymbol-r11.
    $l_{DataStart}$ is given by the higher-layer parameter epdcch-StartSymbol-r11.
  else if PDSCH and the corresponding PDCCH/EPDCCH are received on different serving cells
    $l_{DataStart}$ is given by the higher-layer parameter pdsch-Start-r10 for the serving cell on which PDSCH is received,
  Otherwise
    $l_{DataStart}$ is given by the CFI value in the subframe of the given serving cell when $N_{RB}^{DL}>10$, and $l_{DataStart}$ is given by the CFI value+1 in the subframe of the given serving cell when $N_{RB}^{DL} \leq 10$.
For a UE configured in transmission mode 10, for a given activated serving cell
  if the PDSCH is assigned by a PDCCH with DCI format 1C or by a PDCCH with DCI format 1A and with CRC scrambled with P-RNTI/RA-RNTI/SI-RNTI/Temporary C-RNTI
    $l_{DataStart}$ is given by the span of the DCI given by the CFI value in the subframe of the given serving cell according to subclause 5.3.4 of [4].
  if the PDSCH is assigned by a PDCCH/EPDCCH with DCI format 1A and with CRC scrambled with C-RNTI and if the PDSCH transmission is on antenna ports 0-3
    if the PDSCH is assigned by EPDCCH received in the same serving cell
      $l_{DataStart}$ is given by $l_{EPDCCHStart}$ for the EPDCCH-PRB-set where EPDCCH with the DCI format 1A was received ($l_{EPDCCHStart}$ as defined in subclause 9.1.4.1),
    else if PDSCH and the corresponding PDCCH/EPDCCH are received on different serving cells
      $l_{DataStart}$ is given by the higher-layer parameter pdsch-Start-r10 for the serving cell on which PDSCH is received.
    otherwise
      $l_{DataStart}$ is given by the CFI value in the subframe of the given serving cell when $N_{RB}^{DL}>10$, and $l_{DataStart}$ is given by the CFI value+1 in the subframe of the given serving cell when $N_{RB}^{DL} \leq 10$.
  if the PDSCH is assigned by or semi-statically scheduled by a PDCCH/EPDCCH with DCI format 1A and if the PDSCH transmission is on antenna port 7
    if the value of the higher layer parameter pdsch-Start-r11 determined from parameter set 1 in table 7.1.9-1 for the serving cell on which PDSCH is received belongs to $\{1, 2, 3, 4\}$,
      $l_{Datastart}$ is given by the higher layer parameter pdsch-Start-r11 determined from parameter set 1 in table 7.1.9-1 for the serving cell on which PDSCH is received.
    else,
      if PDSCH and the corresponding PDCCH/EPDCCH are received on different serving cells,
        $l_{Datastart}$ is given by the higher-layer parameter pdsch-Start-r10 for the serving cell on which PDSCH is received
      otherwise
        $l_{Datastart}$ is given by the CFI value in the subframe of the given serving cell when $N_{RB}^{DL}>10$, and $l_{DataStart}$ is given by the CFI value+1 in the subframe of the given serving cell when $N_{RB}^{DL} \leq 10$.
    if the subframe on which PDSCH is received is indicated by the higher layer parameter mbsfn-SubframeConfigList-r11 determined from parameter set 1 in table 7.1.9-1 for the serving cell on which PDSCH is received, or if the PDSCH is received on subframe 1 or 6 for the frame structure type 2,
      $l_{DataStart} = \min(2, l'_{DataStart})$,
    otherwise
      $l_{DataStart} = l'_{DataStart}$.
  if the PDSCH is assigned by or semi-persistently scheduled by a PDCCH/EPDCCH with DCI format 2D,
    if the value of the higher layer parameter pdsch-Start-r11 determined from the DCI (according to subclause 7.1.9) for the serving cell on which PDSCH is received belongs to (1, 2, 3, 4),
      $l_{Datastart}$ is given by parameter pdsch-Start-r11 determined from the DCI (according to subclause 7.1.9) for the serving cell on which PDSCH is received
    else,
      if PDSCH and the corresponding PDCCH/EPDCCH are received on different serving cells,
        $l_{Datastart}$ is given by the higher-layer parameter pdsch-Start-r10 for the serving cell on which PDSCH is received
      Otherwise
        $l_{Datastart}$ is given by the CFI value in the subframe of the given serving cell when $N_{RB}^{DL}>10$, and $l_{DataStart}$ is given by the CFI value+1 in the subframe of the given serving cell when $N_{RB}^{DL} \leq 10$.
    if the subframe on which PDSCH is received is indicated by the higher layer parameter mbsfn-SubframeConfigList-r11 determined from the DCI (according to subclause 7.1.9) for the serving cell on which PDSCH is received, or if the PDSCH is received on subframe 1 or 6 for frame structure type 2,
      $l_{DataStart} = \min(2, l_{DataStart})$,
    otherwise
      $l_{DataStart} = l'_{DataStart}$.
< . . . >

8 Physical Uplink Shared Channel Related Procedures

If the UE is configured with a SCG, the UE shall apply the procedures described in this clause for both MCG and SCG
  When the procedures are applied for MCG, the terms 'secondary cell', 'secondary cells', 'serving cell', 'serving cells' in this clause refer to secondary cell, secondary cells, serving cell, serving cells belonging to the MCG respectively.
  When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

For a non-BL/CE UE, and for FDD and transmission mode 1, there shall be 8 uplink HARQ processes per serving cell for non-subframe bundling operation, i.e. normal HARQ operation, and 3 uplink HARQ processes for subframe bundling operation when parameter e-HARQ-Pattern-r12 is set to TRUE and 4 uplink HARQ processes for subframe bundling operation otherwise. For a non-BL/CE UE, and for FDD and transmission mode 2, there shall be 16 uplink HARQ processes per serving cell for non-subframe bundling operation and there are two HARQ processes associated with a given subframe as described in [8]. The subframe bundling operation is configured by the parameter ttiBundling provided by higher layers.

For FDD and a BL/CE UE configured with CEModeA, there shall be at most 8 uplink HARQ processes per serving cell.

For FDD and a BL/CE UE configured with CEModeB, there shall be at most 2 uplink HARQ processes per serving cell.

In case higher layers configure the use of subframe bundling for FDD and TDD, the subframe bundling operation is only applied to UL-SCH, such that four consecutive uplink subframes are used.

A BL/CE UE is not expected to be configured with simultaneous PUSCH and PUCCH transmission.

8.0 UE Procedure for Transmitting the Physical Uplink Shared Channel

The term "UL/DL configuration" in this subclause refers to the higher layer parameter subframeAssignment unless specified otherwise.

For FDD and normal HARQ operation, the UE shall upon detection on a given serving cell of a PDCCH/EPDCCH with DCI format 0/4 and/or a PHICH transmission in subframe n intended for the UE, adjust the corresponding PUSCH transmission in subframe n+4 according to the PDCCH/EPDCCH and PHICH information.

For FDD-TDD and normal HARQ operation and a PUSCH for serving cell c with frame structure type 1, the UE shall upon detection of a PDCCH/EPDCCH with DCI format 0/4 and/or a PHICH transmission in subframe n intended for the UE, adjust the corresponding PUSCH transmission for serving cell c in subframe n+4 according to the PDCCH/EPDCCH and PHICH information.

For normal HARQ operation, if the UE detects a PHICH transmission and if the most recent PUSCH transmission for the same transport block was using spatial multiplexing according to subclause 8.0.2 and the UE does not detect a PDCCH/EPDCCH with DCI format 4 in subframe n intended for the UE, the UE shall adjust the corresponding PUSCH retransmission in the associated subframe according to the PHICH information, and using the number of transmission layers and precoding matrix according to the most recent PDCCH/EPDCCH, if the number of negatively acknowledged transport blocks is equal to the number of transport blocks indicated in the most recent PDCCH/EPDCCH associated with the corresponding PUSCH.

For normal HARQ operation, if the UE detects a PHICH transmission and if the most recent PUSCH transmission for the same transport block was using spatial multiplexing according to subclause 8.0.2 and the UE does not detect a PDCCH/EPDCCH with DCI format 4 in subframe n intended for the UE, and if the number of negatively acknowledged transport blocks is not equal to the number of transport blocks indicated in the most recent PDCCH/EPDCCH associated with the corresponding PUSCH then the UE shall adjust the corresponding PUSCH retransmission in the associated subframe according to the PHICH information, using the precoding matrix with codebook index 0 and the number of transmission layers equal to number of layers corresponding to the negatively acknowledged transport block from the most recent PDCCH/EPDCCH. In this case, the UL DMRS resources are calculated according to the cyclic shift field for DMRS [3] in the most recent PDCCH/EPDCCH with DCI format 4 associated with the corresponding PUSCH transmission and number of layers corresponding to the negatively acknowledged transport block.

If a UE is configured with the carrier indicator field for a given serving cell, the UE shall use the carrier indicator field value from the detected PDCCH/EPDCCH with uplink DCI format to determine the serving cell for the corresponding PUSCH transmission.

For FDD and normal HARQ operation, if a PDCCH/EPDCCH with CSI request field set to trigger an aperiodic CSI report, as described in subclause 7.2.1, is detected by a UE on subframe n, then on subframe n+4 UCI is mapped on the corresponding PUSCH transmission, when simultaneous PUSCH and PUCCH transmission is not configured for the UE.

< . . . >

When a UE is configured with higher layer parameter ttiBundling and configured with higher layer parameter e-HARQ-Pattern-r12 set to FALSE or not configured, for FDD and subframe bundling operation, the UE shall upon detection of a PDCCH/EPDCCH with DCI format 0 in subframe n intended for the UE, and/or a PHICH transmission in subframe n−5 intended for the UE, adjust the corresponding first PUSCH transmission in the bundle in subframe n+4 according to the PDCCH/EPDCCH and PHICH information.

When a UE is configured with higher layer parameter ttiBundling and configured with higher layer parameter e-HARQ-Pattern-r12 set to TRUE, for FDD and subframe bundling operation, the UE shall upon detection of a PDCCH/EPDCCH with DCI format 0 in subframe n intended for the UE, and/or a PHICH transmission in subframe n−1 intended for the UE, adjust the corresponding first PUSCH transmission in the bundle in subframe n+4 according to the PDCCH/EPDCCH and PHICH information.

For both FDD and TDD serving cells, the NDI as signalled on PDCCH/EPDCCH, the RV as determined in subclause 8.6.1, and the TBS as determined in subclause 8.6.2, shall be delivered to higher layers.

For a non-BL/CE UE, for TDD and transmission mode 1, the number of HARQ processes per serving cell shall be determined by the UL/DL configuration (Table 4.2-2 of [3]), as indicated in Table 8-1. For TDD and transmission mode 2, the number of HARQ processes per serving cell for non-subframe bundling operation shall be twice the number determined by the UL/DL configuration (Table 4.2-2 of [3]) as indicated in FIG. 36 (a reproduction of Table 8-1 from 3GPP TS 36.213 V13.1.1) and there are two HARQ processes associated with a given subframe as described in [8]. For TDD and both transmission mode 1 and transmission mode 2, the "TDD UL/DL configuration" in FIG. 36 (a reproduction of Table 8-1 from 3GPP TS 36.213 V13.1.1) refers to the UL-reference UL/DL configuration for the serving cell if UL-reference UL/DL configuration is defined for the serving cell and refers to the serving cell UL/DL configuration otherwise.

For a BL/CE UE configured with CEModeA and for TDD, the maximum number of HARQ processes per serving cell shall be determined by the UL/DL configuration (Table 4.2-2 of [3]) according to the normal HARQ operation in Table 8-1. For TDD a BL/CE UE configured with CEModeB is not expected to support more than 2 uplink HARQ processes per serving cell.

< ... >

A UE is semi-statically configured via higher layer signalling to transmit PUSCH transmissions signalled via PDCCH/EPDCCH according to one of two uplink transmission modes, denoted mode 1-2.

If a UE is configured by higher layers to decode PDCCHs with the CRC scrambled by the C-RNTI, the UE shall decode the PDCCH according to the combination defined in FIG. 37 (a reproduction of Table 8-3 from 3GPP TS 36.213 V13.1.1) and transmit the corresponding PUSCH. The scrambling initialization of this PUSCH corresponding to these PDCCHs and the PUSCH retransmission for the same transport block is by C-RNTI.

If a UE is configured by higher layers to decode EPDCCHs with the CRC scrambled by the C-RNTI, the UE shall decode the EPDCCH according to the combination defined in Table 8-3A and transmit the corresponding PUSCH. The scrambling initialization of this PUSCH corresponding to these EPDCCHs and the PUSCH retransmission for the same transport block is by C-RNTI.

If a UE is configured by higher layers to decode MPDCCHs with the CRC scrambled by the C-RNTI, the UE shall decode the MPDCCH according to the combination defined in Table 8-3B and transmit the corresponding PUSCH. The scrambling initialization of this PUSCH corresponding to these MPDCCHs and the PUSCH retransmission for the same transport block is by C-RNTI.

Transmission mode 1 is the default uplink transmission mode for a UE until the UE is assigned an uplink transmission mode by higher layer signalling.

When a UE configured in transmission mode 2 receives a DCI Format 0 uplink scheduling grant, it shall assume that the PUSCH transmission is associated with transport block 1 and that transport block 2 is disabled.

< ... >

If a UE is configured by higher layers to decode PDCCHs with the CRC scrambled by the C-RNTI and is also configured to receive random access procedures initiated by "PDCCH orders", the UE shall decode the PDCCH according to the combination defined in FIG. 38 (a reproduction of Table 8-4 from 3GPP TS 36.213 V13.1.1).

If a UE is configured by higher layers to decode EPDCCHs with the CRC scrambled by the C-RNTI and is also configured to receive random access procedures initiated by "PDCCH orders", the UE shall decode the EPDCCH according to the combination defined in Table 8-4A.

If a UE is configured by higher layers to decode MPDCCHs with the CRC scrambled by the C-RNTI and is also configured to receive random access procedures initiated by "PDCCH orders", the UE shall decode the MPDCCH according to the combination defined in Table 8-4B.

< ... >

If a UE is configured by higher layers to decode PDCCHs with the CRC scrambled by the SPS C-RNTI, the UE shall decode the PDCCH according to the combination defined in Table 8-5 and transmit the corresponding PUSCH.

The scrambling initialization of this PUSCH corresponding to these PDCCHs and PUSCH retransmission for the same transport block is by SPS C-RNTI. The scrambling initialization of initial transmission of this PUSCH without a corresponding PDCCH and the PUSCH retransmission for the same transport block is by SPS C-RNTI.

If a UE is configured by higher layers to decode EPDCCHs with the CRC scrambled by the SPS C-RNTI, the UE shall decode the EPDCCH according to the combination defined in Table 8-5A and transmit the corresponding PUSCH.

The scrambling initialization of this PUSCH corresponding to these EPDCCHs and PUSCH retransmission for the same transport block is by SPS C-RNTI. The scrambling initialization of initial transmission of this PUSCH without a corresponding EPDCCH and the PUSCH retransmission for the same transport block is by SPS C-RNTI.

If a UE is configured by higher layers to decode MPDCCHs with the CRC scrambled by the SPS C-RNTI, the UE shall decode the MPDCCH according to the combination defined in Table 8-5B and transmit the corresponding PUSCH.

The scrambling initialization of this PUSCH corresponding to these MPDCCHs and PUSCH retransmission for the same transport block is by SPS C-RNTI. The scrambling initialization of initial transmission of this PUSCH without a corresponding MPDCCH and the PUSCH retransmission for the same transport block is by SPS C-RNTI.

< ... >

If a UE is configured by higher layers to decode PDCCHs with the CRC scrambled by the Temporary C-RNTI regardless of whether UE is configured or not configured to decode PDCCHs with the CRC scrambled by the C-RNTI, the UE shall decode the PDCCH according to the combination defined in FIG. 39 (a reproduction of Table 8-6 from 3GPP TS 36.213 V13.1.1) and transmit the corresponding PUSCH. The scrambling initialization of PUSCH corresponding to these PDCCH is by Temporary C-RNTI.

< ... >

If a Temporary C-RNTI is set by higher layers, the scrambling of PUSCH corresponding to the Random Access Response Grant in subclause 6.2 and the PUSCH retransmission for the same transport block is by Temporary C-RNTI. Else, the scrambling of PUSCH corresponding to the Random Access Response Grant in subclause 6.2 and the PUSCH retransmission for the same transport block is by C-RNTI.

< ... >

If a UE is configured by higher layers to decode PDCCHs with the CRC scrambled by the TPC-PUCCH-RNTI, the UE shall decode the PDCCH according to the combination defined in FIG. 40 (a reproduction of Table 8-7 from 3GPP TS 36.213 V13.1.1). The notation 3/3A implies that the UE shall receive either DCI format 3 or DCI format 3A depending on the configuration.

< ... >

If a UE is configured by higher layers to decode PDCCHs with the CRC scrambled by the TPC-PUSCH-RNTI, the UE shall decode the PDCCH according to the combination defined in table 8.8. The notation 3/3A implies that the UE shall receive either DCI format 3 or DCI format 3A depending on the configuration.

< ... >

8.1 Resource Allocation for PDCCH/EPDCCH with Uplink DCI Format

Two resource allocation schemes Type 0 and Type 1 are supported for PDCCH/EPDCCH with uplink DCI format.

Resource allocation scheme Type 0 or Type 2 are supported for MPDCCH with uplink DCI format.

If the resource allocation type bit is not present in the uplink DCI format, only resource allocation type 0 is supported.

If the resource allocation type bit is present in the uplink DCI format, the selected resource allocation type for a decoded PDCCH/EPDCCH is indicated by a resource allocation type bit where type 0 is indicated by 0 value and type 1 is indicated otherwise. The UE shall interpret the resource allocation field depending on the resource allocation type bit in the PDCCH/EPDCCH with uplink DCI format detected.

8.1.1 Uplink Resource Allocation Type 0

The resource allocation information for uplink resource allocation type 0 indicates to a scheduled UE a set of contiguously allocated virtual resource block indices denoted by $n_{VRB}$. A resource allocation field in the scheduling grant consists of a resource indication value (RIV) corresponding to a starting resource block ($RB_{START}$) and a length in terms of contiguously allocated resource blocks ($L_{CRBs} \geq 1$). For a BL/CE UE, uplink resource allocation type 0 is only applicable for UE configured with CEModeA and $N_{RB}^{DL}=6$ in this subclause. The resource indication value is defined by if $(L_{CRBs}-1) \leq \lfloor N_{RB}^{DL}/2 \rfloor$ then $$RIV = N_{RB}^{DL}(L_{CRBs}-1) + RB_{START}$$

else $$RIV = N_{RB}^{DL}(N_{RB}^{DL}-L_{CRBs}+1) + (N_{RB}^{DL}-1-RB_{START})$$

8.1.2 Uplink Resource Allocation Type 1

The resource allocation information for uplink resource allocation type 1 indicates to a scheduled UE two sets of resource blocks with each set including one or more consecutive resource block groups of size P as given in FIG. 34 (a reproduction of Table 7.1.6.1-1 from 3GPP TS 36.213 V13.1.1) assuming $N_{RB}^{UL}$ as the system bandwidth. A combinatorial index r consists of $$\left\lceil \log_2 \left( \binom{\lceil N_{RB}^{UL}/P + 1 \rceil}{4} \right) \right\rceil$$

bits. The bits from the resource allocation field in the scheduling grant represent r unless the number of bits in the resource allocation field in the scheduling grant is
- smaller than required to fully represent r, in which case the bits in the resource allocation field in the scheduling grant occupy the LSBs of r and the value of the remaining bits of r shall be assumed to be 0; or
- larger than required to fully represent r, in which case r occupies the LSBs of the resource allocation field in the scheduling grant.

The combinatorial index r corresponds to a starting and ending RBG index of resource block set 1, $s_0$ and $s_1-1$, and resource block set$_2$, $s_2$ and $s_3-1$ respectively, where r is given by equation $$r = \sum_{i=0}^{M-1} \binom{N-s_i}{M-i}$$

defined in subclause 7.2.1 with M=4 and N=$\lceil N_{RB}^{UL}/P \rceil+1$. subclause 7.2.1 also defines ordering properties and range of values that $s_1$ (RBG indices) map to. Only a single RBG is allocated for a set at the starting RBG index if the corresponding ending RBG index equals the starting RBG index.

8.1.3 Uplink Resource Allocation Type 2

Uplink resource allocation type 2 is only applicable for BL/CE UE configured with CEModeB. The resource allocation information for uplink resource allocation type 2 indicates to a scheduled UE a set of contiguously allocated resource blocks within a narrowband as given in FIG. 42 (a reproduction of Table 8.1.3-1 from 3GPP TS 36.213 V13.1.1)

< . . . >

9.1 UE Procedure for Determining Physical Downlink Control Channel Assignment

9.1.1 PDCCH Assignment Procedure

The control region of each serving cell consists of a set of CCEs, numbered from 0 to $N_{CCE,k}-1$ according to subclause 6.8.1 in [3], where $N_{CCE,k}$ is the total number of CCEs in the control region of subframe k.

The UE shall monitor a set of PDCCH candidates on one or more activated serving cells as configured by higher layer signalling for control information, where monitoring implies attempting to decode each of the PDCCHs in the set according to all the monitored DCI formats. A BL/CE UE is not required to monitor PDCCH.

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by $$L\{(Y_k+m') \bmod \lfloor N_{CCE,k}/L \rfloor\}+i$$

where $Y_k$ is defined below, i=0, . . . , L−1. For the common search space m'=m. For the PDCCH UE specific search space, for the serving cell on which PDCCH is monitored, if the monitoring UE is configured with carrier indicator field then m'=m+$M^{(L)} \cdot n_{CI}$ where $n_{CI}$ is the carrier indicator field value, else if the monitoring UE is not configured with carrier indicator field then m'=m, where m=0, . . . , $M^{(L)}$−1. $M^{(L)}$ is the number of PDCCH candidates to monitor in the given search space.

If a UE is configured with higher layer parameter cif-InSchedulingCell-r13, the carrier indicator field value corresponds to cif-InSchedulingCell-r13, otherwise, the carrier indicator field value is the same as ServCellIndex given in [11].

The UE shall monitor one common search space in every non-DRX subframe at each of the aggregation levels 4 and 8 on the primary cell.

A UE shall monitor common search space on a cell to decode the PDCCHs necessary to receive MBMS on that cell when configured by higher layers.

If a UE is not configured for EPDCCH monitoring, and if the UE is not configured with a carrier indicator field, then the UE shall monitor one PDCCH UE-specific search space at each of the aggregation levels 1, 2, 4, 8 on each activated serving cell in every non-DRX subframe.

If a UE is not configured for EPDCCH monitoring, and if the UE is configured with a carrier indicator field, then the UE shall monitor one or more UE-specific search spaces at each of the aggregation levels 1, 2, 4, 8 on one or more activated serving cells as configured by higher layer signalling in every non-DRX subframe.

If a UE is configured for EPDCCH monitoring on a serving cell, and if that serving cell is activated, and if the UE is not configured with a carrier indicator field, then the UE shall monitor one PDCCH UE-specific search space at each of the aggregation levels 1, 2, 4, 8 on that serving cell in all non-DRX subframes where EPDCCH is not monitored on that serving cell.

If a UE is configured for EPDCCH monitoring on a serving cell, and if that serving cell is activated, and if the UE is configured with a carrier indicator field, then the UE shall monitor one or more PDCCH UE-specific search spaces at each of the aggregation levels 1, 2, 4, 8 on that serving cell as configured by higher layer signalling in all non-DRX subframes where EPDCCH is not monitored on that serving cell.

The common and PDCCH UE-specific search spaces on the primary cell may overlap.

A UE configured with the carrier indicator field associated with monitoring PDCCH on serving cell c shall monitor PDCCH configured with carrier indicator field and with CRC scrambled by C-RNTI in the PDCCH UE specific search space of serving cell c.

A UE configured with the carrier indicator field associated with monitoring PDCCH on the primary cell shall monitor PDCCH configured with carrier indicator field and with CRC scrambled by SPS C-RNTI in the PDCCH UE specific search space of the primary cell.

The UE shall monitor the common search space for PDCCH without carrier indicator field.

For the serving cell on which PDCCH is monitored, if the UE is not configured with a carrier indicator field, it shall monitor the PDCCH UE specific search space for PDCCH without carrier indicator field, if the UE is configured with a carrier indicator field it shall monitor the PDCCH UE specific search space for PDCCH with carrier indicator field.

If the UE is not configured with a LAA Scell, the UE is not expected to monitor the PDCCH of a secondary cell if it is configured to monitor PDCCH with carrier indicator field corresponding to that secondary cell in another serving cell.

If the UE is configured with a LAA Scell, the UE is not expected to monitor the PDCCH UE specific space of the LAA SCell if it is configured to monitor PDCCH with carrier indicator field corresponding to that LAA Scell in another serving cell,
  where the UE is not expected to be configured to monitor PDCCH with carrier indicator field in an LAA Scell;
  where the UE is not expected to be scheduled with PDSCH starting in the second slot in a subframe in an LAA Scell if the UE is configured to monitor PDCCH with carrier indicator field corresponding to that LAA Scell in another serving cell.

For the serving cell on which PDCCH is monitored, the UE shall monitor PDCCH candidates at least for the same serving cell.

A UE configured to monitor PDCCH candidates with CRC scrambled by C-RNTI or SPS C-RNTI with a common payload size and with the same first CCE index $n_{CCE}$ (as described in subclause 10.1) but with different sets of DCI information fields as defined in [4] in the common search space PDCCH UE Specific Search Space
on the primary cell shall assume that for the PDCCH candidates with CRC scrambled by C-RNTI or SPS C-RNTI,
  if the UE is configured with the carrier indicator field associated with monitoring the PDCCH on the primary cell, only the PDCCH in the common search space is transmitted by the primary cell;
  otherwise, only the PDCCH in the UE specific search space is transmitted by the primary cell.

A UE configured to monitor PDCCH candidates in a given serving cell with a given DCI format size with CIF, and CRC scrambled by C-RNTI, where the PDCCH candidates may have one or more possible values of CIF for the given DCI format size, shall assume that a PDCCH candidate with the given DCI format size may be transmitted in the given serving cell in any PDCCH UE specific search space corresponding to any of the possible values of CIF for the given DCI format size.

If a serving cell is a LAA Scell, and if the higher layer parameter subframeStartPosition for the Scell indicates 's07',
  The UE monitors PDCCH UE-specific search space candidates on the Scell in both the first and second slots of a subframe, and the aggregation levels defining the search spaces are listed in FIG. 44 (a reproduction of Table 9.1.1-1A from 3GPP TS 36.213 V13.1.1);
otherwise,
  The aggregation levels defining the search spaces are listed in Table 9.1.1-1.

If a serving cell is a LAA Scell, the UE may receive PDCCH with DCI CRC scrambled by CC-RNTI as described in subclause 13A on the LAA Scell.

The DCI formats that the UE shall monitor depend on the configured transmission mode per each serving cell as defined in subclause 7.1.

If a UE is configured with higher layer parameter skipMonitoringDCI-format0-1A for a serving cell, the UE is not required to monitor the PDCCH with DCI Format 0/1A in the UE specific search space for that serving cell.

If a UE is configured with higher layer parameter pdcch-candidateReductions for a UE specific search space at aggregation level L for a serving cell, the corresponding number of PDCCH candidates is given by $M^{(L)}=\text{round}(\alpha \times M_{full}^{(L)})$, where the value of a is determined according to FIG. 45 (a reproduction of Table 9.1.1-2 from 3GPP TS 36.213 V13.1.1) and $M_{full}^{(L)}$ is determined according to FIG. 43 (a reproduction of Table 9.1.1-1 from 3GPP TS 36.213 V13.1.1) by replacing $M^{(L)}$ with $M_{full}^{(L)}$.

For the common search spaces, $Y_k$ is set to 0 for the two aggregation levels L=4 and L=8.

For the UE-specific search space $S_k^{(L)}$ at aggregation level L, the variable $Y_k$ is defined by $$Y_k = (A \cdot Y_{k-1}) \mod D$$

where $Y_{-1}=n_{RNTI} \neq 0$, A=39827, D=65537 and $k=\lfloor n_s/2 \rfloor$, $n_s$ is the slot number within a radio frame.

The RNTI value used for $n_{RNTI}$ is defined in subclause 7.1 in downlink and subclause 8 in uplink.

When it comes to NR, backward compatibility is not necessarily required. Numerology can be adjusted so that a reducing symbol number of a TTI would not be the only tool to change TTI length. Using LTE numerology, as an example, it comprises 14 OFDM symbol in 1 ms and a subcarrier spacing of 15 KHz. When the subcarrier spacing goes to 30 KHz, under the assumption of the same FFT (Fast Fourier Transform) size and the same Cyclic Prefix (CP) structure, there would be 28 OFDM symbols in 1 ms. Equivalently, the TTI become 0.5 ms if the number of OFDM symbol in a TTI is kept the same. This implies the design between different TTI lengths can be kept common with good scalability performed on the subcarrier spacing. Of course, there would always be a trade-off for the subcarrier spacing selection, e.g., FFT size, definition/number of Physical Resource Block (PRB), the design of CP, or supportable system bandwidth. While NR considers a larger system bandwidth and a larger coherence bandwidth, the inclusion of a larger sub carrier spacing is contemplated.

As disclosed above, it is very difficult to fulfill all the diverse requirements with a single numerology. Therefore, in early 3GPP RAN1 meetings, it was acknowledged that more than one numerology would be adopted. Considering the standardization and implementation efforts as well as the multiplexing capability among different numerologies, it would be beneficial to have some relationship between the different numerologies such as an integral multiple relationship. Several numerology families were raised during the 3GPP meetings with one numerology family being based on LTE 15 KHz, and other numerologies (see Alt. 2-4 disclosed below) which allows power N of 2 symbols in 1 ms:

For NR, it is necessary to support more than one values of subcarrier-spacing
  Values of subcarrier-spacing are derived from a particular value of subcarrier-spacing multiplied by N where N is an integer
    Alt.1: Subcarrier-spacing values include 15 kHz subcarrier-spacing (i.e., LTE based numerology)
    Alt.2: Subcarrier-spacing values include 17.5 kHz subcarrier-spacing with uniform symbol duration including CP length
    Alt.3: Subcarrier-spacing values include 17.06 kHz subcarrier-spacing with uniform symbol duration including CP length
    Alt.4: Subcarrier-spacing values 21.33 kHz
    Note: other alternatives are not precluded
    FFS (For Further Study): the exact value of a particular value and possible values of N
  The values of possible subcarrier-spacing will be further narrowed-down in RAN1#85.

Also, whether there would be restriction on the multiplier of a given numerology family was also discussed during 3GPP RAN1 meetings. The power of 2 (Alt.1 disclosed below) drew some interest because it can multiplex different numerologies easier without introducing much overhead when different numerologies are multiplexed in time domain:

RAN1 will continue further study and conclude between following alternatives in the next meeting
Alt. 1:
  The subcarrier spacing for the NR scalable numerology should scale as $f_{sc} = f_0 * 2^m$ where
    $f_0$ is FFS
    m is an integer chosen from a set of possible values
Alt. 2:
  The subcarrier spacing for the NR scalable numerology should scale as $f_{sc} = f_0 * M$ where
    $f_0$ is FFS
    M is an integer chosen from a set of possible positive values.

Usually, RAN1 works in a band agnostic manner so that a scheme/feature would be assumed to be applicable for all frequency bands. In the following RAN4, a group would derive relevant test case considering whether some combinations are unrealistic or whether deployment can be done reasonably. This rule would still be assumed in NR, but some companies do see that there would be restrictions as the frequency range of NR is quite high:

For the study of NR, RAN1 assumes that multiple (but not necessarily all) OFDM numerologies can apply to the same frequency range
  Note: RAN1 does not assume to apply very low value of subcarrier spacing to very high carrier frequency.
The above-discussed use cases for NR have diverse requirements in terms of data rates, latency, and coverage. Enhanced mobile broadband (eMBB) is expected to support peak data rate (20 Gbps for downlink and 10 Gbps for uplink) and user experienced data rates in the order of three times IMT (International Mobile Telecommunications)-Advanced. On the other hand, in case of URLLC (Ultra Reliable Low Latency Communication), the tighter requirements are put on ultra-low latency (0.5 ms for UL and DL each for user plane latency) and high reliability (1-10-5 within 1 ms). Finally, mMTC (massive Machine Type Communications) requires high connection density (1,000,000 devices/km2 in urban environment), large coverage in harsh environments ([164 dB] MCL (Maximum Coupling Loss)), and extremely long-life battery (15 years) for low cost devices.

One option provides FDM/TDM of different types for subframes and/or subbands with different subcarrier numerologies (i.e., different subcarrier-spacing values and correspondingly different OFDM symbol lengths) in a single system bandwidth of a cell where the different subcarrier values are chosen according to the use-case specific requirements. In this case, a UE may be configured with a single subcarrier numerology or multiple subcarrier numerologies, possibly depending upon UE capability, UE category, and UE-supported use cases.

Figure 46:
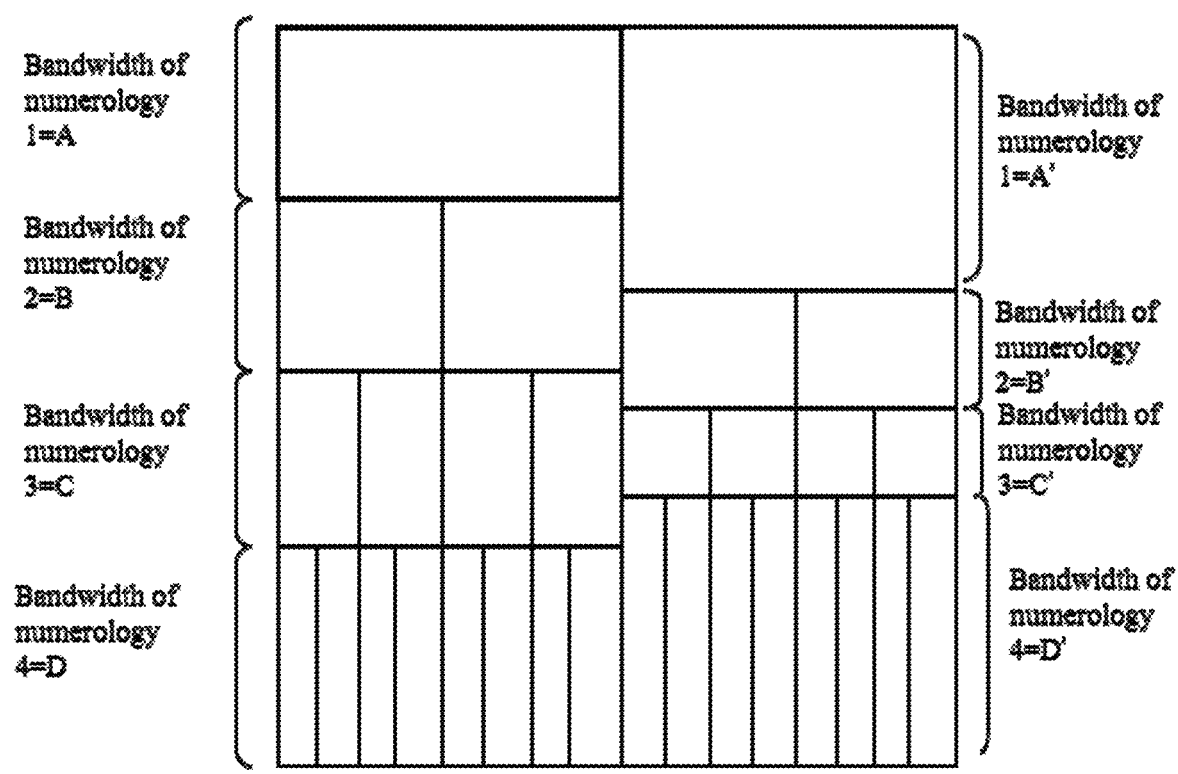
FIG. 46 illustrates one exemplary embodiment of adjusting bandwidth and frequency location for each numerology.

The network may provide a given numerology with certain bandwidth and in a certain frequency location within the whole system bandwidth of a cell, e.g. 100 MHz or 200 MHz. The bandwidth and frequency location may be adjusted according to certain conditions such as the amount of traffic required for each numerology, as shown in FIG. 46. It is noted that FIG. 46 is an example for illustration purposes and the bandwidth for a given numerology may be non-contiguous in frequency domain as well. Therefore, when a UE is configured with a numerology, there still requires additional consideration to determine whether or how the UE knows the bandwidth partition including the bandwidth and/or frequency location for a given numerology, and the UE can correctly derives resource allocation for data transmission or reception.

Accordingly, the following messages or channels can be used to carry the information regarding bandwidth partition to a UE. In one embodiment, information regarding bandwidth partition is signaled by the Physical Broadcast Channel (PBCH) and/or System Information Block (SIB). The information regarding bandwidth partition for all numerologies is signaled on a specific numerology. More specifically, the specific numerology is the numerology with which the UE detects the corresponding synchronization signal. Alternatively, the information is signaled on a per numerology basis. That is, a numerology would provide its own bandwidth partition in PBCH and/or SIB on the numerology.

Before receiving the bandwidth partition information for a numerology, the UE assumes a default bandwidth partition on the numerology. An example of the default bandwidth partition includes a fixed bandwidth and a frequency location derived from the synchronization signal. More specifically, the frequency location would be derived from a system bandwidth of a cell (e.g. the total bandwidth for all numerologies), in addition to synchronization. In one embodiment, synchronization would determine a first frequency location. The first frequency location and an offset value would determine a second frequency location. The default bandwidth locates in the second frequency location (center frequency or starting frequency). More specifically, the offset value is determined from the total system bandwidth. Alternatively, the offset value is determined from information carried on the MIB or SIB.

In another embodiment, MIB would indicate a first bandwidth partition of a numerology. The first bandwidth partition allows a UE to receive some common signaling, such as the SIB, on the numerology. The common signal would further indicate a second bandwidth partition of the numerology. A subsequent UE reception would follow the second bandwidth partition.

In yet another alternative, information regarding a bandwidth is signalled by Radio Resource Control (RRC) message. The MIB or SIB would indicate a first bandwidth partition of a first numerology. The first bandwidth partition allows the UE to receive at least some common signaling, such as SIB, on the first numerology. The first bandwidth partition would be utilized and after entering the connected mode, a UE-specific RRC would further indicate a second bandwidth partition of the first numerology. A subsequent UE reception would utilize the second bandwidth partition. If the second bandwidth partition of the first numerology is absent, the UE would continue to use the first bandwidth partition.

In another embodiment, the MIB or SIB would indicate a first bandwidth partition of a first numerology. The first bandwidth partition allows the UE to receive at least some common signaling, such as the SIB, on the first numerology. The first bandwidth partition would be utilized and after entering the connected mode, a UE-specific RRC message would further configure a second numerology and a second bandwidth partition of the second numerology. A subsequent UE reception would be on the second numerology following the second bandwidth partition.

In an alternate embodiment, the physical control channel can be used to carry the information of the bandwidth partition. In one embodiment, the information can be used for a single TTI. Alternatively, the information can be used for multiple TTIs. More specifically, the multiple TTIs are within a fixed duration. Alternatively, the multiple TTIs start at predefined timing. Alternatively, the multiple TTIs start a predetermined number X TTIs after receiving the physical control channel. Alternatively, the information can be used until new information is received. In one embodiment, the information is transmitted together with scheduling information. The scheduling information is for DL data. Alternatively, the information is transmitted on a specific physical control channel which does not comprise scheduling information. Preferably, the information includes bandwidth partition for all available numerologies. Alternatively, the information includes bandwidth partition for a single numerology. More specifically, the single numerology is the numerology UE is configured with. Alternatively, the single numerology is the numerology UE decodes a corresponding physical control channel with. Alternatively, the single numerology is indicated in the same physical control channel.

In another embodiment, a UE-specific RRC message would configure a first bandwidth partition of a first numerology. A subsequent UE reception would be on the first numerology following the first bandwidth partition. A physical control channel can further indicate a second numerology and a second bandwidth partition of the second numerology. A subsequent UE reception would be on the second numerology following the second bandwidth partition.

In another alternative embodiment, a whole system bandwidth of a cell can be considered as potential candidates for a numerology. In one embodiment, the maximum bandwidth that a UE can receive with the numerology is less than the system bandwidth of a cell. The network indicates to the UE which resource blocks would be utilized for the data transmission based on the numerology that the UE is configured with. The UE can ignore a scheduling if the total resource allocated for the UE is larger than what UE is able to receive or if the bandwidth indicated is larger than what UE is able to receive. Alternatively, the UE can receive data according to a scheduling if total resources allocated for the UE is larger than what UE is able to receive or if a bandwidth indicated is larger than what UE is able to receive. More specifically, the UE would receive the data within a maximum bandwidth that can be received by the UE and it does not receive the data outside the maximum bandwidth. The UE may need a way to decide which part of the received data is a valid resource to be counted in the maximum bandwidth. In one example, the UE counts the maximum bandwidth starting from the resource block with lowest frequency within the resource allocation. In another example, the UE counts the maximum bandwidth starting from the resource block with highest frequency within the resource allocation.

In some or all of the above-disclosed embodiments, messages or channels can be combined to carry the information regarding bandwidth partition to a UE. That is, the information regarding bandwidth partition can be carried on one or more of the messages or channels in parallel and/or a part of the information can be carried in one message or channel while the remaining part can be carried in one or more messages or channels. Furthermore, the embodiments or any combination thereof can all be enhanced on basis of the following features.

In one embodiment, the indication comprises a bandwidth portion index associated with a resource allocation within the bandwidth portion. In one embodiment, a number of the bandwidth portion is fixed. Alternatively, the number of bandwidth portion is configured by a network. In another alternative, the number of bandwidth portion is derived from a system bandwidth. More specifically, the number of bandwidth portion is equal to the system bandwidth divided by the maximum bandwidth that can be received by a UE with the numerology. For example, if the system bandwidth is 100 MHz and the maximum bandwidth for a numerology is 20 MHz, there would be 5 bandwidth portions for the numerology. The value may be rounded up if the system bandwidth cannot be equally divided by the maximum bandwidth. Using the previous example, if the system bandwidth is 100 MHz and a second numerology whose maximum bandwidth is 40 MHz, the resulting value (2.5) would be rounded up to 3 bandwidth portions for the second numerology. Different numerologies may have different maximum bandwidths, which results in different values for the bandwidth portion.

Alternatively, the bandwidth of bandwidth portion is configured by RRC. In another alternative, the bandwidth of bandwidth portion is fixed. In another alternative, the bandwidth portion may be indexed from the lower frequency, higher frequency, or the center frequency.

In some embodiments, the resource allocation within the bandwidth portion is done via a bit map. Alternatively, the resource allocation within the bandwidth portion is done by a value indicating starting position and a bandwidth of the resource allocation. Alternatively, the resource allocation within the bandwidth portion is done by a value indicating the starting position(s) and the ending position(s) of the resource allocation.

In another embodiment, the resource allocation granularity differs depending upon the numerology. More specifically, a numerology with larger subcarrier spacing would have a finer granularity of resource allocation than a numerology with a smaller subcarrier spacing. In one embodiment, the number of PRBs within a resource scheduling unit would be different for different numerologies. By way of example but not of limitation, the number of PRBs within a resource scheduling unit for a numerology with a larger subcarrier spacing would be less than a numerology with a smaller subcarrier spacing.

In another embodiment, the number of subcarriers within a resource scheduling unit would be different for different numerologies. More specifically, the number of subcarriers within a resource scheduling unit for a numerology with a larger subcarrier spacing would be less than a numerology with a smaller subcarrier spacing. In one non-limiting example, a numerology with 30 KHz subcarrier spacing would have 48 subcarriers as a scheduling unit and a numerology with 60 KHz subcarrier spacing would have 24 subcarriers as a scheduling unit. There may be inverse-proportional relationship between the numbers of subcarrier/PRB in resource units for different numerologies. For example, a numerology with X KHz subcarrier spacing would have Y subcarriers as a scheduling unit, and a numerology with 2X KHz subcarrier spacing would have Y/2 subcarriers as a scheduling unit. In one embodiment, a bitmap can be transmitted with a numerology configured for a UE, and the bitmap also can be used for indicating which resource unit is allocated for the UE.

In one exemplary embodiment, a value can be used for indicating which resource unit is allocated for a UE and transmitted with the numerology configured for the UE, e.g., the starting position of the resource unit is allocated for the UE and/or length of the allocation.

In another exemplary embodiment, the number of a subcarrier within a resource unit is a function of a system bandwidth. More specifically, the number of subcarrier within a resource unit is a function of a numerology.

As discussed in the above-disclosed embodiments, the UE may choose to receive part of the resource allocation if the allocated resource exceeds what the UE is able to receive. In one example, the UE counts the maximum bandwidth starting from the resource block with lowest frequency within the resource allocation. In another example, the UE counts the maximum bandwidth starting from the resource block with highest frequency within the resource allocation.

In another embodiment, the UE determines the bandwidth partition according to the resource when a corresponding control channel is decoded. There would be an association between a bandwidth portion and a resource for a control channel. When the UE decodes the control channel in a certain resource, the UE realizes a corresponding data scheduled by the control channel would be transmitted within a bandwidth portion associated with the resource. More specifically, the control channel would carry resource allocation within the associated bandwidth portion to let UE know which resource block is allocated to the UE and the allocated resource block(s) is transmitted with the numerology UE configured with. In one embodiment, the association is configured by the RRC. Alternatively, the association is the bandwidth portion associated with a control channel resource.

In one exemplary embodiment, the control channel resource would spread across the system bandwidth. Alternatively, the control channel resource would spread across a configured bandwidth. In another exemplary embodiment, the UE would attempt to decode the control channel on multiple control channel resources that are associated with the same bandwidth portion. Alternatively, the UE would attempt to decode the control channel on multiple control channel resources that are associated with different bandwidth portions. In these embodiments, the different bandwidth portions do not overlap each other. Alternatively, the different bandwidth portions overlap each other. In one exemplary embodiment, the number of bandwidth portion is fixed. In other embodiments, the number of bandwidth portions is configured by the network. Alternatively, the number of bandwidth portion is derived from the system bandwidth. More specifically, the number of bandwidth portions is equal to the system bandwidth divided by the maximum bandwidth that can be received by a UE with the numerology with the possible number of bandwidth portions rounded up if the system bandwidth cannot be equally divided by the maximum bandwidth. For example, if the system bandwidth is 100 MHz and the maximum bandwidth for a numerology is 20 MHz, there would be 5 bandwidth portions for the numerology. Using the previous example, if the system bandwidth is 100 MHz and a second numerology whose maximum bandwidth is 40 MHz, the resulting value (2.5) would be rounded up to 3 bandwidth portions for the second numerology.

Different numerology may have different maximum bandwidths, which results in different numbers of bandwidth portions. Alternatively, the bandwidth of the bandwidth portion is configured by the RRC. Alternatively, the bandwidth of bandwidth portion is fixed. In one embodiment, the resource allocation within the bandwidth portion is done via a bitmap. Alternatively, the resource allocation within the bandwidth portion is done by a value indicating a starting position and a bandwidth of the resource allocation. Alternatively, the resource allocation within the bandwidth portion is done by a value indicating a starting position(s) and an ending position(s) of the resource allocation. In one exemplary embodiment, the control channel resource is all the resources carrying the control channel. Alternatively, the control channel resource is a part of the resources carrying the control channel. In other words, the part of the resources carrying the control channel is defined as the resource with the lowest frequency. Alternatively, the part of the resources carrying the control channel is defined as the resource with the lowest index.

As those skilled in the art will appreciate, any combinations of the above-disclosed embodiments can be used to form a new method to signal the information regarding the bandwidth partition.

The content of bandwidth partition information of a numerology may be a frequency location and a bandwidth for the numerology.

In one embodiment, a frequency location is defined as the frequency location of a center resource block of the bandwidth partition for the numerology. Alternatively, the frequency location is defined as the frequency location of a resource block with the lowest frequency of the bandwidth partition for the numerology. Alternatively, the frequency location is defined as a frequency location of a resource block with highest frequency of the bandwidth partition for the numerology.

In one embodiment, the different numerologies may use different types of frequency locations. By way of example but not of limitation, a first frequency location of a first numerology is given by a frequency location of a center resource block of the bandwidth partition for the first numerology, and a second frequency location of a second numerology is given by a frequency location of a resource block with the lowest frequency of the bandwidth partition for the second numerology.

The bandwidth may be expressed in the unit of a resource block. In one exemplary embodiment, the resource block is a physical resource block. In one exemplary embodiment, the resource blocks using the numerology is contiguous in the frequency domain.

The content of bandwidth partition information of a numerology may be a frequency location for the numerology. In one embodiment, the frequency location is a frequency location of a center resource block of the bandwidth partition for the numerology. Alternatively, the frequency location is a frequency location of a resource block with lowest frequency of the bandwidth partition for the numerology. In another alternative, the frequency location is a frequency location of a resource block with highest frequency of the bandwidth partition for the numerology.

Different numerologies may use different type of frequency location. In one embodiment, a first frequency location of a first numerology is given by a frequency location of a center resource block of the bandwidth partition for the first numerology. The second frequency location of a second numerology is given by a frequency location of a resource block with lowest frequency of the bandwidth partition for the second numerology.

In one embodiment, the bandwidth of the numerology is a predefined value. The predefined value is a maximum bandwidth UE supports, for example, due to FFT size. Alternatively, the predefined value is a maximum bandwidth of the numerology. In another alternative, the predefined value is a bandwidth indicated in system information. In yet another alternative, the predefined value is derived from a total system bandwidth. More specifically, the predefined value is a bandwidth of the total system bandwidth equally divided by a number of available numerology. The available numerology means the network supports the numerology. Alternatively, the available numerology means the network is transmitting with the numerology.

The content of the bandwidth partition information of a numerology may be a bandwidth for the numerology. The bandwidth may be expressed in the unit of a resource block.

In an exemplary embodiment, the resource block is a physical resource block.

In an exemplary embodiment, the resource blocks of the bandwidth part for the numerology is contiguous in the frequency domain.

In one embodiment, a frequency location is the frequency location of a center resource block of the bandwidth partition for the numerology. Alternatively, the frequency location is a frequency location of a resource block with lowest frequency of the bandwidth partition for the numerology. In yet another alternative, the frequency location is a frequency location of a resource block with highest frequency of the bandwidth partition for the numerology.

The frequency location of the numerology is predefined. In one embodiment, the frequency location is indicated by the system information. In another embodiment, the frequency location is derived from synchronization and an offset value, which is indicated by the system information. Alternatively, the offset value is determined according to a total system bandwidth.

In still another embodiment, the frequency location is fixed. In one exemplary embodiment, the frequency location is a resource block with the lowest frequency among all the resource blocks within the system bandwidth. The resource block may be a resource block with the lowest frequency of the bandwidth partition for the numerology. In another exemplary embodiment, the frequency location is a resource block with the highest frequency among all the resource blocks within the system bandwidth. The resource block is a resource block with the highest frequency of the bandwidth partition for the numerology.

Different numerologies may use different types of frequency locations. In one exemplary embodiment, a first frequency location of a first numerology is given by a frequency location of a center resource block of the bandwidth partition for the first numerology. The second frequency location of a second numerology is given by a frequency location of a resource block with the lowest frequency of the bandwidth partition for the second numerology.

Each consecutive frequency resource (cluster) of a numerology can be identified by one starting position, one ending position, and the resource block between the starting and ending positions. If the resource blocks using the numerology are contiguous in the frequency domain, one starting position and one ending position can be used to identify which resource block(s) uses the numerology. Alternatively, if resource blocks using the numerology are contiguous in the frequency domain, multiple starting positions and multiple ending positions can be used to identify which resource block(s) uses the numerology.

In one exemplary embodiment, the starting position and ending position can be indicated by a sum of the binomial coefficients. The sum of the binomial coefficients can be used to indicate starting position and ending position of multiple numerologies.

In one embodiment, the number of the starting position and/or ending position can be configured by RRC. In another embodiment, the number of the starting position and/or ending position can be broadcasted in the system information. In yet another embodiment, the number of the starting position and/or ending position can be a fixed value. In another embodiment, the number of the starting position and/or ending position is determined according to the number of the available numerology. In another embodiment, the number of the starting position and/or ending position is signaled together with the sum of the binomial coefficients.

Each resource block or a group of resource blocks is represented by a bit in a bitmap. There is one bit map associated with a numerology. If a bit in a bitmap is set to one, a resource block or a group of resource blocks corresponding to the bit would use the numerology associated with the bitmap.

It is contemplated that the above alternatives can be combined to form new methods to express bandwidth partition information. Also, any of the methods expressing bandwidth partition information can be associated with any combination of the above-disclosed methods to signal the information regarding the bandwidth partition.

In one exemplary embodiment, the bandwidth partitions information may be for all numerologies the cell is transmitting. Alternatively, the bandwidth partitions information may be for a specific numerology. In another embodiment, the specific numerology is the numerology being used by the UE. In yet another embodiment, the specific numerology is the numerology that the UE is interested in.

As disclosed above, the network may want to update the bandwidth partitions of the numerologies according to some criteria, e.g., the traffic amount on each numerology. If the information is updated frequently, the network needs to transmit the new bandwidth partition information frequently. Also, the transition of adjusting the bandwidth would be much more frequent. Accordingly, a virtual bandwidth partition can be utilized to solve the frequent update issue.

Figure 47:
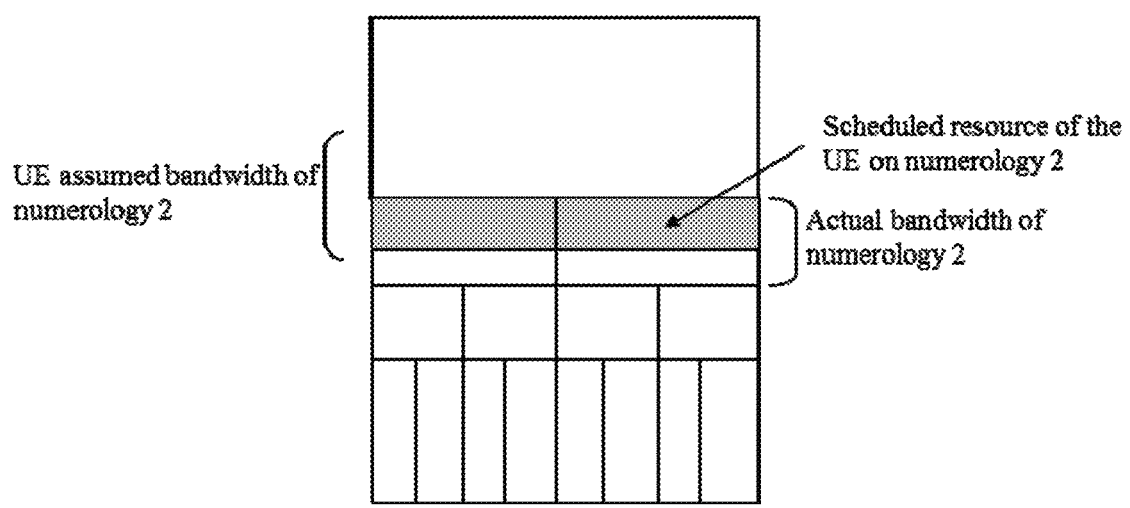
FIG. 47 illustrates on exemplary embodiment of the assumed bandwidth of a numerology and scheduling resources of the UE on the numerology.

If an evolved Node B (eNB) does not intend to schedule a UE outside the bandwidth partition of a numerology configured for the UE, the eNB does not have to update the bandwidth partition configuration of the numerology of the UE. The UE may have a different understanding of the real numerology bandwidth; thus, the UE should not make any assumption on what numerology is used for a resource block outside the scheduled resource even if the resource block is within the configured bandwidth partition of the numerology. For example, if a UE is configured with a resource block 20-80 for a numerology with a 30 KHz subcarrier spacing and is scheduled with resource block 31-60 in a TTI, the UE can receive the data in resource block 31-60 with numerology 1 in the TTI. The UE should not assume that resource block 20-30 and resource block 61-80 are transmitted with numerology 1 in the TTI. For example, the UE should not assume there is reference signal for measurement in resource block 20-30 and resource block 61-80 with numerology 1. In another example, the UE should not assume that there is a reference signal in resource block 20-30 and resource block 61-80 with numerology 1 for demodulation. If in the TTI and the CSI-RS (Channel State Information-Reference Signal) is configured, the UE does not perform a CSI (Channel State Information) measurement on resource block 20-30 and resource block 61-80, but rather the UE performs a measurement within resource block 31-60. An illustration of this example is shown in FIG. 47.

As disclosed in the specification, the bandwidth portion may be defined as a set of resources in the frequency domain.

Figure 48:
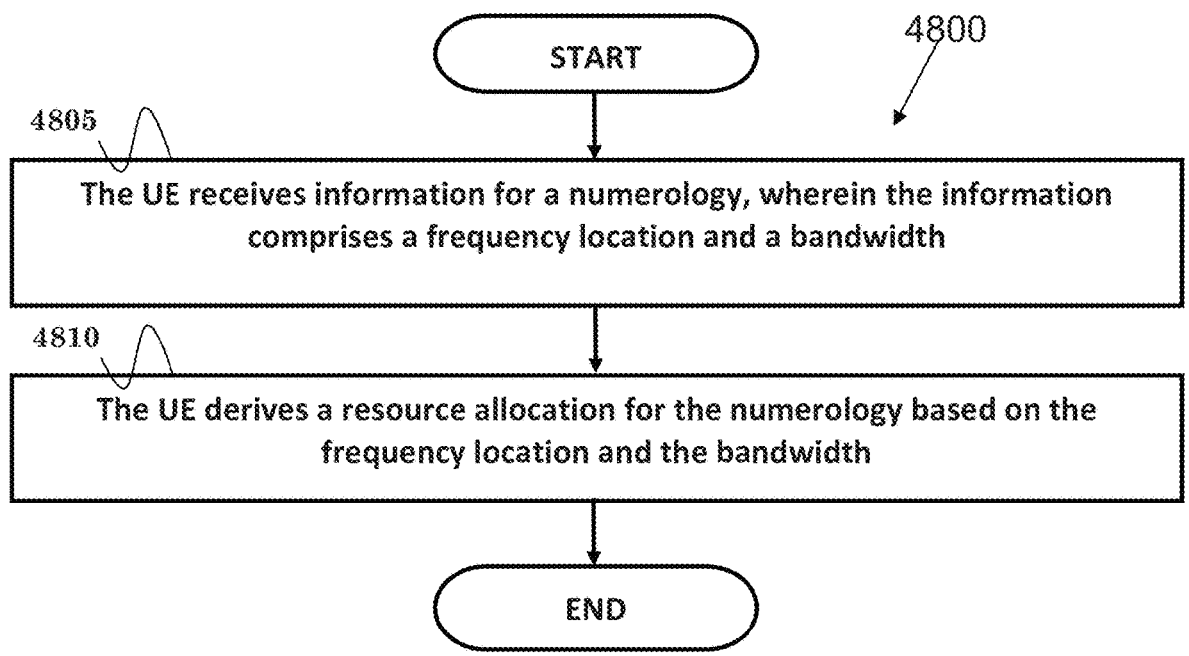
FIG. 48 is a flow diagram for one exemplary embodiment from the perspective of a UE.

FIG. 48 is a flow chart 4800 according to one exemplary embodiment from the perspective of a UE. In step 4805, the UE receives information for a numerology, wherein the information comprises a frequency location and a bandwidth. In step 4810, the UE derives a resource allocation for the numerology based on the frequency location and the bandwidth.

In another embodiment, the UE is configured with a system bandwidth. In one another embodiment, the system bandwidth may be larger than the bandwidth. In the various methods, the frequency location may be an index of a resource block. In another method, the resource allocation allocates the resource within a bandwidth portion. In one embodiment, the bandwidth portion is derived from the frequency location and the bandwidth.

In the various embodiments, the frequency location is an index of the resource block with the lowest frequency within the bandwidth portion. Alternatively, the frequency location is an index of the resource block with the highest frequency within the bandwidth portion. In another alternative, the frequency location is an index of the resource block with central frequency within the bandwidth portion.

In the various embodiments, the bandwidth is a fixed bandwidth. Alternatively, the bandwidth is a configured bandwidth. Alternatively, the bandwidth is the maximum bandwidth for the numerology. In yet another alternative, the bandwidth is the maximum bandwidth the UE is able to receive for the numerology.

In the various embodiments, the resource allocation is done by a bitmap. Alternatively, the resource allocation is done by a value indicating the starting position and a length of the resource allocation.

In the various embodiments, the bandwidth is consecutive in frequency domain.

In the various embodiments, the bandwidth portion is indicated by a broadcast channel. In another embodiment, the bandwidth portion is indicated by a UE-specific RRC message. In another embodiment, the bandwidth portion is indicated by a physical control channel. In still another embodiment, the bandwidth portion is indicated by a broadcast channel and may be updated by a UE-specific RRC message. In still another embodiment, the bandwidth portion is indicated by a UE-specific RRC message and may be updated by a physical control channel.

In the various embodiments, the bandwidth is indicated by a broadcast channel. In another embodiment, the bandwidth is indicated by a UE-specific RRC message. In another embodiment, the bandwidth is indicated by a physical control channel. In still another embodiment, the bandwidth is indicated by a broadcast channel and may be updated by a UE-specific RRC message. In still another embodiment, the bandwidth is indicated by a UE-specific RRC message and may be updated by a physical control channel.

In the various embodiments, the frequency location is indicated by a broadcast channel. In another embodiment, the frequency location is indicated by a UE-specific RRC message. In another embodiment, the frequency location is indicated by a physical control channel. In still another embodiment, the frequency location is indicated by a broadcast channel and may be updated by a UE-specific RRC message. In still another embodiment, the frequency location is indicated by a UE-specific RRC message and may be updated by a physical control channel.

In the various embodiments, in particular that described in connection with FIG. 48, further alternatively or additionally preferably the numerology is configured by a UE-specific RRC message. Further alternatively or additionally preferably, the numerology is indicated by a physical control channel. Further alternatively or additionally preferably, the numerology is indicated by a UE-specific RRC message and may be updated by a physical control channel.

Figure 49:
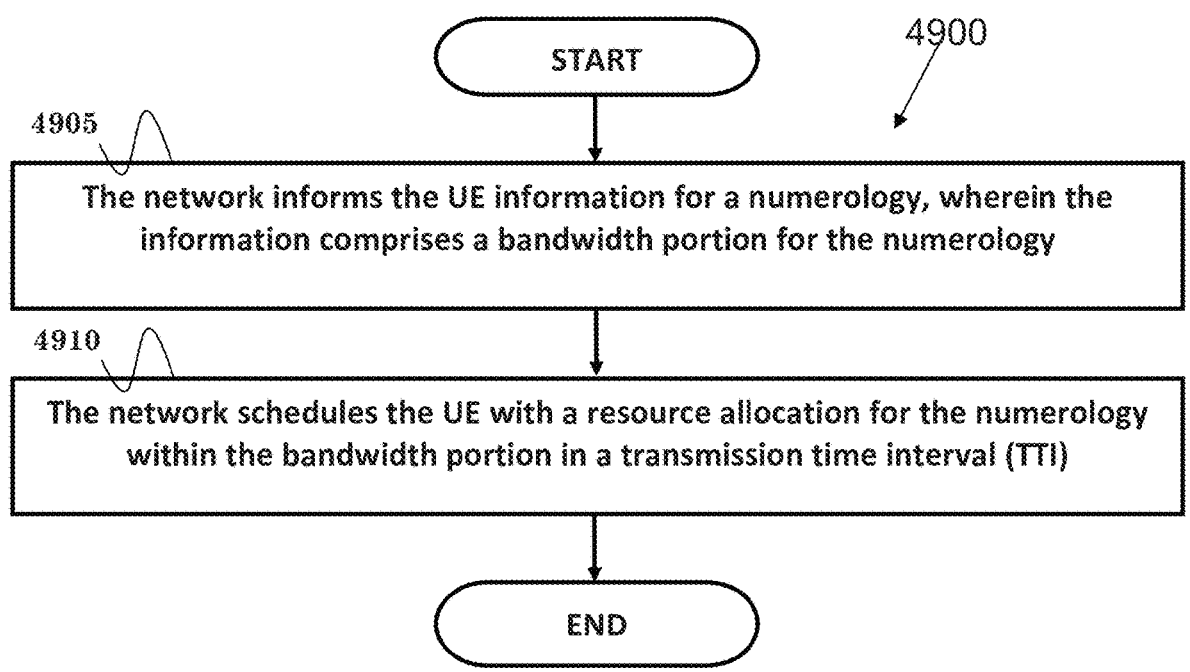
FIG. 49 is a flow diagram for one exemplary embodiment from the perspective of a network.

FIG. 49 is a flow chart 4900 according to another exemplary embodiment from the perspective of a network. In step 4905, the network informs the UE information for a numerology, wherein the information comprises a bandwidth portion for the numerology. In step 4910, the network schedules the UE with a resource allocation for the numerology within the bandwidth portion in a transmission time interval (TTI).

In the various embodiments, the bandwidth portion comprises a frequency location and a bandwidth. In another embodiment, the bandwidth portion comprises a frequency location. In still another embodiment, the bandwidth portion comprises a bandwidth.

In the various embodiments, the bandwidth portion is indicated by a broadcast channel. In another embodiment, the bandwidth portion is indicated by a UE-specific RRC message. In another embodiment, the bandwidth portion is indicated by a physical control channel. In still another embodiment, the bandwidth portion is indicated by a broadcast channel and may be updated by a UE-specific RRC message. In still another embodiment, the bandwidth portion is indicated by a UE-specific RRC message and may be updated by a physical control channel.

In the various embodiments, in particular that described in connection with FIG. 49, further alternatively or additionally preferably the numerology is configured by a UE-specific RRC message. Further alternatively or additionally preferably, the numerology is indicated by a physical control channel. Further alternatively or additionally preferably, the numerology is indicated by a UE-specific RRC message and may be updated by a physical control channel.

In one method, the UE does not assume that a resource block within the bandwidth portion and outside the resource allocation is transmitted with the numerology in the TTI.

In another method, the UE does not perform measurement on resource block(s) within the bandwidth portion and outside the resource allocation.

In yet another method, the UE does not perform demodulation with the reference signal on the resource block(s) within the bandwidth portion and outside the resource allocation.

In another method, the measurement is a channel state information (CSI) measurement. In some methods, if the UE is configured with CSI-RS in the TTI, the UE measures CSI-RS within the bandwidth portion and outside the resource allocation. In some methods, if the UE is configured with CSI-RS in the TTI, the UE measures CSI-RS within the resource allocation. In yet another method, the network would transmit a second numerology different from the numerology within the bandwidth portion.

Referring back to FIGS. 3 and 4, in one embodiment, the device 300 includes a program code 312 stored in memory 310. The CPU 308 could execute program code 312 to enable the UE (i) to receive information for a numerology, wherein the information comprises a frequency location and a bandwidth; (ii) to derive a resource allocation for the numerology based on the frequency location and the bandwidth.

In another embodiment, the CPU 308 could execute program code 312 to enable the network (i) to configure the UE with a numerology; (ii) to configure the UE with a bandwidth portion for the numerology schedule a transmission or a reception for the UE based on the information; and (iii) to schedule the UE with a resource allocation with the bandwidth in a transmission time interval (TTI), wherein the UE does not assume that a resource block within the bandwidth portion and outside the resource allocation is transmitted with the numerology in the TTI.

In another embodiment, the CPU 308 could execute program code 312 to enable the network (i) to inform the UE information for a numerology, wherein the information comprises a bandwidth portion for the numerology; and (ii) to schedule the UE with a resource allocation for the numerology with the bandwidth in a TTI.

Furthermore, the CPU 308 can execute the program code 312 to perform all of the above-described actions and steps or others methods described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for determining numerology bandwidth, the method comprising:
   receiving, by a user equipment (UE), information for a first numerology associated with a first subcarrier spacing, wherein the information comprises a first frequency location and a first bandwidth for the first numerology for a physical downlink shared channel (PDSCH) or a physical uplink shared channel (PUSCH);
   detecting a physical downlink control channel (PDCCH), wherein the PDCCH is associated with the PDSCH or the PUSCH;
   deriving, by the UE, a first bandwidth portion based on the first frequency location and the first bandwidth for the first numerology; and
   deriving, by the UE, a resource allocation scheduled by a network and carried by the PDCCH for the PDSCH or the PUSCH for the first numerology within the first bandwidth portion based on the PDCCH, the first frequency location and the first bandwidth, wherein the resource allocation within the first bandwidth portion is done via a bit map indicating which resource unit within the first bandwidth portion is allocated for the UE.

2. The method of claim 1, further comprising:
   configuring, by the UE, a system bandwidth.

3. The method of claim 1, comprising:
   receiving, by the UE, second information for a second numerology associated with a second subcarrier spacing, wherein the second information comprises a second frequency location and a second bandwidth for the second numerology for a second PDSCH or a second PUSCH;
   detecting a second PDCCH, wherein the second PDCCH is associated with the second PDSCH or the second PUSCH;
   deriving, by the UE, a second bandwidth portion based on the second frequency location and the second bandwidth for the second numerology; and
   deriving, by the UE, a second resource allocation scheduled by a second network and carried by the second PDCCH for the second PDSCH or the second PUSCH for the second numerology within the second bandwidth portion based on the second PDCCH, the second frequency location and the second bandwidth.

4. The method of claim 1, wherein the first frequency location is an index of a resource block.

5. The method of claim 1, further comprising:
   receiving, by the UE, second information for a second numerology associated with a second subcarrier spacing, wherein the second information comprises a second frequency location and a second bandwidth for the second numerology and deriving, by the UE, a second resource allocation for a second PDSCH or a second PUSCH for the second numerology within a second bandwidth portion based on the PDCCH, the second frequency location and the second bandwidth.

6. The method of claim 1, wherein the first frequency location is an index of a resource block with a central frequency within the first bandwidth portion.

7. The method of claim 6, the first bandwidth portion is derived from the first frequency location and the first bandwidth.

8. The method of claim 1, wherein the first bandwidth and the first frequency location is configured by UE-specific RRC message.

9. The method of claim 1, wherein the first bandwidth and the first frequency location is indicated by a physical control channel.

10. The method of claim 1, wherein the first numerology is indicated by a physical control channel.

11. The method of claim 1, wherein the first bandwidth is a maximum bandwidth for the first numerology.

12. The method of claim 1, wherein the first bandwidth is a maximum bandwidth that the UE is able to receive for the first numerology.

13. A User Equipment (UE) capable of determining numerology bandwidth, comprising:
   a control circuit;
   a processor installed in the control circuit; and
   a memory installed in the control circuit and coupled to the processor;
   wherein the processor is configured to execute a program code stored in the memory to:
     receive information for a first numerology associated with a first subcarrier spacing, wherein the information comprises a first frequency location and a first bandwidth for the first numerology for a physical downlink shared channel (PDSCH) or a physical uplink shared channel (PUSCH);
     detect a physical downlink control channel (PDCCH), wherein the PDCCH is associated with the PDSCH or the PUSCH;
     derive a first bandwidth portion based on the first frequency location and the first bandwidth for the first numerology; and
     derive a resource allocation scheduled by a network and carried by the PDCCH for the PDSCH or the PUSCH for the first numerology within the first bandwidth portion based on the PDCCH, the first frequency location and the first bandwidth, wherein the resource allocation within the first bandwidth portion is done via a bit map indicating which resource unit within the first bandwidth portion is allocated for the UE.

14. The UE of claim 13, wherein the UE configures a system bandwidth.

15. The UE of claim 14, wherein the system bandwidth is larger than the first bandwidth.

16. The UE of claim 13, wherein the processor is further configured to execute a second program code stored in the memory to:

receive second information for a second numerology associated with a second subcarrier spacing, wherein the second information comprises a second frequency location and a second bandwidth for the second numerology and deriving, by the UE, a second resource allocation for a second PDSCH or a second PUSCH for the second numerology within a second bandwidth portion based on the PDCCH, the second frequency location and the second bandwidth.

17. The UE of claim 13, wherein the first bandwidth is a configured bandwidth for the first numerology.

* * * * *